United States Patent
King et al.

(10) Patent No.: US 8,619,147 B2
(45) Date of Patent: Dec. 31, 2013

(54) HANDHELD DEVICE FOR CAPTURING TEXT FROM BOTH A DOCUMENT PRINTED ON PAPER AND A DOCUMENT DISPLAYED ON A DYNAMIC DISPLAY DEVICE

(75) Inventors: Martin T. King, Vashon Island, WA (US); Dale L. Grover, Ann Arbor, MI (US); Clifford A. Kushler, Lynnwood, WA (US); James Q. Stafford-Fraser, Cambridge (GB)

(73) Assignee: Google Inc., Mountain View, CA (US)

( * ) Notice: Subject to any disclaimer, the term of this patent is extended or adjusted under 35 U.S.C. 154(b) by 10 days.

(21) Appl. No.: 12/899,462

(22) Filed: Oct. 6, 2010

(65) Prior Publication Data

US 2011/0085211 A1    Apr. 14, 2011

Related U.S. Application Data

(63) Continuation of application No. 11/236,330, filed on Sep. 27, 2005, now Pat. No. 7,812,860, which is a continuation-in-part of application No. 11/004,637, filed on Dec. 3, 2004, now Pat. No. 7,707,039, and a (Continued)

(51) Int. Cl.
    *H04N 9/04*    (2006.01)
(52) U.S. Cl.
    USPC ...................................................... 348/210.99
(58) Field of Classification Search
    USPC ............................ 348/210.99; 358/474–498
    See application file for complete search history.

(56) References Cited

U.S. PATENT DOCUMENTS

| 3,899,687 A | 8/1975 | Jones |
| 3,917,317 A | 11/1975 | Ryan |

(Continued)

FOREIGN PATENT DOCUMENTS

| EP | 0697793 | 2/1996 |
| EP | 0337753 | 12/1998 |

(Continued)

OTHER PUBLICATIONS

Liddy, Elizabeth, "How a Search Engine Works," InfoToday.com, vol. 9, No. 5, May 2001, pp. 1-7.

(Continued)

*Primary Examiner* — James Hannett
(74) *Attorney, Agent, or Firm* — Fish & Richardson P.C.

(57) ABSTRACT

A device for capturing rendered text is described. The device incorporates one or more visual sensors that receive visual information as a part of capturing rendered text. The visual sensors are collectively capable of capturing both text that is permanently printed on a page, and text that is displayed transitorily on a dynamic device. The device further incorporates a visual information disposition subsystem for disposing of visual information received by the visual sensors. The device further incorporates a package that bears the visual sensors and the visual information disposition subsystem, and is suitable to be held in a human hand.

13 Claims, 30 Drawing Sheets

Related U.S. Application Data continuation-in-part of application No. 11/097,961, filed on Apr. 1, 2005, now abandoned, and a continuation-in-part of application No. 11/097,093, filed on Apr. 1, 2005, now abandoned, and a continuation-in-part of application No. 11/098,038, filed on Apr. 1, 2005, now Pat. No. 7,599,844, and a continuation-in-part of application No. 11/098,014, filed on Apr. 1, 2005, now Pat. No. 8,019,648, and a continuation-in-part of application No. 11/097,103, filed on Apr. 1, 2005, now Pat. No. 7,596,269, and a continuation-in-part of application No. 11/098,043, filed on Apr. 1, 2005, now abandoned, and a continuation-in-part of application No. 11/097,981, filed on Apr. 1, 2005, now Pat. No. 7,606,741, and a continuation-in-part of application No. 11/097,089, filed on Apr. 1, 2005, now Pat. No. 8,214,387, and a continuation-in-part of application No. 11/097,835, filed on Apr. 1, 2005, now Pat. No. 7,831,912, and a continuation-in-part of application No. 11/098,016, filed on Apr. 1, 2005, now Pat. No. 7,421,155, and a continuation-in-part of application No. 11/097,828, filed on Apr. 1, 2005, now Pat. No. 7,742,953, and a continuation-in-part of application No. 11/097,833, filed on Apr. 1, 2005, now Pat. No. 8,515,816, and a continuation-in-part of application No. 11/097,836, filed on Apr. 1, 2005, now abandoned, and a continuation-in-part of application No. 11/098,042, filed on Apr. 1, 2005, now Pat. No. 7,593,605, and a continuation-in-part of application No. 11/096,704, filed on Apr. 1, 2005, now Pat. No. 7,599,580, and a continuation-in-part of application No. 11/110,353, filed on Apr. 19, 2005, now Pat. No. 7,702,624, and a continuation-in-part of application No. 11/131,945, filed on May 17, 2005, now Pat. No. 7,818,215, and a continuation-in-part of application No. 11/185,908, filed on Jul. 19, 2005, now abandoned, and a continuation-in-part of application No. 11/208,408, filed on Aug. 18, 2005, now abandoned, and a continuation-in-part of application No. 11/208,457, filed on Aug. 18, 2005, now abandoned, and a continuation-in-part of application No. 11/208,458, filed on Aug. 18, 2005, now Pat. No. 7,437,023, and a continuation-in-part of application No. 11/208,461, filed on Aug. 18, 2005, now Pat. No. 8,005,720, and a continuation-in-part of application No. 11/209,333, filed on Aug. 23, 2005, now abandoned, and a continuation-in-part of application No. 11/210,260, filed on Aug. 23, 2005, now Pat. No. 7,706,611, and a continuation-in-part of application No. PCT/US2005/011533, filed on Apr. 1, 2005, and a continuation-in-part of application No. PCT/US2005/013586, filed on Apr. 6, 2005, and a continuation-in-part of application No. PCT/US2005/012510, filed on Apr. 12, 2005.

(60) Provisional application No. 60/613,243, filed on Sep. 27, 2004, provisional application No. 60/613,628, filed on Sep. 27, 2004, provisional application No. 60/613,632, filed on Sep. 27, 2004, provisional application No. 60/613,589, filed on Sep. 27, 2004, provisional application No. 60/613,242, filed on Sep. 27, 2004, provisional application No. 60/613,602, filed on Sep. 27, 2004, provisional application No. 60/613,340, filed on Sep. 27, 2004, provisional application No. 60/613,634, filed on Sep. 27, 2004, provisional application No. 60/613,461, filed on Sep. 27, 2004, provisional application No. 60/613,455, filed on Sep. 27, 2004, provisional application No. 60/613,460, filed on Sep. 27, 2004, provisional application No. 60/613,400, filed on Sep. 27, 2004, provisional application No. 60/613,456, filed on Sep. 27, 2004, provisional application No. 60/613,341, filed on Sep. 27, 2004, provisional application No. 60/613,361, filed on Sep. 27, 2004, provisional application No. 60/613,454, filed on Sep. 27, 2004, provisional application No. 60/613,339, filed on Sep. 27, 2004, provisional application No. 60/613,633, filed on Sep. 27, 2004, provisional application No. 60/615,378, filed on Oct. 1, 2004, provisional application No. 60/615,112, filed on Oct. 1, 2004, provisional application No. 60/615,538, filed on Oct. 1, 2004, provisional application No. 60/617,122, filed on Oct. 7, 2004, provisional application No. 60/622,906, filed on Oct. 28, 2004, provisional application No. 60/633,452, filed on Dec. 6, 2004, provisional application No. 60/633,678, filed on Dec. 6, 2004, provisional application No. 60/633,486, filed on Dec. 6, 2004, provisional application No. 60/633,453, filed on Dec. 6, 2004, provisional application No. 60/634,627, filed on Dec. 9, 2004, provisional application No. 60/634,739, filed on Dec. 9, 2004, provisional application No. 60/647,684, filed on Jan. 26, 2005, provisional application No. 60/648,746, filed on Jan. 31, 2005, provisional application No. 60/653,372, filed on Feb. 15, 2005, provisional application No. 60/653,663, filed on Feb. 16, 2005, provisional application No. 60/653,669, filed on Feb. 16, 2005, provisional application No. 60/653,899, filed on Feb. 16, 2005, provisional application No. 60/653,679, filed on Feb. 16, 2005, provisional application No. 60/653,847, filed on Feb. 16, 2005, provisional application No. 60/654,379, filed on Feb. 17, 2005, provisional application No. 60/654,368, filed on Feb. 18, 2005, provisional application No. 60/654,326, filed on Feb. 18, 2005, provisional application No. 60/654,196, filed on Feb. 18, 2005, provisional application No. 60/655,279, filed on Feb. 22, 2005, provisional application No. 60/655,280, filed on Feb. 22, 2005, provisional application No. 60/655,987, filed on Feb. 22, 2005, provisional application No. 60/655,697, filed on Feb. 22, 2005, provisional application No. 60/655,281, filed on Feb. 22, 2005, provisional application No. 60/657,309, filed on Feb. 28, 2005.

(56) References Cited

U.S. PATENT DOCUMENTS

| | | |
|---|---|---|
| 4,065,778 A | 12/1977 | Harvey |
| 4,135,791 A | 1/1979 | Govignon |
| 4,358,824 A | 11/1982 | Glickman et al. |
| 4,553,261 A | 11/1985 | Froessl |
| 4,633,507 A | 12/1986 | Cannistra et al. |
| 4,903,229 A | 2/1990 | Schmidt et al. |
| 4,914,709 A | 4/1990 | Rudak |
| 4,941,125 A * | 7/1990 | Boyne .................. 1/1 |
| 4,955,693 A | 9/1990 | Bobba |
| 4,958,379 A | 9/1990 | Yamaguchi et al. |
| 5,040,229 A | 8/1991 | Lee et al. |
| 5,048,097 A | 9/1991 | Gaborski et al. |
| 5,107,256 A | 4/1992 | Ueno et al. |

(56) References Cited

U.S. PATENT DOCUMENTS

| | | |
|---|---|---|
| 5,140,644 A | 8/1992 | Kawaguchi et al. |
| 5,142,161 A | 8/1992 | Brackmann |
| 5,151,951 A | 9/1992 | Ueda et al. |
| 5,159,668 A | 10/1992 | Kaasila |
| 5,168,147 A | 12/1992 | Bloomberg |
| 5,201,010 A | 4/1993 | Deaton et al. |
| 5,212,739 A | 5/1993 | Johnson |
| 5,271,068 A | 12/1993 | Ueda et al. |
| 5,272,324 A | 12/1993 | Blevins |
| 5,371,348 A | 12/1994 | Kumar et al. |
| 5,444,779 A | 8/1995 | Daniele |
| 5,465,353 A | 11/1995 | Hull et al. |
| 5,500,920 A | 3/1996 | Kupiec |
| 5,517,331 A | 5/1996 | Murai et al. |
| 5,522,798 A | 6/1996 | Johnson et al. |
| 5,532,469 A | 7/1996 | Shepard et al. |
| 5,541,419 A | 7/1996 | Arackellian |
| 5,577,135 A | 11/1996 | Grajski et al. |
| 5,602,376 A | 2/1997 | Coleman et al. |
| 5,624,265 A | 4/1997 | Redford et al. |
| 5,625,711 A | 4/1997 | Nicholson et al. |
| 5,680,607 A | 10/1997 | Brueckheimer |
| 5,684,891 A | 11/1997 | Tanaka et al. |
| 5,708,825 A | 1/1998 | Sotomayor |
| 5,724,521 A | 3/1998 | Dedrick |
| 5,748,805 A | 5/1998 | Withgott et al. |
| 5,756,981 A | 5/1998 | Roustaei et al. |
| 5,757,360 A | 5/1998 | Nitta et al. |
| 5,818,612 A | 10/1998 | Segawa et al. |
| 5,818,965 A | 10/1998 | Davies |
| 5,832,528 A | 11/1998 | Kwatinetz et al. |
| 5,889,896 A | 3/1999 | Meshinsky et al. |
| 5,890,147 A | 3/1999 | Peltonen et al. |
| 5,893,095 A | 4/1999 | Jain et al. |
| 5,899,700 A | 5/1999 | Williams et al. |
| 5,913,185 A | 6/1999 | Martino et al. |
| 5,937,422 A | 8/1999 | Nelson et al. |
| 5,949,921 A | 9/1999 | Kojima et al. |
| 5,963,966 A | 10/1999 | Mitchell et al. |
| 5,982,928 A | 11/1999 | Shimada et al. |
| 5,983,171 A | 11/1999 | Yokoyama et al. |
| 5,983,295 A | 11/1999 | Cotugno |
| 6,002,491 A | 12/1999 | Li et al. |
| 6,009,420 A | 12/1999 | Fagg, III et al. |
| 6,029,141 A | 2/2000 | Bezos et al. |
| 6,033,086 A | 3/2000 | Bohn |
| 6,036,086 A | 3/2000 | Sizer, II et al. |
| 6,044,378 A | 3/2000 | Gladney |
| 6,053,413 A | 4/2000 | Swift et al. |
| 6,055,333 A | 4/2000 | Guzik et al. |
| 6,081,206 A | 6/2000 | Kielland |
| 6,081,621 A | 6/2000 | Ackner |
| 6,094,689 A | 7/2000 | Embry et al. |
| 6,095,418 A | 8/2000 | Swartz et al. |
| 6,134,532 A | 10/2000 | Lazarus et al. |
| 6,140,140 A | 10/2000 | Hopper |
| 6,145,003 A | 11/2000 | Sanu et al. |
| 6,154,737 A | 11/2000 | Inaba et al. |
| 6,157,465 A | 12/2000 | Suda et al. |
| 6,178,261 B1 | 1/2001 | Williams et al. |
| 6,178,263 B1 | 1/2001 | Fan et al. |
| 6,201,903 B1 | 3/2001 | Wolff et al. |
| 6,212,299 B1 | 4/2001 | Yuge |
| 6,226,631 B1 | 5/2001 | Evans |
| 6,229,137 B1 | 5/2001 | Bohn |
| 6,265,844 B1 | 7/2001 | Wakefield |
| 6,292,274 B1 | 9/2001 | Bohn |
| 6,310,988 B1 | 10/2001 | Flores et al. |
| 6,314,406 B1 | 11/2001 | O'Hagan et al. |
| 6,330,976 B1 | 12/2001 | Dymetman et al. |
| 6,341,290 B1 | 1/2002 | Lombardo et al. |
| 6,342,901 B1 | 1/2002 | Adler et al. |
| 6,345,104 B1 | 2/2002 | Rhoads |
| 6,349,308 B1 | 2/2002 | Whang et al. |
| 6,360,949 B1 | 3/2002 | Shepard et al. |
| 6,360,951 B1 | 3/2002 | Swinehart |
| 6,409,401 B1 | 6/2002 | Petteruti et al. |
| 6,427,032 B1 | 7/2002 | Irons et al. |
| 6,429,899 B1 | 8/2002 | Nio et al. |
| 6,459,823 B2 | 10/2002 | Altunbasak et al. |
| 6,466,336 B1 | 10/2002 | Sturgeon et al. |
| 6,490,553 B2 | 12/2002 | Van Thong et al. |
| 6,493,707 B1 | 12/2002 | Dey et al. |
| 6,520,407 B1 | 2/2003 | Nieswand et al. |
| 6,537,324 B1 | 3/2003 | Tabata et al. |
| 6,597,812 B1 | 7/2003 | Fallon et al. |
| 6,611,598 B1 | 8/2003 | Hayosh |
| 6,616,038 B1 | 9/2003 | Olschafskie et al. |
| 6,616,047 B2 | 9/2003 | Catan |
| 6,640,145 B2 | 10/2003 | Hoffberg et al. |
| 6,641,037 B2 | 11/2003 | Williams |
| 6,643,696 B2 | 11/2003 | Davis et al. |
| 6,650,442 B1 | 11/2003 | Chiu |
| 6,675,356 B1 | 1/2004 | Adler et al. |
| 6,678,075 B1 | 1/2004 | Tsai et al. |
| 6,678,687 B2 | 1/2004 | Watanabe et al. |
| 6,691,107 B1 | 2/2004 | Dockter et al. |
| 6,714,677 B1 | 3/2004 | Stearns et al. |
| 6,738,519 B1 | 5/2004 | Nishiwaki |
| 6,741,871 B1 | 5/2004 | Silverbrook et al. |
| 6,745,937 B2 | 6/2004 | Walsh et al. |
| 6,748,306 B2 | 6/2004 | Lipowicz |
| 6,757,783 B2 | 6/2004 | Koh |
| 6,763,386 B2 | 7/2004 | Davis et al. |
| 6,771,283 B2 | 8/2004 | Carro |
| 6,775,422 B1 | 8/2004 | Altman |
| 6,783,071 B2 | 8/2004 | Levine et al. |
| 6,785,421 B1 | 8/2004 | Gindele et al. |
| 6,801,658 B2 | 10/2004 | Morita et al. |
| 6,801,907 B1 | 10/2004 | Zagami |
| 6,812,961 B1 | 11/2004 | Parulski et al. |
| 6,820,237 B1 | 11/2004 | Abu-Hakima et al. |
| 6,823,075 B2 | 11/2004 | Perry |
| 6,845,913 B2 | 1/2005 | Madding et al. |
| 6,850,252 B1 | 2/2005 | Hoffberg |
| 6,862,046 B2 | 3/2005 | Ko |
| 6,877,001 B2 | 4/2005 | Wolf et al. |
| 6,880,124 B1 | 4/2005 | Moore |
| 6,892,264 B2 | 5/2005 | Lamb |
| 6,917,722 B1 | 7/2005 | Bloomfield |
| 6,917,724 B2 | 7/2005 | Seder et al. |
| 6,922,725 B2 | 7/2005 | Lamming et al. |
| 6,925,182 B1 | 8/2005 | Epstein |
| 6,952,281 B1 | 10/2005 | Irons et al. |
| 6,957,384 B2 | 10/2005 | Jeffery et al. |
| 6,978,297 B1 | 12/2005 | Piersol |
| 6,985,169 B1 | 1/2006 | Deng et al. |
| 6,990,548 B1 | 1/2006 | Kaylor |
| 6,991,158 B2 | 1/2006 | Munte |
| 6,992,655 B2 | 1/2006 | Ericson et al. |
| 7,001,681 B2 | 2/2006 | Wood |
| 7,006,881 B1 | 2/2006 | Hoffberg et al. |
| 7,010,616 B2 | 3/2006 | Carlson et al. |
| 7,020,663 B2 | 3/2006 | Hay et al. |
| 7,023,536 B2 | 4/2006 | Zhang et al. |
| 7,038,846 B2 | 5/2006 | Mandella |
| 7,047,491 B2 | 5/2006 | Schubert et al. |
| 7,058,223 B2 | 6/2006 | Cox |
| 7,062,437 B2 | 6/2006 | Kovales et al. |
| 7,069,272 B2 | 6/2006 | Snyder et al. |
| 7,085,755 B2 | 8/2006 | Bluhm et al. |
| 7,088,440 B2 | 8/2006 | Buermann et al. |
| 7,089,330 B1 | 8/2006 | Mason |
| 7,093,759 B2 | 8/2006 | Walsh |
| 7,110,100 B2 | 9/2006 | Buermann et al. |
| 7,111,787 B2 | 9/2006 | Ehrhart |
| 7,113,270 B2 | 9/2006 | Buermann et al. |
| 7,117,374 B2 | 10/2006 | Hill et al. |
| 7,131,061 B2 | 10/2006 | MacLean et al. |
| 7,133,862 B2 | 11/2006 | Hubert et al. |
| 7,137,077 B2 | 11/2006 | Iwema et al. |
| 7,139,445 B2 | 11/2006 | Pilu et al. |
| 7,161,664 B2 | 1/2007 | Buermann et al. |
| 7,165,268 B1 | 1/2007 | Moore et al. |

(56) References Cited

U.S. PATENT DOCUMENTS

| | | | |
|---|---|---|---|
| 7,167,586 B2 | 1/2007 | Braun et al. |
| 7,174,332 B2 | 2/2007 | Baxter et al. |
| 7,181,761 B2 | 2/2007 | Davis et al. |
| 7,185,275 B2 | 2/2007 | Roberts et al. |
| 7,188,307 B2 | 3/2007 | Ohsawa |
| 7,190,480 B2 | 3/2007 | Sturgeon et al. |
| 7,197,716 B2 | 3/2007 | Newell et al. |
| 7,203,158 B2 | 4/2007 | Oshima et al. |
| 7,203,384 B2 | 4/2007 | Carl |
| 7,216,121 B2 | 5/2007 | Bachman et al. |
| 7,216,224 B2 | 5/2007 | Lapstun et al. |
| 7,224,480 B2 | 5/2007 | Tanaka et al. |
| 7,225,979 B2 | 6/2007 | Silverbrook et al. |
| 7,234,645 B2 | 6/2007 | Silverbrook et al. |
| 7,239,747 B2 | 7/2007 | Bresler et al. |
| 7,242,492 B2 | 7/2007 | Currans et al. |
| 7,260,534 B2 | 8/2007 | Gandhi et al. |
| 7,262,798 B2 | 8/2007 | Stavely et al. |
| 7,268,956 B2 | 9/2007 | Mandella |
| 7,283,992 B2 | 10/2007 | Liu et al. |
| 7,284,192 B2 | 10/2007 | Kashi et al. |
| 7,289,806 B2 | 10/2007 | Morris et al. |
| 7,295,101 B2 | 11/2007 | Ward et al. |
| 7,327,883 B2 | 2/2008 | Polonowski |
| 7,331,523 B2 | 2/2008 | Meier et al. |
| 7,339,467 B2 | 3/2008 | Lamb |
| 7,349,552 B2 | 3/2008 | Levy et al. |
| 7,353,199 B1 | 4/2008 | DiStefano, III |
| 7,362,902 B1 | 4/2008 | Baker et al. |
| 7,376,581 B2 | 5/2008 | DeRose et al. |
| 7,383,263 B2 | 6/2008 | Goger |
| 7,392,287 B2 | 6/2008 | Ratcliff, III |
| 7,392,475 B1 | 6/2008 | Leban et al. |
| 7,404,520 B2 | 7/2008 | Vesuna |
| 7,409,434 B2 | 8/2008 | Lamming et al. |
| 7,412,158 B2 | 8/2008 | Kakkori |
| 7,415,670 B2 | 8/2008 | Hull et al. |
| 7,421,155 B2 | 9/2008 | King et al. |
| 7,424,543 B2 | 9/2008 | Rice, III |
| 7,426,486 B2 | 9/2008 | Treibach-Heck et al. |
| 7,433,068 B2 | 10/2008 | Stevens et al. |
| 7,433,893 B2 | 10/2008 | Lowry |
| 7,437,023 B2 | 10/2008 | King et al. |
| 7,474,809 B2 | 1/2009 | Carl et al. |
| 7,487,112 B2 | 2/2009 | Barnes, Jr. |
| 7,493,487 B2 | 2/2009 | Phillips et al. |
| 7,496,638 B2 | 2/2009 | Philyaw |
| 7,505,785 B2 | 3/2009 | Callaghan et al. |
| 7,505,956 B2 | 3/2009 | Ibbotson |
| 7,512,254 B2 | 3/2009 | Vollkommer et al. |
| 7,523,067 B1 | 4/2009 | Nakajima |
| 7,533,040 B2 | 5/2009 | Perkowski |
| 7,536,547 B2 | 5/2009 | Van Den Tillaart |
| 7,552,075 B1 | 6/2009 | Walsh |
| 7,552,381 B2 | 6/2009 | Barrus |
| 7,561,312 B1 | 7/2009 | Proudfoot et al. |
| 7,574,407 B2 | 8/2009 | Carro et al. |
| 7,587,412 B2 | 9/2009 | Weyl et al. |
| 7,591,597 B2 | 9/2009 | Pasqualini et al. |
| 7,593,605 B2 | 9/2009 | King et al. |
| 7,596,269 B2 | 9/2009 | King et al. |
| 7,599,580 B2 | 10/2009 | King et al. |
| 7,599,844 B2 | 10/2009 | King et al. |
| 7,606,741 B2 | 10/2009 | King et al. |
| 7,613,634 B2 | 11/2009 | Siegel et al. |
| 7,634,407 B2 | 12/2009 | Chelba et al. |
| 7,634,468 B2 | 12/2009 | Stephan |
| 7,646,921 B2 | 1/2010 | Vincent et al. |
| 7,650,035 B2 | 1/2010 | Vincent et al. |
| 7,660,813 B2 | 2/2010 | Milic-Frayling et al. |
| 7,664,734 B2 | 2/2010 | Lawrence et al. |
| 7,672,543 B2 | 3/2010 | Hull et al. |
| 7,680,067 B2 | 3/2010 | Prasad et al. |
| 7,689,712 B2 | 3/2010 | Lee et al. |
| 7,689,832 B2 | 3/2010 | Talmor et al. |
| 7,697,758 B2 | 4/2010 | Vincent et al. |
| 7,698,344 B2 | 4/2010 | Sareen et al. |
| 7,702,624 B2 | 4/2010 | King et al. |
| 7,706,611 B2 | 4/2010 | King et al. |
| 7,707,039 B2 | 4/2010 | King et al. |
| 7,710,598 B2 | 5/2010 | Harrison, Jr. |
| 7,729,515 B2 | 6/2010 | Mandella et al. |
| 7,742,953 B2 | 6/2010 | King et al. |
| 7,761,451 B2 | 7/2010 | Cunningham |
| 7,779,002 B1 | 8/2010 | Gomes et al. |
| 7,783,617 B2 | 8/2010 | Lu et al. |
| 7,788,248 B2 | 8/2010 | Forstall et al. |
| 7,812,860 B2 | 10/2010 | King et al. |
| 7,818,215 B2 | 10/2010 | King et al. |
| 7,826,641 B2 | 11/2010 | Mandella et al. |
| 7,831,912 B2 | 11/2010 | King et al. |
| 7,872,669 B2 | 1/2011 | Darrell et al. |
| 7,894,670 B2 | 2/2011 | King et al. |
| 7,941,433 B2 | 5/2011 | Benson |
| 7,949,191 B1 | 5/2011 | Ramkumar et al. |
| 7,961,909 B2 | 6/2011 | Mandella et al. |
| 8,082,258 B2 | 12/2011 | Kumar et al. |
| 8,111,927 B2 | 2/2012 | Vincent et al. |
| 8,146,156 B2 | 3/2012 | King et al. |
| 2001/0034237 A1 | 10/2001 | Garahi |
| 2001/0055411 A1 | 12/2001 | Black |
| 2002/0012065 A1 | 1/2002 | Watanabe |
| 2002/0022993 A1 | 2/2002 | Miller et al. |
| 2002/0023957 A1 | 2/2002 | Michaelis et al. |
| 2002/0049781 A1 | 4/2002 | Bengtson |
| 2002/0054059 A1 | 5/2002 | Schneiderman |
| 2002/0055919 A1 | 5/2002 | Mikheev |
| 2002/0067308 A1 | 6/2002 | Robertson |
| 2002/0073000 A1 | 6/2002 | Sage |
| 2002/0091671 A1 | 7/2002 | Prokoph |
| 2002/0091928 A1 | 7/2002 | Bouchard et al. |
| 2002/0111960 A1 | 8/2002 | Irons et al. |
| 2002/0125411 A1 | 9/2002 | Christy |
| 2002/0138476 A1 | 9/2002 | Suwa et al. |
| 2002/0154817 A1 | 10/2002 | Katsuyama et al. |
| 2002/0169509 A1 | 11/2002 | Huang et al. |
| 2002/0191847 A1 | 12/2002 | Newman et al. |
| 2002/0199198 A1 | 12/2002 | Stonedahl |
| 2003/0004991 A1 | 1/2003 | Keskar et al. |
| 2003/0019939 A1 | 1/2003 | Sellen |
| 2003/0039411 A1 | 2/2003 | Nada |
| 2003/0040957 A1 | 2/2003 | Rodriguez et al. |
| 2003/0043042 A1 | 3/2003 | Moores, Jr. et al. |
| 2003/0093400 A1 | 5/2003 | Santosuosso |
| 2003/0093545 A1 | 5/2003 | Liu et al. |
| 2003/0149678 A1 | 8/2003 | Cook |
| 2003/0160975 A1 | 8/2003 | Skurdal et al. |
| 2003/0171910 A1 | 9/2003 | Abir |
| 2003/0173405 A1 | 9/2003 | Wilz, Sr. et al. |
| 2003/0182399 A1 | 9/2003 | Silber |
| 2003/0187751 A1 | 10/2003 | Watson et al. |
| 2003/0195851 A1 | 10/2003 | Ong |
| 2003/0212527 A1 | 11/2003 | Moore et al. |
| 2003/0220835 A1 | 11/2003 | Barnes, Jr. |
| 2003/0223637 A1 | 12/2003 | Simske et al. |
| 2003/0225547 A1 | 12/2003 | Paradies |
| 2004/0001217 A1 | 1/2004 | Wu |
| 2004/0006509 A1 | 1/2004 | Mannik et al. |
| 2004/0006740 A1 | 1/2004 | Krohn et al. |
| 2004/0015437 A1 | 1/2004 | Choi et al. |
| 2004/0023200 A1 | 2/2004 | Blume |
| 2004/0028295 A1 | 2/2004 | Allen et al. |
| 2004/0044627 A1 | 3/2004 | Russell et al. |
| 2004/0068483 A1 | 4/2004 | Sakurai et al. |
| 2004/0080795 A1 | 4/2004 | Bean et al. |
| 2004/0098165 A1 | 5/2004 | Butikofer |
| 2004/0122811 A1* | 6/2004 | Page ................ 707/3 |
| 2004/0139106 A1 | 7/2004 | Bachman et al. |
| 2004/0139107 A1 | 7/2004 | Bachman et al. |
| 2004/0139400 A1 | 7/2004 | Allam et al. |
| 2004/0181671 A1 | 9/2004 | Brundage et al. |
| 2004/0181688 A1 | 9/2004 | Wittkotter |
| 2004/0186766 A1 | 9/2004 | Fellenstein et al. |
| 2004/0189691 A1 | 9/2004 | Jojic et al. |

(56) References Cited

U.S. PATENT DOCUMENTS

| | | |
|---|---|---|
| 2004/0193488 A1 | 9/2004 | Khoo et al. |
| 2004/0204953 A1 | 10/2004 | Muir et al. |
| 2004/0205041 A1 | 10/2004 | Erol et al. |
| 2004/0205534 A1 | 10/2004 | Koelle |
| 2004/0236791 A1 | 11/2004 | Kinjo |
| 2004/0250201 A1 | 12/2004 | Caspi |
| 2004/0254795 A1 | 12/2004 | Fujii et al. |
| 2004/0258274 A1 | 12/2004 | Brundage et al. |
| 2004/0268237 A1 | 12/2004 | Jones et al. |
| 2005/0022114 A1 | 1/2005 | Shanahan et al. |
| 2005/0033713 A1 | 2/2005 | Bala et al. |
| 2005/0091578 A1 | 4/2005 | Madan et al. |
| 2005/0097335 A1 | 5/2005 | Shenoy et al. |
| 2005/0108001 A1 | 5/2005 | Aarskog |
| 2005/0108195 A1 | 5/2005 | Yalovsky et al. |
| 2005/0132281 A1 | 6/2005 | Pan et al. |
| 2005/0136949 A1 | 6/2005 | Barnes, Jr. |
| 2005/0139649 A1 | 6/2005 | Metcalf et al. |
| 2005/0154760 A1 | 7/2005 | Bhakta et al. |
| 2005/0168437 A1 | 8/2005 | Carl et al. |
| 2005/0205671 A1 | 9/2005 | Gelsomini et al. |
| 2005/0214730 A1 | 9/2005 | Rines |
| 2005/0220359 A1 | 10/2005 | Sun et al. |
| 2005/0222801 A1 | 10/2005 | Wulff et al. |
| 2005/0231746 A1 | 10/2005 | Parry et al. |
| 2005/0243386 A1 | 11/2005 | Sheng |
| 2005/0251448 A1 | 11/2005 | Gropper |
| 2005/0262058 A1 | 11/2005 | Chandrasekar et al. |
| 2005/0270358 A1 | 12/2005 | Kuchen et al. |
| 2005/0278314 A1 | 12/2005 | Buchheit |
| 2005/0288954 A1 | 12/2005 | McCarthy et al. |
| 2005/0289054 A1 | 12/2005 | Silverbrook et al. |
| 2006/0011728 A1 | 1/2006 | Frantz et al. |
| 2006/0023945 A1 | 2/2006 | King et al. |
| 2006/0036462 A1 | 2/2006 | King et al. |
| 2006/0041484 A1 | 2/2006 | King et al. |
| 2006/0041538 A1 | 2/2006 | King et al. |
| 2006/0041590 A1 | 2/2006 | King et al. |
| 2006/0041605 A1 | 2/2006 | King et al. |
| 2006/0045374 A1* | 3/2006 | Kim et al. ............ 382/255 |
| 2006/0048046 A1 | 3/2006 | Joshi et al. |
| 2006/0053097 A1 | 3/2006 | King et al. |
| 2006/0075327 A1 | 4/2006 | Sriver |
| 2006/0081714 A1 | 4/2006 | King et al. |
| 2006/0085477 A1 | 4/2006 | Phillips et al. |
| 2006/0098900 A1 | 5/2006 | King et al. |
| 2006/0101285 A1 | 5/2006 | Chen et al. |
| 2006/0103893 A1 | 5/2006 | Azimi et al. |
| 2006/0104515 A1 | 5/2006 | King et al. |
| 2006/0119900 A1 | 6/2006 | King et al. |
| 2006/0122983 A1 | 6/2006 | King et al. |
| 2006/0136629 A1 | 6/2006 | King et al. |
| 2006/0138219 A1 | 6/2006 | Brzezniak et al. |
| 2006/0146169 A1 | 7/2006 | Segman |
| 2006/0152488 A1* | 7/2006 | Salsman et al. ............ 345/158 |
| 2006/0173859 A1 | 8/2006 | Kim et al. |
| 2006/0195695 A1 | 8/2006 | Keys |
| 2006/0200780 A1 | 9/2006 | Iwema et al. |
| 2006/0224895 A1 | 10/2006 | Mayer |
| 2006/0239579 A1 | 10/2006 | Ritter |
| 2006/0256371 A1 | 11/2006 | King et al. |
| 2006/0259783 A1 | 11/2006 | Work et al. |
| 2006/0266839 A1 | 11/2006 | Yavid et al. |
| 2006/0283952 A1 | 12/2006 | Wang |
| 2007/0009245 A1 | 1/2007 | Ito |
| 2007/0050712 A1 | 3/2007 | Hull et al. |
| 2007/0173266 A1 | 7/2007 | Barnes, Jr. |
| 2007/0194119 A1 | 8/2007 | Vinogradov et al. |
| 2007/0219940 A1 | 9/2007 | Mueller et al. |
| 2007/0228306 A1 | 10/2007 | Gannon et al. |
| 2007/0233806 A1 | 10/2007 | Asadi |
| 2007/0238076 A1 | 10/2007 | Burstein et al. |
| 2007/0279711 A1 | 12/2007 | King et al. |
| 2007/0300142 A1 | 12/2007 | King et al. |
| 2008/0023550 A1 | 1/2008 | Yu et al. |
| 2008/0046417 A1 | 2/2008 | Jeffery et al. |
| 2008/0063276 A1 | 3/2008 | Vincent et al. |
| 2008/0072134 A1 | 3/2008 | Balakrishnan et al. |
| 2008/0082903 A1 | 4/2008 | McCurdy et al. |
| 2008/0091954 A1 | 4/2008 | Morris et al. |
| 2008/0093460 A1 | 4/2008 | Frantz et al. |
| 2008/0126415 A1 | 5/2008 | Chaudhury et al. |
| 2008/0137971 A1 | 6/2008 | King et al. |
| 2008/0141117 A1 | 6/2008 | King et al. |
| 2008/0170674 A1 | 7/2008 | Ozden et al. |
| 2008/0172365 A1 | 7/2008 | Ozden et al. |
| 2008/0177825 A1 | 7/2008 | Dubinko et al. |
| 2008/0195664 A1 | 8/2008 | Maharajh et al. |
| 2008/0222166 A1 | 9/2008 | Hultgren et al. |
| 2008/0235093 A1 | 9/2008 | Uland |
| 2008/0313172 A1 | 12/2008 | King et al. |
| 2009/0012806 A1 | 1/2009 | Ricordi et al. |
| 2009/0018990 A1 | 1/2009 | Moraleda |
| 2009/0077658 A1 | 3/2009 | King et al. |
| 2009/0180697 A1* | 7/2009 | Erol et al. ............ 382/218 |
| 2009/0247269 A1 | 10/2009 | Lin et al. |
| 2010/0092095 A1 | 4/2010 | King et al. |
| 2010/0121848 A1 | 5/2010 | Yaroslavskiy et al. |
| 2010/0177970 A1 | 7/2010 | King et al. |
| 2010/0182631 A1 | 7/2010 | King et al. |
| 2010/0183246 A1 | 7/2010 | King et al. |
| 2010/0185538 A1 | 7/2010 | King et al. |
| 2010/0185620 A1 | 7/2010 | Schiller |
| 2010/0278453 A1 | 11/2010 | King et al. |
| 2010/0318797 A1 | 12/2010 | King et al. |
| 2011/0019020 A1 | 1/2011 | King et al. |
| 2011/0019919 A1 | 1/2011 | King et al. |
| 2011/0022940 A1 | 1/2011 | King et al. |
| 2011/0025842 A1 | 2/2011 | King et al. |
| 2011/0026838 A1 | 2/2011 | King et al. |
| 2011/0029443 A1 | 2/2011 | King et al. |
| 2011/0029504 A1 | 2/2011 | King et al. |
| 2011/0033080 A1 | 2/2011 | King et al. |
| 2011/0035289 A1 | 2/2011 | King et al. |
| 2011/0035656 A1 | 2/2011 | King et al. |
| 2011/0035662 A1 | 2/2011 | King et al. |
| 2011/0043652 A1 | 2/2011 | King et al. |
| 2011/0044547 A1 | 2/2011 | King et al. |
| 2011/0072012 A1 | 3/2011 | Ah-Pine et al. |
| 2011/0072395 A1 | 3/2011 | King et al. |
| 2011/0075228 A1 | 3/2011 | King et al. |
| 2011/0078585 A1 | 3/2011 | King et al. |
| 2011/0085211 A1 | 4/2011 | King et al. |
| 2011/0096174 A1 | 4/2011 | King et al. |
| 2011/0209191 A1 | 8/2011 | Shah |
| 2011/0227915 A1 | 9/2011 | Mandella et al. |
| 2011/0295842 A1 | 12/2011 | King et al. |
| 2011/0299125 A1 | 12/2011 | King et al. |
| 2012/0038549 A1 | 2/2012 | Mandella et al. |

FOREIGN PATENT DOCUMENTS

| | | |
|---|---|---|
| EP | 1054335 | 11/2000 |
| EP | 1087305 | 3/2001 |
| EP | 1318659 | 6/2003 |
| GB | 2 366 033 | 2/2002 |
| JP | 06-282375 | 10/1994 |
| JP | 06-289983 | 10/1994 |
| JP | 08-087378 | 4/1996 |
| JP | 10-200804 | 7/1998 |
| JP | 11-212691 | 8/1999 |
| JP | H11-213011 | 8/1999 |
| JP | 2000-123114 | 4/2000 |
| JP | 2000-195735 | 7/2000 |
| JP | 2000-215213 | 8/2000 |
| JP | 2001-345710 | 12/2001 |
| JP | 2004-500635 | 1/2004 |
| JP | 2004-050722 | 2/2004 |
| JP | 2004-102707 | 4/2004 |
| JP | 2004-110563 | 4/2004 |
| KR | 10-2000-0054268 | 9/2000 |
| KR | 10-2000-0054339 | 9/2000 |
| KR | 10-2004-0029895 | 4/2004 |
| KR | 10-2007-0051217 | 5/2007 |

(56) References Cited

FOREIGN PATENT DOCUMENTS

| | | |
|---|---|---|
| KR | 10-0741368 | 7/2007 |
| KR | 10-0761912 | 9/2007 |
| WO | 94/19766 | 9/1994 |
| WO | 98/03923 | 1/1998 |
| WO | 00/56055 | 9/2000 |
| WO | 01/03017 | 1/2001 |
| WO | 01/24051 | 4/2001 |
| WO | 01/33553 | 5/2001 |
| WO | 02/061730 | 8/2002 |
| WO | 2005/096750 | 10/2005 |
| WO | 2005/096755 | 10/2005 |
| WO | 2005/098596 | 10/2005 |
| WO | 2005/098597 | 10/2005 |
| WO | 2005/098598 | 10/2005 |
| WO | 2005/098599 | 10/2005 |
| WO | 2005/098600 | 10/2005 |
| WO | 2005/098601 | 10/2005 |
| WO | 2005/098602 | 10/2005 |
| WO | 2005/098603 | 10/2005 |
| WO | 2005/098604 | 10/2005 |
| WO | 2005/098605 | 10/2005 |
| WO | 2005/098606 | 10/2005 |
| WO | 2005/098607 | 10/2005 |
| WO | 2005/098609 | 10/2005 |
| WO | 2005/098610 | 10/2005 |
| WO | 2005/101192 | 10/2005 |
| WO | 2005/101193 | 10/2005 |
| WO | 2005/106643 | 11/2005 |
| WO | 2005/114380 | 12/2005 |
| WO | 2006/014727 | 2/2006 |
| WO | 2006/023715 | 3/2006 |
| WO | 2006/023717 | 3/2006 |
| WO | 2006/023718 | 3/2006 |
| WO | 2006/023806 | 3/2006 |
| WO | 2006/023937 | 3/2006 |
| WO | 2006/026188 | 3/2006 |
| WO | 2006/029259 | 3/2006 |
| WO | 2006/036853 | 4/2006 |
| WO | 2006/037011 | 4/2006 |
| WO | 2006/093971 | 9/2006 |
| WO | 2006/124496 | 11/2006 |
| WO | 2007/141020 | 12/2007 |
| WO | 2008/014255 | 1/2008 |
| WO | 2008/028674 | 3/2008 |
| WO | 2008/031625 | 3/2008 |
| WO | 2008/072874 | 6/2008 |
| WO | 2010/096191 | 8/2010 |
| WO | 2010/096192 | 8/2010 |
| WO | 2010/096193 | 8/2010 |
| WO | 2010/105244 | 9/2010 |
| WO | 2010/105245 | 9/2010 |
| WO | 2010/105246 | 9/2010 |
| WO | 2010/108159 | 9/2010 |

OTHER PUBLICATIONS

Brin et al., "The Anatomy of a Large-Scale Hyper textual Web Search Engine," Computer Networks and ISDN Systems, Vo. 30, Issue 1-7, Apr. 1, 1998, pp. 1-22.
King et al., U.S. Appl. No. 13/186,908, filed Jul. 20, 2011, all pages.
King et al., U.S. Appl. No. 13/253,632, filed Oct. 5, 2011, all pages.
Bagley, et al., Editing Images of Text, Communications of the ACM, 37(12):63-72 (Dec. 1994).
Bahl, et al., "Font Independent Character Recognition by Cryptanalysis," IBM Technical Disclosure Bulletin, vol. 24, No. 3, pp. 1588-1589 (Aug. 1, 1981).
Ramesh, R.S. et al., "An Automated Approach to Solve Simple Substitution Ciphers," Cryptologia, vol. 17. No. 2, pp. 202-218 (1993).
Nagy et al., "Decoding Substitution Ciphers by Means of Word Matching with Application to OCR," IEEE Transactions on Pattern Analysis and Machine Intelligence, vol. 30, No. 5, pp. 710-715 (Sep. 1, 1987).
Wood et al., "Implementing a faster string search algorithm in Ada," CM Sigada Ada Letters, vol. 8, No. 3, pp. 87-97 (Apr. 1, 1988).
Garain et al., "Compression of Scan-Digitized Indian Language Printed Text: A Soft Pattern Matching Technique," Proceedings of the 2003 ACM Symposium on Document Engineering, pp. 185-192 (Jan. 1, 2003).
Brickman et al., "Word Autocorrelation Redundancy Match (WARM) Technology," IBM J. Res. Develop., 26(6):681-686 (Nov. 1982).
Casey et al., "An Autonomous Reading Machine," IEEE Transactions on Computers, V. C-17, No. 5, pp. 492-503, May 1968.
Computer Hope, "Creating a link without an underline in HTML:," as evidenced by Internet Archive Wayback Machine: http://web.archive.org/web/20010329222623/http://www.computerhope.com/iss- ues/ch000074.htm, Mar. 29, 2001.
D.P. Curtain, "Image Sensors—Capturing the Photograph," 2006, available at http://www.shortcourses.com/how/sensors/sensors.htm, (last visited Sep. 4, 2006).
Fehrenbacher, Katie, "Quick Frucall Could Save You Pennies or $$$)", GigaOM, http://gigaom.com/2006/07/10/frucall (Jul. 10, 2006).
Feldman, Susan, "The Answer Machine," The Magazine for Database Professional, 8(1):58 (Jan. 2000).
Ghaly et al., SAMS Teach Yourself EJB in 21 days, Sams Publishing, 2002-2003 (pp. 1-2, 123 and 135).
Newman et al. "Camworks: A Video-Based Tool for Efficient Capture from Paper Source Documents," Proceedings of the 1999 IEEE International Conference on Multimedia Computing and Systems, vol. 2, pp. 647-653 (1999).
Price et al., "Linking by Inking: Trailblazing in a Paper-like Hypertext," Proceedings of Hypertext '98, Pittsburgh, PA: ACM Press, pp. 30-39 (1998).
Sarre et al. "HyperTex—A system for the automatic generation of Hypertext Textbooks from Linear Texts," Database and Expert Systems Applications, Proceedings of the International Conference, Abstract (1990).
Solutions Software Corp., "Environmental Code of Federal Regulations (CFRs) including TSCA and SARA," Solutions Software Corp., Enterprise, FL Abstract (Apr. 1994).
European Search Report for EP Application No. 05731509 dated Apr. 23, 2009.
European Search Report for EP Application No. 05732913 dated Mar. 31, 2009.
European Search Report for EP Application No. 05733191 dated Apr. 23, 2009.
European Search Report for EP Application No. 05733819 dated Mar. 31, 2009.
European Search Report for EP Application No. 05733851 dated Sep. 2, 2009.
European Search Report for EP Application No. 05733915 dated Dec. 30, 2009.
European Search Report for EP Application No. 05734996 dated Mar. 23, 2009.
European Search Report for EP Application No. 05735008 dated Feb. 16, 2011.
European Search Report for EP Application No. 05737714 dated Mar. 31, 2009.
European Search Report for EP Application No. 05734796 dated Apr. 22, 2009.
European Search Report for EP Application No. 05734947 dated Mar. 20, 2009.
European Search Report for EP Application No. 05742065 dated Mar. 23, 2009.
European Search Report for EP Application No. 05745611 dated Mar. 23, 2009.
European Search Report for EP Application No. 05746428 dated Mar. 24, 2009.
European Search Report for EP Application No. 05746830 dated Mar. 23, 2009.
European Search Report for EP Application No. 05753019 dated Mar. 31, 2009.
European Search Report for EP Application No. 05789280 dated Mar. 23, 2009.
European Search Report for EP Application No. 05812073 dated Mar. 23, 2009.

(56) References Cited

OTHER PUBLICATIONS

European Search Report for EP Application No. 07813283 dated Dec. 10, 2010.
International Search Report for PCT/EP2007/005038 dated Sep. 17, 2007.
International Search Report for PCT/EP2007/007824 dated May 25, 2009.
International Search Report for PCT/EP2007/008075 dated Oct. 10, 2008.
International Search Report for PCT/US2005/011012 dated Sep. 29, 2006.
International Search Report for PCT/US2005/011013 dated Oct. 19, 2007.
International Search Report for PCT/US2005/011014 dated May 16, 2007.
International Search Report for PCT/US2005/011015 dated Dec. 1, 2006.
International Search Report for PCT/US2005/011016 dated May 29, 2007.
International Search Report for PCT/US2005/011017 dated Jul. 15, 2008.
International Search Report for PCT/US2005/011026 dated Jun. 11, 2007.
International Search Report for PCT/US2005/011042 dated Sep. 10, 2007.
International Search Report for PCT/US2005/011043 dated Sep. 20, 2007.
International Search Report for PCT/US2005/011084 dated Aug. 8, 2008.
International Search Report for PCT/US2005/011085 dated Sep. 14, 2006.
International Search Report for PCT/US2005/011088 dated Aug. 29, 2008.
International Search Report for PCT/US2005/011089 dated Jul. 8, 2008.
International Search Report for PCT/US2005/011090 dated Sep. 27, 2006.
International Search Report for PCT/US2005/011533 dated Jun. 4, 2007.
International Search Report for PCT/US2005/011534 dated Nov. 9, 2006.
International Search Report for PCT/US2005/012510 dated Jan. 6, 2011.
International Search Report for PCT/US2005/013297 dated Aug. 14, 2007.
International Search Report for PCT/US2005/013586 dated Aug. 7, 2009.
International Search Report for PCT/US2005/017333 dated Jun. 4, 2007.
International Search Report for PCT/US2005/025732 dated Dec. 5, 2005.
International Search Report for PCT/US2005/029536 dated Apr. 19, 2007.
International Search Report for PCT/US2005/029537 dated Sep. 28, 2007.
International Search Report for PCT/US2005/029539 dated Sep. 29, 2008.
International Search Report for PCT/US2005/029680 dated Jul. 13, 2010.
International Search Report for PCT/US2005/030007 dated Mar. 11, 2008.
International Search Report for PCT/US2005/029534 dated May 15, 2007.
International Search Report for PCT/US2005/034319 dated Apr. 17, 2006.
International Search Report for PCT/US2005/034734 dated Apr. 4, 2006.
International Search Report for PCT/US2006/007108 dated Oct. 30, 2007.
International Search Report for PCT/US2006/018198 dated Sep. 25, 2007.
International Search Report for PCT/US2007/074214 dated Sep. 9, 2008.
International Search Report for PCT/US2010/000497 dated Sep. 27, 2010.
International Search Report for PCT/US2010/000498 dated Aug. 2, 2010.
International Search Report for PCT/US2010/000499 dated Aug. 31, 2010.
International Search Report for PCT/US2010/027254 dated Oct. 22, 2010.
International Search Report for PCT/US2010/027255 dated Nov. 16, 2010.
International Search Report for PCT/US2010/027256 dated Nov. 15, 2010.
International Search Report for PCT/US2010/028066 dated Oct. 26, 2010.
Non-Final Office Action for U.S. Appl. No. 11/004,637 dated Dec. 21, 2007.
Final Office Action for U.S. Appl. No. 11/004,637 dated Oct. 2, 2008.
Non-Final Office Action for U.S. Appl. No. 11/004,637 dated Apr. 2, 2009.
Notice of Allowance for U.S. Appl. No. 11/004,637 dated Dec. 11, 2009.
Non-Final Office Action for U.S. Appl. No. 11/096,704 dated Sep. 10, 2008.
Notice of Allowance for U.S. Appl. No. 11/096,704 dated Mar. 11, 2009.
Notice of Allowance for U.S. Appl. No. 11/096,704 dated Jun. 5, 2009.
Non- Final Office Action for U.S. Appl. No. 11/097,089 dated Aug. 13, 2008.
Final Office Action for U.S. Appl. No. 11/097,089 dated Mar. 17, 2009.
Non-Final Office Action for U.S. Appl. No. 11/097,089 dated Dec. 23, 2009.
Final Office Action for U.S. Appl. No. 11/097,089 dated Sep. 23, 2010.
Non-Final Office Action for U.S. Appl. No. 11/097,089 dated Apr. 7, 2011.
Non-Final Office Action for U.S. Appl. No. 11/097,093 dated Jul. 10, 2007.
Non-Final Office Action for U.S. Appl. No. 11/097,103 dated Jun. 25, 2007.
Non-Final Office Action for U.S. Appl. No. 11/097,103 dated Jan. 28, 2008.
Non-Final Office Action for U.S. Appl. No. 11/097,103 dated Dec. 31, 2008.
Notice of Allowance for U.S. Appl. No. 11/097,103 dated May 14, 2009.
Final Office Action for U.S. Appl. No. 11/097,828 dated Feb. 4, 2009.
Notice of Allowance for U.S. Appl. No. 11/097,828 dated Feb. 5, 2010.
Final Office Action for U.S. Appl. No. 11/097,833 dated Jul. 7, 2009.
Notice of Allowance for U.S. Appl. No. 11/097,833 dated Jan. 10, 2011.
Non- Final Office Action for U.S. Appl. No. 11/097,835 dated Oct. 9, 2007.
Non- Final Office Action for U.S. Appl. No. 11/097,835 dated Feb. 19, 2009.
Final Office Action for U.S. Appl. No. 11/097,835 dated Dec. 29, 2009.
Notice of Allowance for U.S. Appl. No. 11/097,835 dated Sep. 1, 2010.
Final Office Action for U.S. Appl. No. 11/097,836 dated Jan. 6, 2009.
Non-Final Office Action for U.S. Appl. No. 11/097,836 dated Jul. 30, 2009.
Final Office Action for U.S. Appl. No. 11/097,836 dated May 13, 2010.
Non-Final Office Action for U.S. Appl. No. 11/097,961 dated Sep. 15, 2008.

(56) References Cited

OTHER PUBLICATIONS

Non-Final Office Action for U.S. Appl. No. 11/097,961 dated Mar. 5, 2009.
Final Office Action for U.S. Appl. No. 11/097,961 dated Dec. 9, 2009.
Non-Final Office Action for U.S. Appl. No. 11/097,961 dated Jul. 9, 2010.
Non-Final Office Action for U.S. Appl. No. 11/097,981 dated Jan. 16, 2009.
Notice of Allowance for U.S. Appl. No. 11/097,981 dated Jul. 31, 2009.
Final Office Action for U.S. Appl. No. 11/098,014 dated Jan. 23, 2009.
Non-Final Office Action for U.S. Appl. No. 11/098,014 dated Jun. 30, 2009.
Final Office Action for U.S. Appl. No. 11/098,014 dated Mar. 26, 2010.
Non-Final Office Action for U.S. Appl. No. 11/098,014 dated Nov. 3, 2010.
Notice of Allowance for U.S. Appl. No. 11/098,014 dated Mar. 16, 2011.
Non-Final Office Action for U.S. Appl. No. 11/098,016 dated Apr. 24, 2007.
Notice of Allowance for U.S. Appl. No. 11/098,016 dated Apr. 22, 2008.
Non-Final Office Action for U.S. Appl. No. 11/098,038 dated Aug. 28, 2006.
Final Office Action for U.S. Appl. No. 11/098,038 dated Jun. 7, 2007.
Notice of Allowance for U.S. Appl. No. 11/098,038 dated Mar. 11, 2009.
Notice of Allowance for U.S. Appl. No. 11/098,038 dated May 29, 2009.
Non-Final Office Action for U.S. Appl. No. 11/098,042 dated Dec. 5, 2008.
Notice of Allowance for U.S. Appl. No. 11/098,042 dated Apr. 13, 2009.
Non- Final Office Action for U.S. Appl. No. 11/098,043 dated Jul. 23, 2007.
Non-Final Office Action for U.S. Appl. No. 11/098,043 dated Dec. 23, 2008.
Final Office Action for U.S. Appl. No. 11/098,043 dated Jul. 21, 2009.
Non-Final Office Action for U.S. Appl. No. 11/110,353 dated Jul. 27, 2007.
Final Office Action for U.S. Appl. No. 11/110,353 dated Jan. 6, 2009.
Non-Final Office Action for U.S. Appl. No. 11/110,353 dated Sep. 15, 2009.
Notice of Allowance for U.S. Appl. No. 11/110,353 dated Dec. 2, 2009.
Non-Final Office Action for U.S. Appl. No. 11/131,945 dated Jan. 8, 2009.
Notice of Allowance for U.S. Appl. No. 11/131,945 dated Oct. 30, 2009.
Non-Final Office Action for U.S. Appl. No. 11/185,908 dated Dec. 14, 2009.
Final Office Action for U.S. Appl. No. 11/185,908 dated Jun. 28, 2010.
Non- Final Office Action for U.S. Appl. No. 11/208,408 dated Oct. 7, 2008.
Final Office Action for U.S. Appl. No. 11/208,408 dated May 11, 2009.
Non-Final Office Action for U.S. Appl. No. 11/208,408 dated Apr. 23, 2010.
Non-Final Office Action for U.S. Appl. No. 11/208,457 dated Oct. 9, 2007.
Non-Final Office Action for U.S. Appl. No. 11/208,458 dated Mar. 21, 2007.
Notice of Allowance for U.S. Appl. No. 11/208,458 dated Jun. 2, 2008.
Non-Final Office Action for U.S. Appl. No. 11/208,461 dated Sep. 29, 2009.
Non-Final Office Action for U.S. Appl. No. 11/208,461 dated Nov. 3, 2010.
Notice of Allowance for U.S. Appl. No. 11/208,461 dated Mar. 15, 2011.
Non-Final Office Action for U.S. Appl. No. 11/209,333 dated Apr. 29, 2010.
Notice of Allowance for U.S. Appl. No. 11/210,260 dated Jan. 13, 2010.
Non-Final Office Action for U.S. Appl. No. 11/236,330 dated Dec. 2, 2009.
Notice of Allowance for U.S. Appl. No. 11/236,330 dated Jun. 22, 2010.
Non- Final Office Action for U.S. Appl. No. 11/236,440 dated Jan. 22, 2009.
Final Office Action for U.S. Appl. No. 11/236,440 dated Jul. 22, 2009.
Non-Final Office Action for U.S. Appl. No. 11/365,983 dated Jan. 26, 2010.
Final Office Action for U.S. Appl. No. 11/365,983 dated Sep. 14, 2010.
Non-Final Office Action for U.S. Appl. No. 11/547,835 dated Dec. 29, 2010.
Non-Final Office Action for U.S. Appl. No. 11/672,014 dated May 6, 2010.
Notice of Allowance for U.S. Appl. No. 11/672,014 dated Feb. 28, 2011.
Non-Final Office Action for U.S. Appl. No. 11/758,866 dated Jun. 14, 2010.
Non-Final Office Action for U.S. Appl. No. 11/972,562 dated Apr. 21, 2010.
Non-Final Office Action for U.S. Appl. No. 12/538,731 dated Jun. 28, 2010.
Notice of Allowance for U.S. Appl. No. 12/538,731 dated Oct. 18, 2010.
Non-Final Office Action for U.S. Appl. No. 12/541,891 dated Dec. 9, 2010.
Non-Final Office Action fo U.S. Appl. No. 12/542,816 dated Jun. 18, 2010.
Notice of Allowance for U.S. Appl. No. 12/542,816 dated Jan. 3, 2011.
Notice of Allowance for U.S. Appl. No. 12/542,816 dated Apr. 27, 2011.
Non-Final Office Action for U.S. Appl. No. 12/721,456 dated Mar. 1, 2011.
Non-Final Office Action for U.S. Appl. No. 12/887,473 dated Feb. 4, 2011.
Non-Final Office Action for U.S. Appl. No. 12/889,321 dated Mar. 31, 2011.
Non-Final Office Action for U.S. Appl. No. 12/904,064 dated Mar. 30, 2011.
King et al., U.S. Appl. No. 11/432,731, filed May 11, 2006.
King et al., U.S. Appl. No. 11/933,204, filed Oct. 31, 2007.
King et al., U.S. Appl. No. 11/952,885, filed Dec. 7, 2007.
King et al., U.S. Appl. No. 12/517,352, filed Jun. 2, 2009.
King et al., U.S. Appl. No. 12/517,541, filed Jun. 3, 2009.
King et al., U.S. Appl. No. 12/728,144, filed Mar. 19, 2010.
King et al., U.S. Appl. No. 12/831,213, filed Jul. 6, 2010.
King et al., U.S. Appl. No. 12/884,139, filed Sep. 16, 2010.
King et al., U.S. Appl. No. 12/894,059, filed Sep. 29, 2010.
King et al., U.S. Appl. No. 12/902,081, filed Oct. 11, 2010.
King et al., U.S. Appl. No. 12/904,064, filed Oct. 13, 2010.
King et al., U.S. Appl. No. 12/961,407, filed Dec. 6, 2010.
King et al., U.S. Appl. No. 12/964,662, filed Dec. 9, 2010.
King et al., U.S. Appl. No. 13/031,316, filed Feb. 21, 2011.
King et al., U.S. Appl. No. 13/614,770, filed Sep. 13, 2012, 102 pages.
King et al., U.S. Appl. No. 13/614,473, filed Sep. 13, 2012, 120 pages.
King et al., U.S. Appl. No. 13/615,517, filed Sep. 13, 2012, 114 pages.

* cited by examiner

*FIG. 32*

| document sequence number | scanned text | annotation |
|---|---|---|
| 1 | idealized husbandry practices | add citation to Huff reference |
| 1 | Seattle Zoo | Woodland Park Zoo |
| 2 | advancing the agrarian cause | consider replacing agrarian with synonym | annotation table — 3200
3201
3202
3203
3211
3212
3213

HANDHELD DEVICE FOR CAPTURING TEXT FROM BOTH A DOCUMENT PRINTED ON PAPER AND A DOCUMENT DISPLAYED ON A DYNAMIC DISPLAY DEVICE

CROSS-REFERENCE TO RELATED APPLICATIONS

This application is a continuation of U.S. patent application Ser. No. 11/236,330, filed Sep. 27, 2005, now U.S. Pat. No. 7,812,860 entitled HANDHELD DEVICE FOR CAPTURING TEXT FROM BOTH A DOCUMENT PRINTED ON PAPER AND A DOCUMENT DISPLAYED ON A DYNAMIC DISPLAY DEVICE, which is a Continuation-In-Part of the following, each of which is hereby incorporated by reference in its entirety: U.S. patent application Ser. No. 11/004,637 filed on Dec. 3, 2004, now U.S. Pat. No. 7,707,039 U.S. patent application Ser. No. 11/097,961, filed Apr. 1, 2005, entitled METHODS AND SYSTEMS FOR INITIATING APPLICATION PROCESSES BY DATA CAPTURE FROM RENDERED DOCUMENTS, U.S. patent application Ser. No. 11/097,093, filed Apr. 1, 2005, entitled DETERMINING ACTIONS INVOLVING CAPTURED INFORMATION AND ELECTRONIC CONTENT ASSOCIATED WITH RENDERED DOCUMENTS, U.S. patent application Ser. No. 11/098,038, filed Apr. 1, 2005, entitled CONTENT ACCESS WITH HANDHELD DOCUMENT DATA CAPTURE DEVICES, U.S. patent application Ser. No. 11/098,014, filed Apr. 1, 2005, entitled SEARCH ENGINES AND SYSTEMS WITH HANDHELD DOCUMENT DATA CAPTURE DEVICES, U.S. patent application Ser. No. 11/097,103, filed Apr. 1, 2005, entitled TRIGGERING ACTIONS IN RESPONSE TO OPTICALLY OR ACOUSTICALLY CAPTURING KEYWORDS FROM A RENDERED DOCUMENT, U.S. patent application Ser. No. 11/098,043, filed Apr. 1, 2005, entitled SEARCHING AND ACCESSING DOCUMENTS ON PRIVATE NETWORKS FOR USE WITH CAPTURES FROM RENDERED DOCUMENTS, U.S. patent application Ser. No. 11/097,981, filed Apr. 1, 2005, entitled INFORMATION GATHERING SYSTEM AND METHOD, U.S. patent application Ser. No. 11/097,089, filed Apr. 1, 2005, entitled DOCUMENT ENHANCEMENT SYSTEM AND METHOD, U.S. patent application Ser. No. 11/097,835, filed Apr. 1, 2005, entitled PUBLISHING TECHNIQUES FOR ADDING VALUE TO A RENDERED DOCUMENT, U.S. patent application Ser. No. 11/098,016, filed Apr. 1, 2005, entitled ARCHIVE OF TEXT CAPTURES FROM RENDERED DOCUMENTS, U.S. patent application Ser. No. 11/097,828, filed Apr. 1, 2005, entitled ADDING INFORMATION OR FUNCTIONALITY TO A RENDERED DOCUMENT VIA ASSOCIATION WITH AN ELECTRONIC COUNTERPART, U.S. patent application Ser. No. 11/097,833, filed Apr. 1, 2005, entitled AGGREGATE ANALYSIS OF TEXT CAPTURES PERFORMED BY MULTIPLE USERS FROM RENDERED DOCUMENTS, U.S. patent application Ser. No. 11/097,836, filed Apr. 1, 2005, entitled ESTABLISHING AN INTERACTIVE ENVIRONMENT FOR RENDERED DOCUMENTS, U.S. patent application Ser. No. 11/098,042, filed Apr. 1, 2005, entitled DATA CAPTURE FROM RENDERED DOCUMENTS USING HANDHELD DEVICE, U.S. patent application Ser. No. 11/096,704, filed Apr. 1, 2005, entitled CAPTURING TEXT FROM RENDERED DOCUMENTS USING SUPPLEMENTAL INFORMATION, U.S. patent application Ser. No. 11/110,353, filed Apr. 19, 2005, entitled PROCESSING TECHNIQUES FOR VISUAL CAPTURE DATA FROM A RENDERED DOCUMENT, U.S. patent application Ser. No. 11/131,945, filed May 17, 2005, entitled PROCESSING TECHNIQUES FOR TEXT CAPTURE FROM A RENDERED DOCUMENT, U.S. patent application Ser. No. 11/185,908, filed Jul. 19, 2005, entitled AUTOMATIC MODIFICATION OF WEB PAGES, U.S. patent application Ser. No. 11/208,408, filed Aug. 18, 2005, entitled SCANNER HAVING CONNECTED AND UNCONNECTED OPERATIONAL BEHAVIORS, U.S. patent application Ser. No. 11/208,457, filed Aug. 18, 2005, entitled LOCATING ELECTRONIC INSTANCES OF DOCUMENTS BASED ON RENDERED INSTANCES, DOCUMENT FRAGMENT DIGEST GENERATION, AND DIGEST BASED DOCUMENT FRAGMENT DETERMINATION, U.S. patent application Ser. No. 11/208,458, filed Aug. 18, 2005, entitled METHODS, SYSTEMS AND COMPUTER PROGRAM PRODUCTS FOR DATA GATHERING IN A DIGITAL AND HARD COPY DOCUMENT ENVIRONMENT, U.S. patent application Ser. No. 11/208,461, filed Aug. 18, 2005, entitled APPLYING SCANNED INFORMATION TO IDENTIFY CONTENT, U.S. patent application Ser. No. 11/209,333, filed Aug. 23, 2005, entitled A PORTABLE SCANNING DEVICE, U.S. patent application Ser. No. 11/210,260, filed Aug. 23, 2005, entitled A METHOD AND SYSTEM FOR CHARACTER RECOGNITION, International Patent Application No. PCT/US05/11533, filed Apr. 1, 2005, entitled A SYSTEM AND METHOD FOR CHARACTER RECOGNITION, International Patent Application No. PCT/US05/13586, filed Apr. 6, 2005, entitled SCANNING APPARATUS AND RELATED TECHNIQUES, International Patent Application No. PCT/US05/12510, filed Apr. 12, 2005, entitled ADDING VALUE TO A RENDERED DOCUMENT.

This application claims priority to, and incorporates by reference in their entirety, the following U.S. Provisional Patent Applications: Application No. 60/613,243 filed on Sep. 27, 2004, Application No. 60/613,628 filed on Sep. 27, 2004, Application No. 60/613,632 filed on Sep. 27, 2004, Application No. 60/613,589 filed on Sep. 27, 2004, Application No. 60/613,242 filed on Sep. 27, 2004, Application No. 60/613,602 filed on Sep. 27, 2004, Application No. 60/613,340 filed on Sep. 27, 2004, Application No. 60/613,634 filed on Sep. 27, 2004, Application No. 60/613,461 filed on Sep. 27, 2004, Application No. 60/613,455 filed on Sep. 27, 2004, Application No. 60/613,460 filed on Sep. 27, 2004, Application No. 60/613,400 filed on Sep. 27, 2004, Application No. 60/613,456 filed on Sep. 27, 2004, Application No. 60/613,341 filed on Sep. 27, 2004, Application No. 60/613,361 filed on Sep. 27, 2004, Application No. 60/613,454 filed on Sep. 27, 2004, Application No. 60/613,339 filed on Sep. 27, 2004, Application No. 60/613,633 filed on Sep. 27, 2004, Application No. 60/615,378 filed on Oct. 1, 2004, Application No. 60/615,112 filed on Oct. 1, 2004, Application No. 60/615,538 filed on Oct. 1, 2004, Application No. 60/617,122 filed on Oct. 7, 2004, Application No. 60/622,906 filed on Oct. 28, 2004, Application No. 60/633,452 filed on Dec. 6, 2004, Application No. 60/633,678 filed on Dec. 6, 2004, Application No. 60/633,486 filed on Dec. 6, 2004, Application No. 60/633,453 filed on Dec. 6, 2004, Application No. 60/634,627 filed on Dec. 9, 2004, Application No. 60/634,739 filed on Dec. 9, 2004, Application No. 60/647,684 filed on Jan. 26, 2005, Application No. 60/648,746 filed on Jan. 31, 2005, Application No. 60/653,372 filed on Feb. 15, 2005, Application No. 60/653,663 filed on Feb. 16, 2005, Application No. 60/653,669 filed on Feb. 16, 2005, Application No. 60/653,899 filed on Feb. 16, 2005, Application No. 60/653,679 filed on Feb. 16, 2005, Application No. 60/653,847 filed on Feb. 16, 2005, Application No. 60/654,379 filed on Feb. 17, 2005, Application No. 60/654,368 filed on Feb. 18, 2005, Application No. 60/654,326 filed on Feb. 18, 2005, Application No. 60/654,196 filed on Feb. 18, 2005, Application No. 60/655,279 filed on Feb. 22, 2005, Application No. 60/655,280 filed on Feb. 22, 2005, Application No. 60/655,987 filed on Feb. 22, 2005, Application No. 60/655,697 filed on Feb. 22, 2005, Application No. 60/655,281 filed on Feb. 22, 2005, and Application No. 60/657,309 filed on Feb. 28, 2005.

This application incorporates by reference in their entirety, the following U.S. Provisional Patent Applications: Application No. 60/604,103 filed on Aug. 23, 2004, Application No. 60/604,098 filed on Aug. 23, 2004, Application No. 60/604,100 filed on Aug. 23, 2004, Application No. 60/604,102 filed on Aug. 23, 2004, Application No. 60/605,229 filed on Aug. 27, 2004, Application No. 60/605,105 filed on Aug. 27, 2004; Application No. 60/563,520 filed on Apr. 19, 2004, Application No. 60/563,485 filed on Apr. 19, 2004, Application No. 60/564,688 filed on Apr. 23, 2004, Application No. 60/564,846 filed on Apr. 23, 2004, Application No. 60/566,667 filed on Apr. 30, 2004, Application No. 60/571,381 filed on May 14, 2004, Application No. 60/571,560 filed on May 14, 2004, Application No. 60/571,715 filed on May 17, 2004, Application No. 60/589,203 filed on Jul. 19, 2004, Application No. 60/589,201 filed on Jul. 19, 2004, Application No. 60/589,202 filed on Jul. 19, 2004, Application No. 60/598,821 filed on Aug. 2, 2004, Application No. 60/602,956 filed on Aug. 18, 2004, Application No. 60/602,925 filed on Aug. 18, 2004, Application No. 60/602,947 filed on Aug. 18, 2004, Application No. 60/602,897 filed on Aug. 18, 2004, Application No. 60/602,896 filed on Aug. 18, 2004, Application No. 60/602,930 filed on Aug. 18, 2004, Application No. 60/602,898 filed on Aug. 18, 2004, Application No. 60/603,466 filed on Aug. 19, 2004, Application No. 60/603,082 filed on Aug. 19, 2004, Application No. 60/603,081 filed on Aug. 19, 2004, Application No. 60/603,498 filed on Aug. 20, 2004, Application No. 60/603,358 filed on Aug. 20, 2004.

TECHNICAL FIELD

This disclosure relates generally to portable data capturing devices and, more particularly, relates to portable devices having the ability to capture an image and/or an audio clip.

BACKGROUND

Paper documents have an enduring appeal, as can be seen by the proliferation of paper documents in the computer age. It has never been easier to print and publish paper documents than it is today. Paper documents prevail even though electronic documents are easier to duplicate, transmit, search and edit.

Given the popularity of paper documents and the advantages of electronic documents, it would be useful to combine the benefits of both.

BRIEF DESCRIPTION OF THE DRAWINGS

FIG. 32 is a table diagram showing a sample annotation table used by the system to represent annotations inputted by the user.

DETAILED DESCRIPTION

Overview

Figure 1:
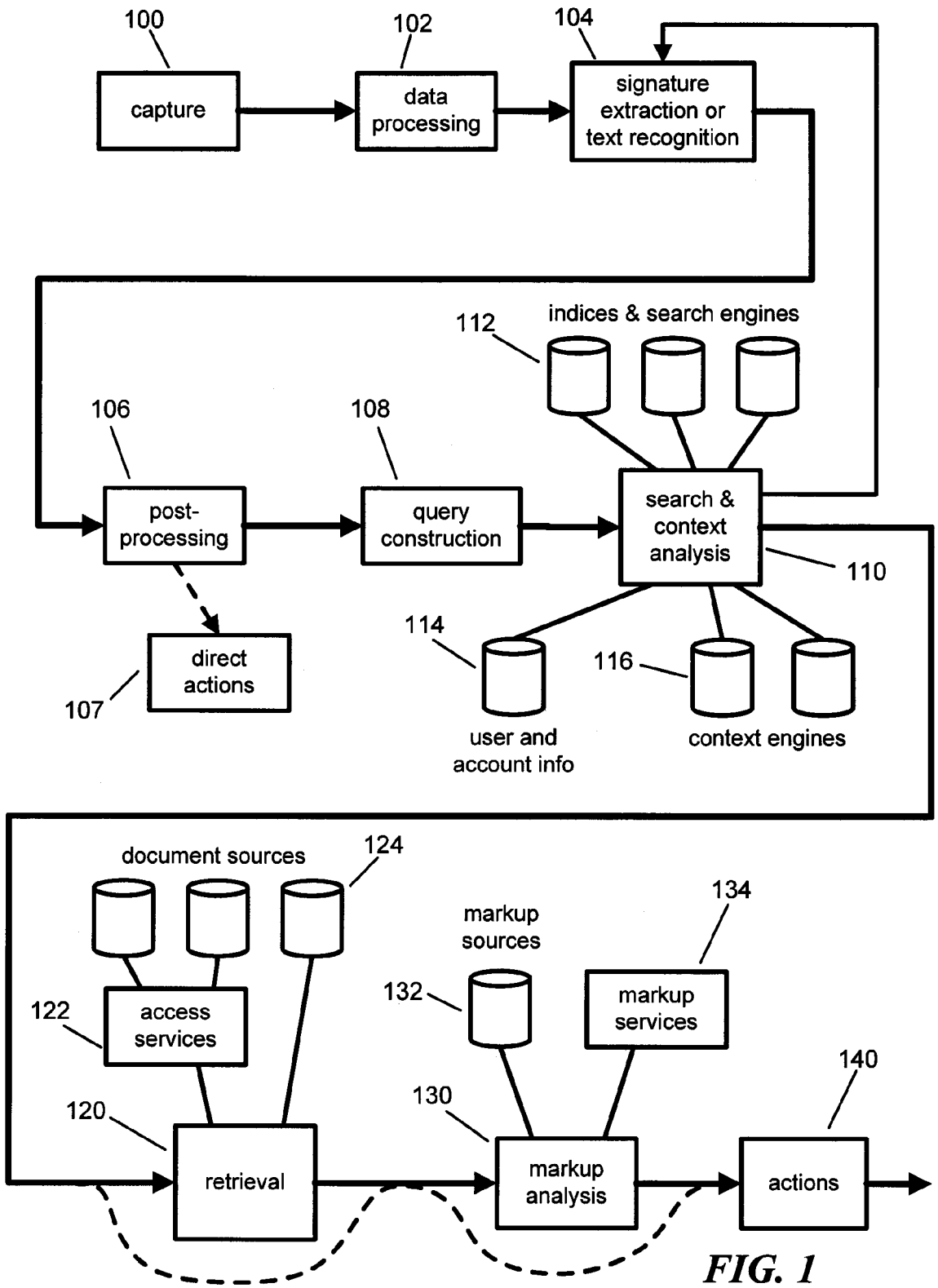
FIG. 1 is a data flow diagram that illustrates the flow of information in one embodiment of the core system.

A portable device for capturing and acting on text contained in a rendered document ("the device") is described, in some cases as part of a more extensive system for processing text captured with the portable device ("the system").

As is discussed in greater detail below, the device is designed to enable a user to capture text by passing the device over the text, whether it is text included in a document that is printed on paper or text included in a document that is displayed on a dynamic display device such as a computer monitor.

Part I—Introduction

1. Nature of the System

For every paper document that has an electronic counterpart, there exists a discrete amount of information in the paper document that can identify the electronic counterpart. In some embodiments, the system uses a sample of text captured from a paper document, for example using a handheld scanner, to identify and locate an electronic counterpart of the document. In most cases, the amount of text needed by the facility is very small in that a few words of text from a document can often function as an identifier for the paper document and as a link to its electronic counterpart. In addition, the system may use those few words to identify not only the document, but also a location within the document.

Thus, paper documents and their digital counterparts can be associated in many useful ways using the system discussed herein.

1.1. A Quick Overview of the Future

Once the system has associated a piece of text in a paper document with a particular digital entity has been established, the system is able to build a huge amount of functionality on that association.

It is increasingly the case that most paper documents have an electronic counterpart that is accessible on the World Wide Web or from some other online database or document corpus, or can be made accessible, such as in response to the payment of a fee or subscription. At the simplest level, then, when a user scans a few words in a paper document, the system can retrieve that electronic document or some part of it, or display it, email it to somebody, purchase it, print it or post it to a web page. As additional examples, scanning a few words of a book that a person is reading over breakfast could cause the audio-book version in the person's car to begin reading from that point when s/he starts driving to work, or scanning the serial number on a printer cartridge could begin the process of ordering a replacement.

The system implements these and many other examples of "paper/digital integration" without requiring changes to the current processes of writing, printing and publishing documents, giving such conventional rendered documents a whole new layer of digital functionality.

1.2. Terminology

A typical use of the system begins with using an optical scanner to scan text from a paper document, but it is important to note that other methods of capture from other types of document are equally applicable. The system is therefore sometimes described as scanning or capturing text from a rendered document, where those terms are defined as follows:

A rendered document is a printed document or a document shown on a display or monitor. It is a document that is perceptible to a human, whether in permanent form or on a transitory display.

Scanning or capturing is the process of systematic examination to obtain information from a rendered document. The process may involve optical capture using a scanner or camera (for example a camera in a cellphone), or it may involve reading aloud from the document into an audio capture device or typing it on a keypad or keyboard. For more examples, see Section 15.

2. Introduction to the System

This section describes some of the devices, processes and systems that constitute a system for paper/digital integration. In various embodiments, the system builds a wide variety of services and applications on this underlying core that provides the basic functionality.

2.1. The Processes

FIG. 1 is a data flow diagram that illustrates the flow of information in one embodiment of the core system. Other embodiments may not use all of the stages or elements illustrated here, while some will use many more.

Text from a rendered document is captured 100, typically in optical form by an optical scanner or audio form by a voice recorder, and this image or sound data is then processed 102, for example to remove artifacts of the capture process or to improve the signal-to-noise ratio. A recognition process 104 such as OCR, speech recognition, or autocorrelation then converts the data into a signature, comprised in some embodiments of text, text offsets, or other symbols. Alternatively, the system performs an alternate form of extracting document signature from the rendered document. The signature represents a set of possible text transcriptions in some embodiments. This process may be influenced by feedback from other stages, for example, if the search process and context analysis 110 have identified some candidate documents from which the capture may originate, thus narrowing the possible interpretations of the original capture.

A post-processing 106 stage may take the output of the recognition process and filter it or perform such other operations upon it as may be useful. Depending upon the embodiment implemented, it may be possible at this stage to deduce some direct actions 107 to be taken immediately without reference to the later stages, such as where a phrase or symbol has been captured which contains sufficient information in itself to convey the user's intent. In these cases no digital counterpart document need be referenced, or even known to the system.

Typically, however, the next stage will be to construct a query 108 or a set of queries for use in searching. Some aspects of the query construction may depend on the search process used and so cannot be performed until the next stage, but there will typically be some operations, such as the removal of obviously misrecognized or irrelevant characters, which can be performed in advance.

The query or queries are then passed to the search and context analysis stage 110. Here, the system optionally attempts to identify the document from which the original data was captured. To do so, the system typically uses search indices and search engines 112, knowledge about the user 114 and knowledge about the user's context or the context in which the capture occurred 116. Search engine 112 may employ and/or index information specifically about rendered documents, about their digital counterpart documents, and about documents that have a web (internet) presence). It may write to, as well as read from, many of these sources and, as has been mentioned, it may feed information into other stages of the process, for example by giving the recognition system 104 information about the language, font, rendering and likely next words based on its knowledge of the candidate documents.

In some circumstances the next stage will be to retrieve 120 a copy of the document or documents that have been identified. The sources of the documents 124 may be directly accessible, for example from a local filing system or database or a web server, or they may need to be contacted via some access service 122 which might enforce authentication, security or payment or may provide other services such as conversion of the document into a desired format.

Applications of the system may take advantage of the association of extra functionality or data with part or all of a document. For example, advertising applications discussed in Section 10.4 may use an association of particular advertising messages or subjects with portions of a document. This extra associated functionality or data can be thought of as one or more overlays on the document, and is referred to herein as "markup." The next stage of the process 130, then, is to identify any markup relevant to the captured data. Such markup may be provided by the user, the originator, or publisher of the document, or some other party, and may be directly accessible from some source 132 or may be generated by some service 134. In various embodiments, markup can be associated with, and apply to, a rendered document and/or the digital counterpart to a rendered document, or to groups of either or both of these documents.

Lastly, as a result of the earlier stages, some actions may be taken 140. These may be default actions such as simply recording the information found, they may be dependent on the data or document, or they may be derived from the markup analysis. Sometimes the action will simply be to pass the data to another system. In some cases the various possible actions appropriate to a capture at a specific point in a rendered document will be presented to the user as a menu on an associated display, for example on a local display 332, on a computer display 212 or a mobile phone or PDA display 216. If the user doesn't respond to the menu, the default actions can be taken.

2.2. The Components

Figure 2:
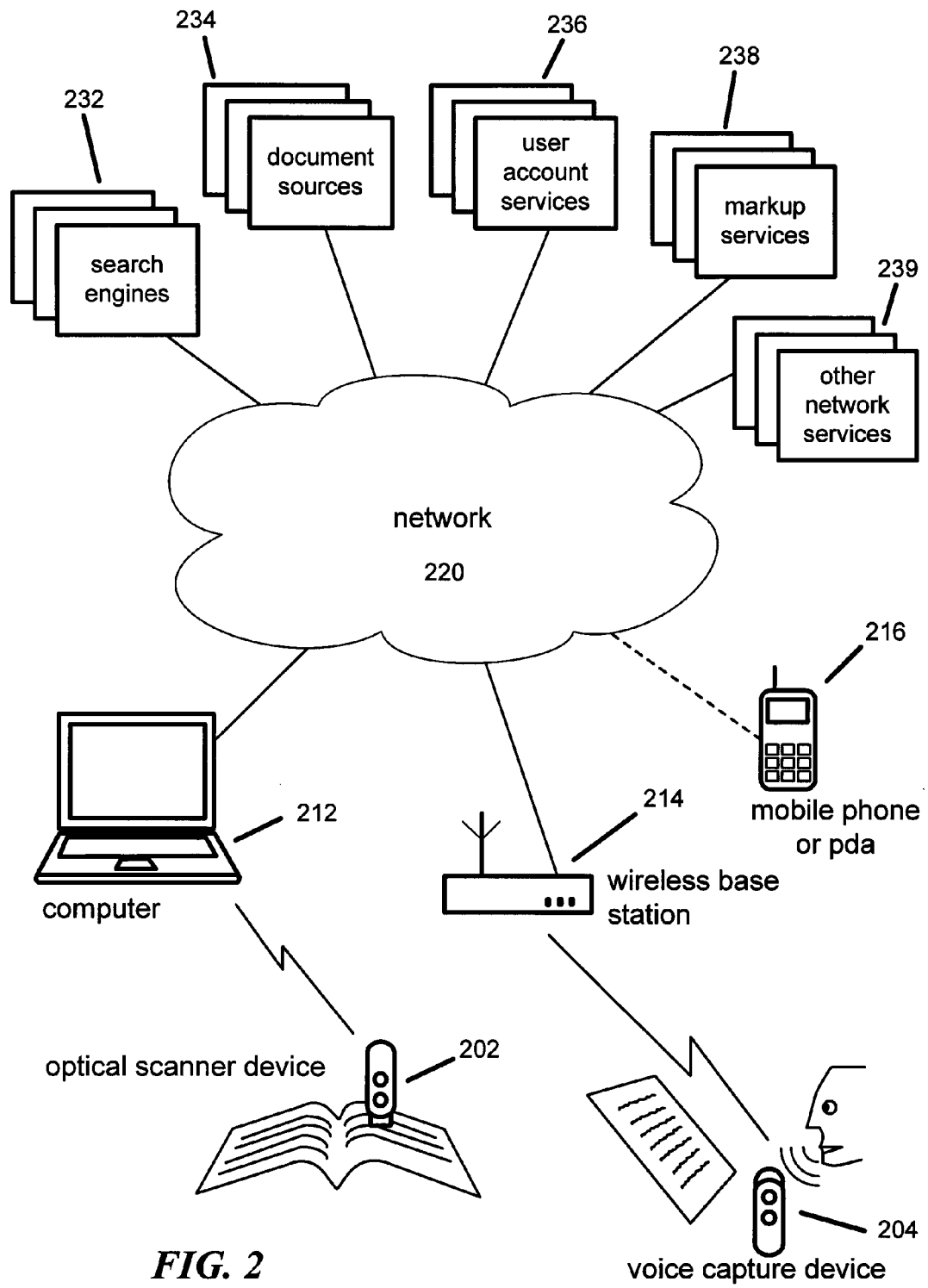
FIG. 2 is a component diagram of components included in a typical implementation of the system in the context of a typical operating environment.

FIG. 2 is a component diagram of components included in a typical implementation of the system in the context of a typical operating environment. As illustrated, the operating environment includes one or more optical scanning capture devices 202 or voice capture devices 204. In some embodiments, the same device performs both functions. Each capture device is able to communicate with other parts of the system such as a computer 212 and a mobile station 216 (e.g., a mobile phone or PDA) using either a direct wired or wireless connection, or through the network 220, with which it can communicate using a wired or wireless connection, the latter typically involving a wireless base station 214. In some embodiments, the capture device is integrated in the mobile station, and optionally shares some of the audio and/or optical components used in the device for voice communications and picture-taking.

Computer 212 may include a memory containing computer executable instructions for processing an order from scanning devices 202 and 204. As an example, an order can include an identifier (such as a serial number of the scanning device 202/204 or an identifier that partially or uniquely identifies the user of the scanner), scanning context information (e.g., time of scan, location of scan, etc.) and/or scanned information (such as a text string) that is used to uniquely identify the document being scanned. In alternative embodiments, the operating environment may include more or less components.

Also available on the network 220 are search engines 232, document sources 234, user account services 236, markup services 238 and other network services 239. The network 220 may be a corporate intranet, the public Internet, a mobile phone network or some other network, or any interconnection of the above.

Regardless of the manner by which the devices are coupled to each other, they may all may be operable in accordance with well-known commercial transaction and communication protocols (e.g., Internet Protocol (IP)). In various embodiments, the functions and capabilities of scanning device 202, computer 212, and mobile station 216 may be wholly or partially integrated into one device. Thus, the terms scanning device, computer, and mobile station can refer to the same device depending upon whether the device incorporates functions or capabilities of the scanning device 202, computer 212 and mobile station 216. In addition, some or all of the functions of the search engines 232, document sources 234, user account services 236, markup services 238 and other network services 239 may be implemented on any of the devices and/or other devices not shown.

2.3. The Capture Device

As described above, the capture device may capture text using an optical scanner that captures image data from the rendered document, or using an audio recording device that captures a user's spoken reading of the text, or other methods. Some embodiments of the capture device may also capture images, graphical symbols and icons, etc., including machine readable codes such as barcodes. The device may be exceedingly simple, consisting of little more than the transducer, some storage, and a data interface, relying on other functionality residing elsewhere in the system, or it may be a more full-featured device. For illustration, this section describes a device based around an optical scanner and with a reasonable number of features.

Scanners are well known devices that capture and digitize images. An offshoot of the photocopier industry, the first scanners were relatively large devices that captured an entire document page at once. Recently, portable optical scanners have been introduced in convenient form factors, such as a pen-shaped handheld device.

In some embodiments, the portable scanner is used to scan text, graphics, or symbols from rendered documents. The portable scanner has a scanning element that captures text, symbols, graphics, etc, from rendered documents. In addition to documents that have been printed on paper, in some embodiments, rendered documents include documents that have been displayed on a screen such as a CRT monitor or LCD display.

Figure 3:
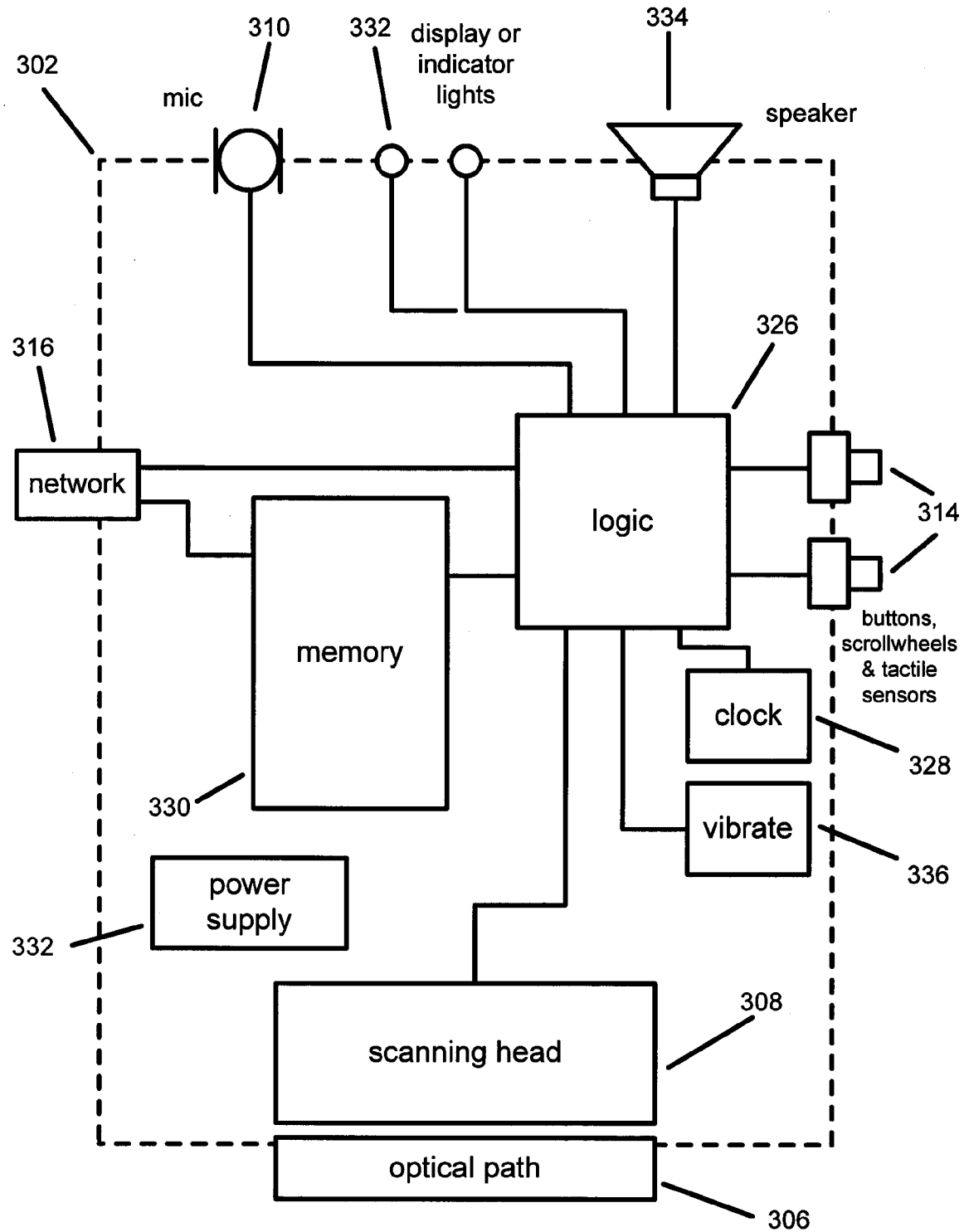
FIG. 3 is a block diagram of an embodiment of a scanner.

FIG. 3 is a block diagram of an embodiment of a scanner 302. The scanner 302 comprises an optical scanning head 308 to scan information from rendered documents and convert it to machine-compatible data, and an optical path 306, typically a lens, an aperture or an image conduit to convey the image from the rendered document to the scanning head. The scanning head 308 may incorporate a Charge-Coupled Device (CCD), a Complementary Metal Oxide Semiconductor (CMOS) imaging device, or an optical sensor of another type.

A microphone 310 and associated circuitry convert the sound of the environment (including spoken words) into machine-compatible signals, and other input facilities exist in the form of buttons, scroll-wheels or other tactile sensors such as touch-pads 314.

Feedback to the user is possible through a visual display or indicator lights 332, through a loudspeaker or other audio transducer 334 and through a vibrate module 336.

The scanner 302 comprises logic 326 to interact with the various other components, possibly processing the received signals into different formats and/or interpretations. Logic 326 may be operable to read and write data and program instructions stored in associated storage 330 such as RAM, ROM, flash, or other suitable memory. It may read a time signal from the clock unit 328. The scanner 302 also includes an interface 316 to communicate scanned information and other signals to a network and/or an associated computing device. In some embodiments, the scanner 302 may have an on-board power supply 332. In other embodiments, the scanner 302 may be powered from a tethered connection to another device, such as a Universal Serial Bus (USB) connection.

As an example of one use of scanner 302, a reader may scan some text from a newspaper article with scanner 302. The text is scanned as a bit-mapped image via the scanning head 308. Logic 326 causes the bit-mapped image to be stored in memory 330 with an associated time-stamp read from the clock unit 328. Logic 326 may also perform optical character recognition (OCR) or other post-scan processing on the bit-mapped image to convert it to text. Logic 326 may optionally extract a signature from the image, for example by performing a convolution-like process to locate repeating occurrences of characters, symbols or objects, and determine the distance or number of other characters, symbols, or objects between these repeated elements. The reader may then upload the bit-mapped image (or text or other signature, if post-scan processing has been performed by logic 326) to an associated computer via interface 316.

As an example of another use of scanner 302, a reader may capture some text from an article as an audio file by using microphone 310 as an acoustic capture port. Logic 326 causes audio file to be stored in memory 328. Logic 326 may also perform voice recognition or other post-scan processing on the audio file to convert it to text. As above, the reader may then upload the audio file (or text produced by post-scan processing performed by logic 326) to an associated computer via interface 316.

Part II—Overview of the Areas of the Core System

As paper-digital integration becomes more common, there are many aspects of existing technologies that can be changed to take better advantage of this integration, or to enable it to be implemented more effectively. This section highlights some of those issues.

3. Search

Searching a corpus of documents, even so large a corpus as the World Wide Web, has become commonplace for ordinary users, who use a keyboard to construct a search query which is sent to a search engine. This section and the next discuss the aspects of both the construction of a query originated by a capture from a rendered document, and the search engine that handles such a query.

3.1. Scan/Speak/Type as Search Query

Use of the described system typically starts with a few words being captured from a rendered document using any of several methods, including those mentioned in Section 1.2 above. Where the input needs some interpretation to convert it to text, for example in the case of OCR or speech input, there may be end-to-end feedback in the system so that the document corpus can be used to enhance the recognition process. End-to-end feedback can be applied by performing an approximation of the recognition or interpretation, identifying a set of one or more candidate matching documents, and then using information from the possible matches in the candidate documents to further refine or restrict the recognition or interpretation. Candidate documents can be weighted according to their probable relevance (for example, based on then number of other users who have scanned in these documents, or their popularity on the Internet), and these weights can be applied in this iterative recognition process.

3.2. Short Phrase Searching

Because the selective power of a search query based on a few words is greatly enhanced when the relative positions of these words are known, only a small amount of text need be captured for the system to identify the text's location in a corpus. Most commonly, the input text will be a contiguous sequence of words, such as a short phrase.

3.2.1. Finding Document and Location in Document from Short Capture

In addition to locating the document from which a phrase originates, the system can identify the location in that document and can take action based on this knowledge.

3.2.2. Other Methods of Finding Location

The system may also employ other methods of discovering the document and location, such as by using watermarks or other special markings on the rendered document.

3.3. Incorporation of Other Factors in Search Query

In addition to the captured text, other factors (i.e., information about user identity, profile, and context) may form part of the search query, such as the time of the capture, the identity and geographical location of the user, knowledge of the user's habits and recent activities, etc.

The document identity and other information related to previous captures, especially if they were quite recent, may form part of a search query.

The identity of the user may be determined from a unique identifier associated with a capturing device, and/or biometric or other supplemental information (speech patterns, fingerprints, etc.).

3.4. Knowledge of Nature of Unreliability in Search Query (OCR Errors etc)

The search query can be constructed taking into account the types of errors likely to occur in the particular capture method used. One example of this is an indication of suspected errors in the recognition of specific characters; in this instance a search engine may treat these characters as wildcards, or assign them a lower priority.

3.5. Local Caching of Index for Performance/Offline Use

Sometimes the capturing device may not be in communication with the search engine or corpus at the time of the data capture. For this reason, information helpful to the offline use of the device may be downloaded to the device in advance, or to some entity with which the device can communicate. In some cases, all or a substantial part of an index associated with a corpus may be downloaded. This topic is discussed further in Section 15.3.

3.6. Queries, in Whatever Form, may be Recorded and Acted on Later

If there are likely to be delays or cost associated with communicating a query or receiving the results, this preloaded information can improve the performance of the local device, reduce communication costs, and provide helpful and timely user feedback.

In the situation where no communication is available (the local device is "offline"), the queries may be saved and transmitted to the rest of the system at such a time as communication is restored.

In these cases it may be important to transmit a timestamp with each query. The time of the capture can be a significant factor in the interpretation of the query. For example, Section 13.1 discusses the importance of the time of capture in relation to earlier captures. It is important to note that the time of capture will not always be the same as the time that the query is executed.

3.7. Parallel Searching

For performance reasons, multiple queries may be launched in response to a single capture, either in sequence or in parallel. Several queries may be sent in response to a single capture, for example as new words are added to the capture, or to query multiple search engines in parallel.

For example, in some embodiments, the system sends queries to a special index for the current document, to a search engine on a local machine, to a search engine on the corporate network, and to remote search engines on the Internet.

The results of particular searches may be given higher priority than those from others.

The response to a given query may indicate that other pending queries are superfluous; these may be cancelled before completion.

4. Paper and Search Engines

Often it is desirable for a search engine that handles traditional online queries also to handle those originating from rendered documents. Conventional search engines may be enhanced or modified in a number of ways to make them more suitable for use with the described system.

The search engine and/or other components of the system may create and maintain indices that have different or extra features. The system may modify an incoming paper-originated query or change the way the query is handled in the resulting search, thus distinguishing these paper-originated queries from those coming from queries typed into web browsers and other sources. And the system may take different actions or offer different options when the results are returned by the searches originated from paper as compared to those from other sources. Each of these approaches is discussed below.

4.1. Indexing

Often, the same index can be searched using either paper-originated or traditional queries, but the index may be enhanced for use in the current system in a variety of ways.

4.1.1. Knowledge about the Paper Form

Extra fields can be added to such an index that will help in the case of a paper-based search.

Index Entry Indicating Document Availability in Paper Form

The first example is a field indicating that the document is known to exist or be distributed in paper form. The system may give such documents higher priority if the query comes from paper.

Knowledge of Popularity Paper Form

In this example statistical data concerning the popularity of paper documents (and, optionally, concerning sub-regions within these documents)—for example the amount of scanning activity, circulation numbers provided by the publisher or other sources, etc—is used to give such documents higher priority, to boost the priority of digital counterpart documents (for example, for browser-based queries or web searches), etc.

Knowledge of Rendered Format

Another important example may be recording information about the layout of a specific rendering of a document.

For a particular edition of a book, for example, the index may include information about where the line breaks and page breaks occur, which fonts were used, any unusual capitalization.

The index may also include information about the proximity of other items on the page, such as images, text boxes, tables and advertisements.

Use of Semantic Information in Original

Lastly, semantic information that can be deduced from the source markup but is not apparent in the paper document, such as the fact that a particular piece of text refers to an item offered for sale, or that a certain paragraph contains program code, may also be recorded in the index.

4.1.2. Indexing in the Knowledge of the Capture Method

A second factor that may modify the nature of the index is the knowledge of the type of capture likely to be used. A search initiated by an optical scan may benefit if the index takes into account characters that are easily confused in the OCR process, or includes some knowledge of the fonts used in the document. Similarly, if the query is from speech recognition, an index based on similar-sounding phonemes may be much more efficiently searched. An additional factor that may affect the use of the index in the described model is the importance of iterative feedback during the recognition process. If the search engine is able to provide feedback from the index as the text is being captured, it can greatly increase the accuracy of the capture.

Indexing Using Offsets

If the index is likely to be searched using the offset-based/autocorrelation OCR methods described in Section 9, in some embodiments, the system stores the appropriate offset or signature information in an index.

4.1.3. Multiple Indices

Lastly, in the described system, it may be common to conduct searches on many indices. Indices may be maintained on several machines on a corporate network. Partial indices may be downloaded to the capture device, or to a machine close to the capture device. Separate indices may be created for users or groups of users with particular interests, habits or permissions. An index may exist for each filesystem, each directory, even each file on a user's hard disk. Indexes are published and subscribed to by users and by systems. It will be important, then, to construct indices that can be distributed, updated, merged and separated efficiently.

4.2. Handling the Queries

4.2.1. Knowing the Capture is From Paper

A search engine may take different actions when it recognizes that a search query originated from a paper document. The engine might handle the query in a way that is more tolerant to the types of errors likely to appear in certain capture methods, for example.

It may be able to deduce this from some indicator included in the query (for example a flag indicating the nature of the capture), or it may deduce this from the query itself (for example, it may recognize errors or uncertainties typical of the OCR process).

Alternatively, queries from a capture device can reach the engine by a different channel or port or type of connection than those from other sources, and can be distinguished in that way. For example, some embodiments of the system will route queries to the search engine by way of a dedicated gateway. Thus, the search engine knows that all queries passing through the dedicated gateway were originated from a paper document

4.2.2. Use of Context

Section 13 below describes a variety of different factors which are external to the captured text itself, yet which can be a significant aid in identifying a document. These include such things as the history of recent scans, the longer-term reading habits of a particular user, the geographic location of a user and the user's recent use of particular electronic documents. Such factors are referred to herein as "context."

Some of the context may be handled by the search engine itself, and be reflected in the search results. For example, the search engine may keep track of a user's scanning history, and may also cross-reference this scanning history to conventional keyboard-based queries. In such cases, the search engine maintains and uses more state information about each individual user than do most conventional search engines, and each interaction with a search engine may be considered to extend over several searches and a longer period of time than is typical today.

Some of the context may be transmitted to the search engine in the search query (Section 3.3), and may possibly be stored at the engine so as to play a part in future queries. Lastly, some of the context will best be handled elsewhere, and so becomes a filter or secondary search applied to the results from the search engine.

Data-Stream Input to Search

An important input into the search process is the broader context of how the community of users is interacting with the rendered version of the document—for example, which documents are most widely read and by whom. There are analogies with a web search returning the pages that are most frequently linked to, or those that are most frequently selected from past search results. For further discussion of this topic, see Sections 13.4 and 14.2.

4.2.3. Document Sub-Regions

The described system can emit and use not only information about documents as a whole, but also information about sub-regions of documents, even down to individual words. Many existing search engines concentrate simply on locating a document or file that is relevant to a particular query. Those that can work on a finer grain and identify a location within a document will provide a significant benefit for the described system.

4.3. Returning the Results

The search engine may use some of the further information it now maintains to affect the results returned.

The system may also return certain documents to which the user has access only as a result of being in possession of the paper copy (Section 7.4).

The search engine may also offer new actions or options appropriate to the described system, beyond simple retrieval of the text.

5. Markup, Annotations and Metadata

In addition to performing the capture-search-retrieve process, the described system also associates extra functionality with a document, and in particular with specific locations or segments of text within a document. This extra functionality is often, though not exclusively, associated with the rendered document by being associated with its electronic counterpart. As an example, hyperlinks in a web page could have the same functionality when a printout of that web page is scanned. In some cases, the functionality is not defined in the electronic document, but is stored or generated elsewhere.

This layer of added functionality is referred to herein as "markup."

5.1. Overlays, Static and Dynamic

One way to think of the markup is as an "overlay" on the document, which provides further information about—and may specify actions associated with—the document or some portion of it. The markup may include human-readable content, but is often invisible to a user and/or intended for machine use. Examples include options to be displayed in a popup-menu on a nearby display when a user captures text from a particular area in a rendered document, or audio samples that illustrate the pronunciation of a particular phrase.

5.1.1. Several Layers, Possibly from Several Sources

Any document may have multiple overlays simultaneously, and these may be sourced from a variety of locations. Markup data may be created or supplied by the author of the document, or by the user, or by some other party.

Markup data may be attached to the electronic document or embedded in it. It may be found in a conventional location (for example, in the same place as the document but with a different filename suffix). Markup data may be included in the search results of the query that located the original document, or may be found by a separate query to the same or another search engine. Markup data may be found using the original captured text and other capture information or contextual information, or it may be found using already-deduced information about the document and location of the capture. Markup data may be found in a location specified in the document, even if the markup itself is not included in the document.

The markup may be largely static and specific to the document, similar to the way links on a traditional html web page are often embedded as static data within the html document, but markup may also be dynamically generated and/or applied to a large number of documents. An example of dynamic markup is information attached to a document that includes the up-to-date share price of companies mentioned in that document. An example of broadly applied markup is translation information that is automatically available on multiple documents or sections of documents in a particular language.

5.1.2. Personal "Plug-In" Layers

Users may also install, or subscribe to particular sources of, markup data, thus personalizing the system's response to particular captures.

5.2. Keywords and Phrases, Trademarks and Logos

Some elements in documents may have particular "markup" or functionality associated with them based on their own characteristics rather than their location in a particular document. Examples include special marks that are printed in the document purely for the purpose of being scanned, as well as logos and trademarks that can link the user to further information about the organization concerned. The same applies to "keywords" or "key phrases" in the text. Organizations might register particular phrases with which they are associated, or with which they would like to be associated, and attach certain markup to them that would be available wherever that phrase was scanned.

Any word, phrase, etc. may have associated markup. For example, the system may add certain items to a pop-up menu (e.g., a link to an online bookstore) whenever the user captures the word "book," or the title of a book, or a topic related to books. In some embodiments, of the system, digital counterpart documents or indices are consulted to determine whether a capture occurred near the word "book," or the title of a book, or a topic related to books—and the system behavior is modified in accordance with this proximity to keyword elements. In the preceding example, note that markup enables data captured from non-commercial text or documents to trigger a commercial transaction.

5.3. User-Supplied Content

5.3.1. User Comments and Annotations, Including Multimedia

Annotations are another type of electronic information that may be associated with a document. For example, a user can attach an audio file of his/her thoughts about a particular document for later retrieval as voice annotations. As another example of a multimedia annotation, a user may attach photographs of places referred to in the document. The user generally supplies annotations for the document but the system can associate annotations from other sources (for example, other users in a work group may share annotations).

5.3.2. Notes from Proof-Reading

An important example of user-sourced markup is the annotation of paper documents as part of a proofreading, editing or reviewing process.

5.4. Third-Party Content

As mentioned earlier, markup data may often be supplied by third parties, such as by other readers of the document. Online discussions and reviews are a good example, as are community-managed information relating to particular works, volunteer-contributed translations and explanations.

Another example of third-party markup is that provided by advertisers.

5.5. Dynamic Markup Based on other Users' Data Streams

By analyzing the data captured from documents by several or all users of the system, markup can be generated based on the activities and interests of a community. An example might be an online bookstore that creates markup or annotations that tell the user, in effect, "People who enjoyed this book also enjoyed . . . ." The markup may be less anonymous, and may tell the user which of the people in his/her contact list have also read this document recently. Other examples of datastream analysis are included in Section 14.

5.6. Markup Based on External Events and Data Sources

Markup will often be based on external events and data sources, such as input from a corporate database, information from the public Internet, or statistics gathered by the local operating system.

Data sources may also be more local, and in particular may provide information about the user's context—his/her identity, location and activities. For example, the system might communicate with the user's mobile phone and offer a markup layer that gives the user the option to send a document to somebody that the user has recently spoken to on the phone.

6. Authentication, Personalization and Security

In many situations, the identity of the user will be known. Sometimes this will be an "anonymous identity," where the user is identified only by the serial number of the capture device, for example. Typically, however, it is expected that the system will have a much more detailed knowledge of the user, which can be used for personalizing the system and to allow activities and transactions to be performed in the user's name.

6.1. User History and "Life Library"

One of the simplest and yet most useful functions that the system can perform is to keep a record for a user of the text that s/he has captured and any further information related to that capture, including the details of any documents found, the location within that document and any actions taken as a result.

This stored history is beneficial for both the user and the system.

6.1.1. For the User

The user can be presented with a "Life Library," a record of everything s/he has read and captured. This may be simply for personal interest, but may be used, for example, in a library by an academic who is gathering material for the bibliography of his next paper.

In some circumstances, the user may wish to make the library public, such as by publishing it on the web in a similar manner to a weblog, so that others may see what s/he is reading and finds of interest.

Lastly, in situations where the user captures some text and the system cannot immediately act upon the capture (for example, because an electronic version of the document is not yet available) the capture can be stored in the library and can be processed later, either automatically or in response to a user request. A user can also subscribe to new markup services and apply them to previously captured scans.

6.1.2. For the System

A record of a user's past captures is also useful for the system. Many aspects of the system operation can be enhanced by knowing the user's reading habits and history. The simplest example is that any scan made by a user is more likely to come from a document that the user has scanned in the recent past, and in particular if the previous scan was within the last few minutes it is very likely to be from the same document. Similarly, it is more likely that a document is being read in start-to-finish order. Thus, for English documents, it is also more likely that later scans will occur farther down in the document. Such factors can help the system establish the location of the capture in cases of ambiguity, and can also reduce the amount of text that needs to be captured.

6.2. Scanner as Payment, Identity and Authentication Device

Because the capture process generally begins with a device of some sort, typically an optical scanner or voice recorder, this device may be used as a key that identifies the user and authorizes certain actions.

6.2.1. Associate Scanner with Phone or Other Account

The device may be embedded in a mobile phone or in some other way associated with a mobile phone account. For example, a scanner may be associated with a mobile phone account by inserting a SIM card associated with the account into the scanner. Similarly, the device may be embedded in a credit card or other payment card, or have the facility for such a card to be connected to it. The device may therefore be used as a payment token, and financial transactions may be initiated by the capture from the rendered document.

6.2.2. Using Scanner Input for Authentication

The scanner may also be associated with a particular user or account through the process of scanning some token, symbol or text associated with that user or account. In addition, scanner may be used for biometric identification, for example by scanning the fingerprint of the user. In the case of an audio-based capture device, the system may identify the user by matching the voice pattern of the user or by requiring the user to speak a certain password or phrase.

For example, where a user scans a quote from a book and is offered the option to buy the book from an online retailer, the user can select this option, and is then prompted to scan his/her fingerprint to confirm the transaction.

See also Sections 15.5 and 15.6.

6.2.3. Secure Scanning Device

When the capture device is used to identify and authenticate the user, and to initiate transactions on behalf of the user, it is important that communications between the device and other parts of the system are secure. It is also important to guard against such situations as another device impersonating a scanner, and so-called "man in the middle" attacks where communications between the device and other components are intercepted.

Techniques for providing such security are well understood in the art; in various embodiments, the hardware and software in the device and elsewhere in the system are configured to implement such techniques.

7. Publishing Models and Elements

An advantage of the described system is that there is no need to alter the traditional processes of creating, printing or publishing documents in order to gain many of the system's benefits. There are reasons, though, that the creators or publishers of a document—hereafter simply referred to as the "publishers"—may wish to create functionality to support the described system.

This section is primarily concerned with the published documents themselves. For information about other related commercial transactions, such as advertising, see Section 10 entitled "P-Commerce."

7.1. Electronic Companions to Printed Documents

The system allows for printed documents to have an associated electronic presence. Conventionally publishers often ship a CD-ROM with a book that contains further digital information, tutorial movies and other multimedia data, sample code or documents, or further reference materials. In addition, some publishers maintain web sites associated with particular publications which provide such materials, as well as information which may be updated after the time of publishing, such as errata, further comments, updated reference materials, bibliographies and further sources of relevant data, and translations into other languages. Online forums allow readers to contribute their comments about the publication.

The described system allows such materials to be much more closely tied to the rendered document than ever before, and allows the discovery of and interaction with them to be much easier for the user. By capturing a portion of text from the document, the system can automatically connect the user to digital materials associated with the document, and more particularly associated with that specific part of the document. Similarly, the user can be connected to online communities that discuss that section of the text, or to annotations and commentaries by other readers. In the past, such information would typically need to be found by searching for a particular page number or chapter.

An example application of this is in the area of academic textbooks (Section 17.5).

7.2. "Subscriptions" to Printed Documents

Some publishers may have mailing lists to which readers can subscribe if they wish to be notified of new relevant matter or when a new edition of the book is published. With the described system, the user can register an interest in particular documents or parts of documents more easily, in some cases even before the publisher has considered providing any such functionality. The reader's interest can be fed to the publisher, possibly affecting their decision about when and where to provide updates, further information, new editions or even completely new publications on topics that have proved to be of interest in existing books.

7.3. Printed Marks with Special Meaning or Containing Special Data

Many aspects of the system are enabled simply through the use of the text already existing in a document. If the document is produced in the knowledge that it may be used in conjunction with the system, however, extra functionality can be added by printing extra information in the form of special marks, which may be used to identify the text or a required action more closely, or otherwise enhance the document's interaction with the system. The simplest and most important example is an indication to the reader that the document is definitely accessible through the system. A special icon might be used, for example, to indicate that this document has an online discussion forum associated with it.

Such symbols may be intended purely for the reader, or they may be recognized by the system when scanned and used to initiate some action. Sufficient data may be encoded in the symbol to identify more than just the symbol: it may also store information, for example about the document, edition, and location of the symbol, which could be recognized and read by the system.

7.4. Authorization Through Possession of the Paper Document

There are some situations where possession of or access to the printed document would entitle the user to certain privileges, for example, the access to an electronic copy of the document or to additional materials. With the described system, such privileges could be granted simply as a result of the user capturing portions of text from the document, or scanning specially printed symbols. In cases where the system needed to ensure that the user was in possession of the entire document, it might prompt the user to scan particular items or phrases from particular pages, e.g., "the second line of page 46."

7.5. Documents which Expire

If the printed document is a gateway to extra materials and functionality, access to such features can also be time-limited. After the expiry date, a user may be required to pay a fee or obtain a newer version of the document-to access the features again. The paper document will, of course, still be usable, but will lose some of its enhanced electronic functionality. This may be desirable, for example, because there is profit for the publisher in receiving fees for access to electronic materials, or in requiring the user to purchase new editions from time to time, or because there are disadvantages associated with outdated versions of the printed document remaining in circulation. Coupons are an example of a type of commercial document that can have an expiration date.

7.6. Popularity Analysis and Publishing Decisions

Section 10.5 discusses the use of the system's statistics to influence compensation of authors and pricing of advertisements.

In some embodiments, the system deduces the popularity of a publication from the activity in the electronic community associated with it as well as from the use of the paper document. These factors may help publishers to make decisions about what they will publish in future. If a chapter in an existing book, for example, turns out to be exceedingly popular, it may be worth expanding into a separate publication.

8. Document Access Services

An important aspect of the described system is the ability to provide to a user who has access to a rendered copy of a document access to an electronic version of that document. In some cases, a document is freely available on a public network or a private network to which the user has access. The system uses the captured text to identify, locate and retrieve the document, in some cases displaying it on the user's screen or depositing it in their email inbox.

In some cases, a document will be available in electronic form, but for a variety of reasons may not be accessible to the user. There may not be sufficient connectivity to retrieve the document, the user may not be entitled to retrieve it, there may be a cost associated with gaining access to it, or the document may have been withdrawn and possibly replaced by a new version, to name just a few possibilities. The system typically provides feedback to the user about these situations.

As mentioned in Section 7.4, the degree or nature of the access granted to a particular user may be different if it is known that the user already has access to a printed copy of the document.

8.1. Authenticated Document Access

Access to the document may be restricted to specific users, or to those meeting particular criteria, or may only be available in certain circumstances, for example when the user is connected to a secure network. Section 6 describes some of the ways in which the credentials of a user and scanner may be established.

8.2. Document Purchase—Copyright-Owner Compensation

Documents that are not freely available to the general public may still be accessible on payment of a fee, often as compensation to the publisher or copyright-holder. The system may implement payment facilities directly or may make use of other payment methods associated with the user, including those described in Section 6.2.

8.3. Document Escrow and Proactive Retrieval

Electronic documents are often transient; the digital source version of a rendered document may be available now but inaccessible in future. The system may retrieve and store the existing version on behalf of the user, even if the user has not requested it, thus guaranteeing its availability should the user request it in future. This also makes it available for the system's use, for example for searching as part of the process of identifying future captures.

In the event that payment is required for access to the document, a trusted "document escrow" service can retrieve the document on behalf of the user, such as upon payment of a modest fee, with the assurance that the copyright holder will be fully compensated in future if the user should ever request the document from the service.

Variations on this theme can be implemented if the document is not available in electronic form at the time of capture. The user can authorize the service to submit a request for or make a payment for the document on his/her behalf if the electronic document should become available at a later date.

8.4. Association with Other Subscriptions and Accounts

Sometimes payment may be waived, reduced or satisfied based on the user's existing association with another account or subscription. Subscribers to the printed version of a newspaper might automatically be entitled to retrieve the electronic version, for example.

In other cases, the association may not be quite so direct: a user may be granted access based on an account established by their employer, or based on their scanning of a printed copy owned by a friend who is a subscriber.

8.5. Replacing Photocopying with Scan-And-Print

The process of capturing text from a paper document, identifying an electronic original, and printing that original, or some portion of that original associated with the capture, forms an alternative to traditional photocopying with many advantages:

- the paper document need not be in the same location as the final printout, and in any case need not be there at the same time
- the wear and damage caused to documents by the photocopying process, especially to old, fragile and valuable documents, can be avoided
- the quality of the copy is typically be much higher
- records may be kept about which documents or portions of documents are the most frequently copied
- payment may be made to the copyright owner as part of the process
- unauthorized copying may be prohibited

8.6. Locating Valuable Originals from Photocopies

When documents are particularly valuable, as in the case of legal instruments or documents that have historical or other particular significance, people may typically work from copies of those documents, often for many years, while the originals are kept in a safe location.

The described system could be coupled to a database which records the location of an original document, for example in an archiving warehouse, making it easy for somebody with access to a copy to locate the archived original paper document.

9. Text Recognition Technologies

Optical Character Recognition (OCR) technologies have traditionally focused on images that include a large amount of text, for example from a flat-bed scanner capturing a whole page. OCR technologies often need substantial training and correcting by the user to produce useful text. OCR technologies often require substantial processing power on the machine doing the OCR, and, while many systems use a dictionary, they are generally expected to operate on an effectively infinite vocabulary.

All of the above traditional characteristics may be improved upon in the described system.

While this section focuses on OCR, many of the issues discussed map directly onto other recognition technologies, in particular speech recognition. As mentioned in Section 3.1, the process of capturing from paper may be achieved by a user reading the text aloud into a device which captures audio. Those skilled in the art will appreciate that principles discussed here with respect to images, fonts, and text fragments often also apply to audio samples, user speech models and phonemes.

9.1. Optimization for Appropriate Devices

A scanning device for use with the described system will often be small, portable, and low power. The scanning device may capture only a few words at a time, and in some implementations does not even capture a whole character at once, but rather a horizontal slice through the text, many such slices being stitched together to form a recognizable signal from which the text may be deduced. The scanning device may also have very limited processing power or storage so, while in some embodiments it may perform all of the OCR process itself, many embodiments will depend on a connection to a more powerful device, possibly at a later time, to convert the captured signals into text. Lastly, it may have very limited facilities for user interaction, so may need to defer any requests for user input until later, or operate in a "best-guess" mode to a greater degree than is common now.

9.2. "Uncertain" OCR

The primary new characteristic of OCR within the described system is the fact that it will, in general, examine images of text which exists elsewhere and which may be retrieved in digital form. An exact transcription of the text is therefore not always required from the OCR engine. The OCR system may output a set or a matrix of possible matches, in some cases including probability weightings, which can still be used to search for the digital original.

9.3. Iterative OCR—Guess, Disambiguate, Guess . . .

If the device performing the recognition is able to contact the document index at the time of processing, then the OCR process can be informed by the contents of the document corpus as it progresses, potentially offering substantially greater recognition accuracy.

Such a connection will also allow the device to inform the user when sufficient text has been captured to identify the digital source.

9.4. Using Knowledge of Likely Rendering

When the system has knowledge of aspects of the likely printed rendering of a document—such as the font typeface used in printing, or the layout of the page, or which sections are in italics—this too can help in the recognition process. (Section 4.1.1)

9.5. Font Caching—Determine Font on Host, Download to Client

As candidate source texts in the document corpus are identified, the font, or a rendering of it, may be downloaded to the device to help with the recognition.

9.6. Autocorrelation and Character Offsets

While component characters of a text fragment may be the most recognized way to represent a fragment of text that may be used as a document signature, other representations of the text may work sufficiently well that the actual text of a text fragment need not be used when attempting to locate the text fragment in a digital document and/or database, or when disambiguating the representation of a text fragment into a readable form. Other representations of text fragments may provide benefits that actual text representations lack. For example, optical character recognition of text fragments is often prone to errors, unlike other representations of captured text fragments that may be used to search for and/or recreate a text fragment without resorting to optical character recognition for the entire fragment. Such methods may be more appropriate for some devices used with the current system.

Those of ordinary skill in the art and others will appreciate that there are many ways of describing the appearance of text fragments. Such characterizations of text fragments may include, but are not limited to, word lengths, relative word lengths, character heights, character widths, character shapes, character frequencies, token frequencies, and the like. In some embodiments, the offsets between matching text tokens (i.e., the number of intervening tokens plus one) are used to characterize fragments of text.

Conventional OCR uses knowledge about fonts, letter structure and shape to attempt to determine characters in scanned text. Embodiments of the present invention are different; they employ a variety of methods that use the rendered text itself to assist in the recognition process. These embodiments use characters (or tokens) to "recognize each other." One way to refer to such self-recognition is "template matching," and is similar to "convolution." To perform such self-recognition, the system slides a copy of the text horizontally over itself and notes matching regions of the text images. Prior template matching and convolution techniques encompass a variety of related techniques. These techniques to tokenize and/or recognize characters/tokens will be collectively referred to herein as "autocorrelation," as the text is used to correlate with its own component parts when matching characters/tokens.

When autocorrelating, complete connected regions that match are of interest. This occurs when characters (or groups of characters) overlay other instances of the same character (or group). Complete connected regions that match automatically provide tokenizing of the text into component tokens. As the two copies of the text are slid past each other, the regions where perfect matching occurs (i.e., all pixels in a vertical slice are matched) are noted. When a character/token matches itself, the horizontal extent of this matching (e.g., the connected matching portion of the text) also matches.

Note that at this stage there is no need to determine the actual identity of each token (i.e., the particular letter, digit or symbol, or group of these, that corresponds to the token image), only the offset to the next occurrence of the same token in the scanned text. The offset number is the distance (number of tokens) to the next occurrence of the same token. If the token is unique within the text string, the offset is zero (0). The sequence of token offsets thus generated is a signature that can be used to identify the scanned text.

In some embodiments, the token offsets determined for a string of scanned tokens are compared to an index that indexes a corpus of electronic documents based upon the token offsets of their contents (Section 4.1.2). In other embodiments, the token offsets determined for a string of scanned tokens are converted to text, and compared to a more conventional index that indexes a corpus of electronic documents based upon their contents As has been noted earlier, a similar token-correlation process may be applied to speech fragments when the capture process consists of audio samples of spoken words.

9.7. Font/Character "Self-Recognition"

Conventional template-matching OCR compares scanned images to a library of character images. In essence, the alphabet is stored for each font and newly scanned images are compared to the stored images to find matching characters. The process generally has an initial delay until the correct font has been identified. After that, the OCR process is relatively quick because most documents use the same font throughout. Subsequent images can therefore be converted to text by comparison with the most recently identified font library.

The shapes of characters in most commonly used fonts are related. For example, in most fonts, the letter "c" and the letter "e" are visually related—as are "t" and "f," etc. The OCR process is enhanced by use of this relationship to construct templates for letters that have not been scanned yet. For example, where a reader scans a short string of text from a paper document in a previously unencountered font such that the system does not have a set of image templates with which to compare the scanned images the system can leverage the probable relationship between certain characters to construct the font template library even though it has not yet encountered all of the letters in the alphabet. The system can then use the constructed font template library to recognize subsequent scanned text and to further refine the constructed font library.

9.8. Send Anything Unrecognized (Including Graphics) to Server

When images cannot be machine-transcribed into a form suitable for use in a search process, the images themselves can be saved for later use by the user, for possible manual transcription, or for processing at a later date when different resources may be available to the system.

10. P-Commerce

Many of the actions made possible by the system result in some commercial transaction taking place. The phrase p-commerce is used herein to describe commercial activities initiated from paper via the system.

10.1. Sales of Documents from Their Physical Printed Copies.

When a user captures text from a document, the user may be offered that document for purchase either in paper or electronic form. The user may also be offered related documents, such as those quoted or otherwise referred to in the paper document, or those on a similar subject, or those by the same author.

10.2. Sales of Anything Else Initiated or Aided by Paper

The capture of text may be linked to other commercial activities in a variety of ways. The captured text may be in a catalog that is explicitly designed to sell items, in which case the text will be associated fairly directly with the purchase of an item (Section 18.2). The text may also be part of an advertisement, in which case a sale of the item being advertised may ensue.

In other cases, the user captures other text from which their potential interest in a commercial transaction may be deduced. A reader of a novel set in a particular country, for example, might be interested in a holiday there. Someone reading a review of a new car might be considering purchasing it. The user may capture a particular fragment of text knowing that some commercial opportunity will be presented to them as a result, or it may be a side-effect of their capture activities.

10.3. Capture of Labels, Icons, Serial Numbers, Barcodes on an Item Resulting in a Sale Sometimes text or symbols are actually printed on an item or its packaging. An example is the serial number or product id often found on a label on the back or underside of a piece of electronic equipment. The system can offer the user a convenient way to purchase one or more of the same items by capturing that text. They may also be offered manuals, support or repair services.

10.4. Contextual Advertisements

In addition to the direct capture of text from an advertisement, the system allows for a new kind of advertising which is not necessarily explicitly in the rendered document, but is nonetheless based on what people are reading.

10.4.1. Advertising Based on Scan Context and History

In a traditional paper publication, advertisements generally consume a large amount of space relative to the text of a newspaper article, and a limited number of them can be placed around a particular article. In the described system, advertising can be associated with individual words or phrases, and can selected according to the particular interest the user has shown by capturing that text and possibly taking into account their history of past scans.

With the described system, it is possible for a purchase to be tied to a particular printed document and for an advertiser to get significantly more feedback about the effectiveness of their advertising in particular print publications.

10.4.2. Advertising Based on User Context and History

The system may gather a large amount of information about other aspects of a user's context for its own use (Section 13); estimates of the geographical location of the user are a good example. Such data can also be used to tailor the advertising presented to a user of the system.

10.5. Models of Compensation

The system enables some new models of compensation for advertisers and marketers. The publisher of a printed document containing advertisements may receive some income from a purchase that originated from their document. This may be true whether or not the advertisement existed in the original printed form; it may have been added electronically either by the publisher, the advertiser or some third party, and the sources of such advertising may have been subscribed to by the user.

10.5.1. Popularity-Based Compensation

Analysis of the statistics generated by the system can reveal the popularity of certain parts of a publication (Section 14.2). In a newspaper, for example, it might reveal the amount of time readers spend looking at a particular page or article, or the popularity of a particular columnist. In some circumstances, it may be appropriate for an author or publisher to receive compensation based on the activities of the readers rather than on more traditional metrics such as words written or number of copies distributed. An author whose work becomes a frequently read authority on a subject might be considered differently in future contracts from one whose books have sold the same number of copies but are rarely opened. (See also Section 7.6)

10.5.2. Popularity-Based Advertising

Decisions about advertising in a document may also be based on statistics about the readership. The advertising space around the most popular columnists may be sold at a premium rate. Advertisers might even be charged or compensated some time after the document is published based on knowledge about how it was received.

10.6. Marketing Based on Life Library

The "Life Library" or scan history described in Sections 6.1 and 16.1 can be an extremely valuable source of information about the interests and habits of a user. Subject to the appropriate consent and privacy issues, such data can inform offers of goods or services to the user. Even in an anonymous form, the statistics gathered can be exceedingly useful.

10.7. Sale/Information at Later Date (When Available)

Advertising and other opportunities for commercial transactions may not be presented to the user immediately at the time of text capture. For example, the opportunity to purchase a sequel to a novel may not be available at the time the user is reading the novel, but the system may present them with that opportunity when the sequel is published.

A user may capture data that relates to a purchase or other commercial transaction, but may choose not to initiate and/or complete the transaction at the time the capture is made. In some embodiments, data related to captures is stored in a user's Life Library, and these Life Library entries can remain "active" (i.e., capable of subsequent interactions similar to those available at the time the capture was made). Thus a user may review a capture at some later time, and optionally complete a transaction based on that capture. Because the system can keep track of when and where the original capture occurred, all parties involved in the transaction can be properly compensated. For example, the author who wrote the story—and the publisher who published the story—that appeared next to the advertisement from which the user captured data can be compensated when, six months later, the user visits their Life Library, selects that particular capture from the history, and chooses "Purchase this item at Amazon" from the pop-up menu (which can be similar or identical to the menu optionally presented at the time of the capture).

11. Operating System and Application Integration

Modern Operating Systems (OSs) and other software packages have many characteristics that can be advantageously exploited for use with the described system, and may also be modified in various ways to provide an even better platform for its use.

11.1. Incorporation of Scan and Print-Related Information in Metadata and Indexing New and upcoming file systems and their associated databases often have the ability to store a variety of metadata associated with each file. Traditionally, this metadata has included such things as the ID of the user who created the file, the dates of creation, last modification, and last use. Newer file systems allow such extra information as keywords, image characteristics, document sources and user comments to be stored, and in some systems this metadata can be arbitrarily extended. File systems can therefore be used to store information that would be useful in implementing the current system. For example, the date when a given document was last printed can be stored by the file system, as can details about which text from it has been captured from paper using the described system, and when and by whom.

Operating systems are also starting to incorporate search engine facilities that allow users to find local files more easily. These facilities can be advantageously used by the system. It means that many of the search-related concepts discussed in Sections 3 and 4 apply not just to today's Internet-based and similar search engines, but also to every personal computer.

In some cases specific software applications will also include support for the system above and beyond the facilities provided by the OS.

11.2. OS Support for Capture Devices

As the use of capture devices such as pen scanners becomes increasingly common, it will become desirable to build support for them into the operating system, in much the same way as support is provided for mice and printers, since the applicability of capture devices extends beyond a single software application. The same will be true for other aspects of the system's operation. Some examples are discussed below. In some embodiments, the entire described system, or the core of it, is provided by the OS. In some embodiments, support for the system is provided by Application Programming Interfaces (APIs) that can be used by other software packages, including those directly implementing aspects of the system.

11.2.1. Support for OCR and Other Recognition Technologies

Most of the methods of capturing text from a rendered document require some recognition software to interpret the source data, typically a scanned image or some spoken words, as text suitable for use in the system. Some OSs include support for speech or handwriting recognition, though it is less common for OSs to include support for OCR, since in the past the use of OCR has typically been limited to a small range of applications.

As recognition components become part of the OS, they can take better advantage of other facilities provided by the OS. Many systems include spelling dictionaries, grammar analysis tools, internationalization and localization facilities, for example, all of which can be advantageously employed by the described system for its recognition process, especially since they may have been customized for the particular user to include words and phrases that he/she would commonly encounter.

If the operating system includes full-text indexing facilities, then these can also be used to inform the recognition process, as described in Section 9.3.

11.2.2. Action to be Taken on Scans

If an optical scan or other capture occurs and is presented to the OS, it may have a default action to be taken under those circumstances in the event that no other subsystem claims ownership of the capture. An example of a default action is presenting the user with a choice of alternatives, or submitting the captured text to the OS's built-in search facilities.

11.2.3. OS has Default Action for Particular Documents or Document Types

If the digital source of the rendered document is found, the OS may have a standard action that it will take when that particular document, or a document of that class, is scanned. Applications and other subsystems may register with the OS as potential handlers of particular types of capture, in a similar manner to the announcement by applications of their ability to handle certain file types.

Markup data associated with a rendered document, or with a capture from a document, can include instructions to the operating system to launch specific applications, pass applications arguments, parameters, or data, etc.

11.2.4. Interpretation of Gestures and Mapping into Standard Actions

In Section 12.1.3 the use of "gestures" is discussed, particularly in the case of optical scanning, where particular movements made with a handheld scanner might represent standard actions such as marking the start and end of a region of text.

This is analogous to actions such as pressing the shift key on a keyboard while using the cursor keys to select a region of text, or using the wheel on a mouse to scroll a document. Such actions by the user are sufficiently standard that they are interpreted in a system-wide way by the OS, thus ensuring consistent behavior. The same is desirable for scanner gestures and other scanner-related actions.

11.2.5. Set Response to Standard (and Non-Standard) Iconic/Text Printed Menu Items In a similar way, certain items of text or other symbols may, when scanned, cause standard actions to occur, and the OS may provide a selection of these. An example might be that scanning the text "[print]" in any document would cause the OS to retrieve and print a copy of that document. The OS may also provide a way to register such actions and associate them with particular scans.

11.3. Support in System GUI Components for Typical Scan-Initiated Activities

Most software applications are based substantially on standard Graphical User Interface components provided by the OS.

Use of these components by developers helps to ensure consistent behavior across multiple packages, for example that pressing the left-cursor key in any text-editing context should move the cursor to the left, without every programmer having to implement the same functionality independently.

A similar consistency in these components is desirable when the activities are initiated by text-capture or other aspects of the described system. Some examples are given below.

11.3.1. Interface to find Particular Text Content

A typical use of the system may be for the user to scan an area of a paper document, and for the system to open the electronic counterpart in a software package that is able to display or edit it, and cause that package to scroll to and highlight the scanned text (Section 12.2.1). The first part of this process, finding and opening the electronic document, is typically provided by the OS and is standard across software packages. The second part, however—locating a particular piece of text within a document and causing the package to scroll to it and highlight it—is not yet standardized and is often implemented differently by each package. The availability of a standard API for this functionality could greatly enhance the operation of this aspect of the system.

11.3.2. Text Interactions

Once a piece of text has been located within a document, the system may wish to perform a variety of operations upon that text. As an example, the system may request the surrounding text, so that the user's capture of a few words could result in the system accessing the entire sentence or paragraph containing them. Again, this functionality can be usefully provided by the OS rather than being implemented in every piece of software that handles text.

11.3.3. Contextual (Popup) Menus

Some of the operations that are enabled by the system will require user feedback, and this may be optimally requested within the context of the application handling the data. In some embodiments, the system uses the application pop-up menus traditionally associated with clicking the right mouse button on some text. The system inserts extra options into such menus, and causes them to be displayed as a result of activities such as scanning a paper document.

11.4. Web/Network Interfaces

In today's increasingly networked world, much of the functionality available on individual machines can also be accessed over a network, and the functionality associated with the described system is no exception. As an example, in an office environment, many paper documents received by a user may have been printed by other users' machines on the same corporate network. The system on one computer, in response to a capture, may be able to query those other machines for documents which may correspond to that capture, subject to the appropriate permission controls.

11.5. Printing of Document Causes Saving

An important factor in the integration of paper and digital documents is maintaining as much information as possible about the transitions between the two. In some embodiments, the OS keeps a simple record of when any document was printed and by whom. In some embodiments, the OS takes one or more further actions that would make it better suited for use with the system. Examples include:

- Saving the digital rendered version of every document printed along with information about the source from which it was printed
- Saving a subset of useful information about the printed version—for example, the fonts used and where the line breaks occur—which might aid future scan interpretation
- Saving the version of the source document associated with any printed copy
- Indexing the document automatically at the time of printing and storing the results for future searching

11.6. My (Printed/Scanned) Documents

An OS often maintains certain categories of folders or files that have particular significance. A user's documents may, by convention or design, be found in a "My Documents" folder, for example. Standard file-opening dialogs may automatically include a list of recently opened documents.

On an OS optimized for use with the described system, such categories may be enhanced or augmented in ways that take into account a user's interaction with paper versions of the stored files. Categories such as "My Printed Documents" or "My Recently-Read Documents" might usefully be identified and incorporated in its operations.

11.7. OS-Level Markup Hierarchies

Since important aspects of the system are typically provided using the "markup" concepts discussed in Section 5, it would clearly be advantageous to have support for such markup provided by the OS in a way that was accessible to multiple applications as well as to the OS itself. In addition, layers of markup may be provided by the OS, based on its own knowledge of documents under its control and the facilities it is able to provide.

11.8. Use of OS DRM Facilities

An increasing number of operating systems support some form of "Digital Rights Management": the ability to control the use of particular data according to the rights granted to a particular user, software entity or machine. It may inhibit unauthorized copying or distribution of a particular document, for example.

12. User Interface

The user interface of the system may be entirely on a PC, if the capture device is relatively dumb and is connected to it by a cable, or entirely on the device, if it is sophisticated and with significant processing power of its own. In some cases, some functionality resides in each component. Part, or indeed all, of the system's functionality may also be implemented on other devices such as mobile phones or PDAs.

The descriptions in the following sections are therefore indications of what may be desirable in certain implementations, but they are not necessarily appropriate for all and may be modified in several ways.

12.1. On the Capture Device

With all capture devices, but particularly in the case of an optical scanner, the user's attention will generally be on the device and the paper at the time of scanning. It is very desirable, then, that any input and feedback needed as part of the process of scanning do not require the user's attention to be elsewhere, for example on the screen of a computer, more than is necessary.

12.1.1. Feedback on Scanner

A handheld scanner may have a variety of ways of providing feedback to the user about particular conditions. The most obvious types are direct visual, where the scanner incorporates indicator lights or even a full display, and auditory, where the scanner can make beeps, clicks or other sounds. Important alternatives include tactile feedback, where the scanner can vibrate, buzz, or otherwise stimulate the user's sense of touch, and projected feedback, where it indicates a status by projecting onto the paper anything from a colored spot of light to a sophisticated display.

Important immediate feedback that may be provided on the device includes:

- feedback on the scanning process—user scanning too fast, at too great an angle, or drifting too high or low on a particular line
- sufficient content—enough has been scanned to be pretty certain of finding a match if one exists—important for disconnected operation
- context known—a source of the text has been located
- unique context known—one unique source of the text has been located
- availability of content—indication of whether the content is freely available to the user, or at a cost Many of the user interactions normally associated with the later stages of the system may also take place on the capture device if it has sufficient abilities, for example, to display part or all of a document.

12.1.2. Controls on Scanner

The device may provide a variety of ways for the user to provide input in addition to basic text capture. Even when the device is in close association with a host machine that has input options such as keyboards and mice, it can be disruptive for the user to switch back and forth between manipulating the scanner and using a mouse, for example.

The handheld scanner may have buttons, scroll/jog-wheels, touch-sensitive surfaces, and/or accelerometers for detecting the movement of the device. Some of these allow a richer set of interactions while still holding the scanner.

For example, in response to scanning some text, the system presents the user with a set of several possible matching documents. The user uses a scroll-wheel on the side of the scanner is to select one from the list, and clicks a button to confirm the selection.

12.1.3. Gestures

The primary reason for moving a scanner across the paper is to capture text, but some movements may be detected by the device and used to indicate other user intentions. Such movements are referred to herein as "gestures."

As an example, the user can indicate a large region of text by scanning the first few words in conventional left-to-right order, and the last few in reverse order, i.e. right to left. The user can also indicate the vertical extent of the text of interest by moving the scanner down the page over several lines. A backwards scan might indicate cancellation of the previous scan operation.

12.1.4. Online/Offline Behavior

Many aspects of the system may depend on network connectivity, either between components of the system such as a scanner and a host laptop, or with the outside world in the form of a connection to corporate databases and Internet search. This connectivity may not be present all the time, however, and so there will be occasions when part or all of the system may be considered to be "offline." It is desirable to allow the system to continue to function usefully in those circumstances.

The device may be used to capture text when it is out of contact with other parts of the system. A very simple device may simply be able to store the image or audio data associated with the capture, ideally with a timestamp indicating when it was captured. The various captures may be uploaded to the rest of the system when the device is next in contact with it, and handled then. The device may also upload other data associated with the captures, for example voice annotations associated with optical scans, or location information.

More sophisticated devices may be able to perform some or all of the system operations themselves despite being disconnected. Various techniques for improving their ability to do so are discussed in Section 15.3. Often it will be the case that some, but not all, of the desired actions can be performed while offline. For example, the text may be recognized, but identification of the source may depend on a connection to an Internet-based search engine. In some embodiments, the device therefore stores sufficient information about how far each operation has progressed for the rest of the system to proceed efficiently when connectivity is restored.

The operation of the system will, in general, benefit from immediately available connectivity, but there are some situations in which performing several captures and then processing them as a batch can have advantages. For example, as discussed in Section 13 below, the identification of the source of a particular capture may be greatly enhanced by examining other captures made by the user at approximately the same time. In a fully connected system where live feedback is being provided to the user, the system is only able to use past captures when processing the current one. If the capture is one of a batch stored by the device when offline, however, the system will be able to take into account any data available from later captures as well as earlier ones when doing its analysis.

12.2. On a Host Device

A scanner will often communicate with some other device, such as a PC, PDA, phone or digital camera to perform many of the functions of the system, including more detailed interactions with the user.

12.2.1. Activities Performed in Response to a Capture

When the host device receives a capture, it may initiate a variety of activities. An incomplete list of possible activities performed by the system after locating and electronic counterpart document associated with the capture and a location within that document follows.

- The details of the capture may be stored in the user's history. (Section 6.1)
- The document may be retrieved from local storage or a remote location. (Section 8)
- The operating system's metadata and other records associated with the document may be updated. (Section 11.1)
- Markup associated with the document may be examined to determine the next relevant operations. (Section 5)
- A software application may be started to edit, view or otherwise operate on the document. The choice of application may depend on the source document, or on the contents of the scan, or on some other aspect of the capture. (Section 11.2.2, 11.2.3)
- The application may scroll to, highlight, move the insertion point to, or otherwise indicate the location of the capture. (Section 11.3)
- The precise bounds of the captured text may be modified, for example to select whole words, sentences or paragraphs around the captured text. (Section 11.3.2)
- The user may be given the option to copy the capture text to the clipboard or perform other standard operating system or application-specific operations upon it.
- Annotations may be associated with the document or the captured text. These may come from immediate user input, or may have been captured earlier, for example in the case of voice annotations associated with an optical scan. (Section 19.4)
- Markup may be examined to determine a set of further possible operations for the user to select.

12.2.2. Contextual Popup Menus

Sometimes the appropriate action to be taken by the system will be obvious, but sometimes it will require a choice to be made by the user. One good way to do this is through the use of "popup menus" or, in cases where the content is also being displayed on a screen, with so-called "contextual menus" that appear close to the content. (See Section 11.3.3). In some embodiments, the scanner device projects a popup menu onto the paper document. A user may select from such menus using traditional methods such as a keyboard and mouse, or by using controls on the capture device (Section 12.1.2), gestures (Section 12.1.3), or by interacting with the computer display using the scanner (Section 12.2.4). In some embodiments, the popup menus which can appear as a result of a capture include default items representing actions which occur if the user does not respond—for example, if the user ignores the menu and makes another capture.

12.2.3. Feedback on Disambiguation

When a user starts capturing text, there will initially be several documents or other text locations that it could match. As more text is captured, and other factors are taken into account (Section 13), the number of candidate locations will decrease until the actual location is identified, or further disambiguation is not possible without user input. In some embodiments, the system provides a real-time display of the documents or the locations found, for example in list, thumbnail-image or text-segment form, and for the number of elements in that display to reduce in number as capture continues. In some embodiments, the system displays thumbnails of all candidate documents, where the size or position of the thumbnail is dependent on the probability of it being the correct match.

When a capture is unambiguously identified, this fact may be emphasized to the user, for example using audio feedback.

Sometimes the text captured will occur in many documents and will be recognized to be a quotation. The system may indicate this on the screen, for example by grouping documents containing a quoted reference around the original source document.

12.2.4. Scanning from Screen

Some optical scanners may be able to capture text displayed on a screen as well as on paper. Accordingly, the term rendered document is used herein to indicate that printing onto paper is not the only form of rendering, and that the capture of text or symbols for use by the system may be equally valuable when that text is displayed on an electronic display.

The user of the described system may be required to interact with a computer screen for a variety of other reasons, such as to select from a list of options. It can be inconvenient for the user to put down the scanner and start using the mouse or keyboard. Other sections have described physical controls on the scanner (Section 12.1.2) or gestures (Section 12.1.3) as methods of input which do not require this change of tool, but using the scanner on the screen itself to scan some text or symbol is an important alternative provided by the system.

In some embodiments, the optics of the scanner allow it to be used in a similar manner to a light-pen, directly sensing its position on the screen without the need for actual scanning of text, possibly with the aid of special hardware or software on the computer.

13. Context Interpretation

An important aspect of the described system is the use of other factors, beyond the simple capture' of a string of text, to help identify the document in use. A capture of a modest amount of text may often identify the document uniquely, but in many situations it will identify a few candidate documents. One solution is to prompt the user to confirm the document being scanned, but a preferable alternative is to make use of other factors to narrow down the possibilities automatically. Such supplemental information can dramatically reduce the amount of text that needs to be captured and/or increase the reliability and speed with which the location in the electronic counterpart can be identified. This extra material is referred to as "context," and it was discussed briefly in Section 4.2.2. We now consider it in more depth.

13.1. System and Capture Context

Perhaps the most important example of such information is the user's capture history.

It is highly probable that any given capture comes from the same document as the previous one, or from an associated document, especially if the previous capture took place in the last few minutes (Section 6.1.2). Conversely, if the system detects that the font has changed between two scans, it is more likely that they are from different documents.

Also useful are the user's longer-term capture history and reading habits. These can also be used to develop a model of the user's interests and associations.

13.2. User's Real-World Context

Another example of useful context is the user's geographical location. A user in Paris is much more likely to be reading Le Monde than the Seattle Times, for example. The timing, size and geographical distribution of printed versions of the documents can therefore be important, and can to some degree be deduced from the operation of the system.

The time of day may also be relevant, for example in the case of a user who always reads one type of publication on the way to work, and a different one at lunchtime or on the train going home.

13.3. Related Digital Context

The user's recent use of electronic documents, including those searched for or retrieved by more conventional means, can also be a helpful indicator.

In some cases, such as on a corporate network, other factors may be usefully considered:

Which documents have been printed recently?
Which documents have been modified recently on the corporate file server?
Which documents have been emailed recently?

All of these examples might suggest that a user was more likely to be reading a paper version of those documents. In contrast, if the repository in which a document resides can affirm that the document has never been printed or sent anywhere where it might have been printed, then it can be safely eliminated in any searches originating from paper.

13.4. Other Statistics—the Global Context

Section 14 covers the analysis of the data stream resulting from paper-based searches, but it should be noted here that statistics about the popularity of documents with other readers, about the timing of that popularity, and about the parts of documents most frequently scanned are all examples of further factors which can be beneficial in the search process. The system brings the possibility of Google-type page-ranking to the world of paper.

See also Section 4.2.2 for some other implications of the use of context for search engines.

14. Data-Stream Analysis

The use of the system generates an exceedingly valuable data-stream as a side effect. This stream is a record of what users are reading and when, and is in many cases a record of what they find particularly valuable in the things they read. Such data has never really been available before for paper documents.

Some ways in which this data can be useful for the system, and for the user of the system, are described in Section 6.1. This section concentrates on its use for others. There are, of course, substantial privacy issues to be considered with any distribution of data about what people are reading, but such issues as preserving the anonymity of data are well known to those of skill in the art.

14.1. Document Tracking

When the system knows which documents any given user is reading, it can also deduce who is reading any given document. This allows the tracking of a document through an organization, to allow analysis, for example, of who is reading it and when, how widely it was distributed, how long that distribution took, and who has seen current versions while others are still working from out-of-date copies.

For published documents that have a wider distribution, the tracking of individual copies is more difficult, but the analysis of the distribution of readership is still possible.

14.2. Read Ranking—Popularity of Documents and Sub-Regions

In situations where users are capturing text or other data that is of particular interest to them, the system can deduce the popularity of certain documents and of particular sub-regions of those documents. This forms a valuable input to the system itself (Section 4.2.2) and an important source of information for authors, publishers and advertisers (Section 7.6, Section 10.5). This data is also useful when integrated in search engines and search indices—for example, to assist in ranking search results for queries coming from rendered documents, and/or to assist in ranking conventional queries typed into a web browser.

14.3. Analysis of Users—Building Profiles

Knowledge of what a user is reading enables the system to create a quite detailed model of the user's interests and activities. This can be useful on an abstract statistical basis—"35% of users who buy this newspaper also read the latest book by that author"—but it can also allow other interactions with the individual user, as discussed below.

14.3.1. Social Networking

One example is connecting one user with others who have related interests. These may be people already known to the user. The system may ask a university professor, "Did you know that your colleague at XYZ University has also just read this paper?" The system may ask a user, "Do you want to be linked up with other people in your neighborhood who are also how reading Jane Eyre?" Such links may be the basis for the automatic formation of book clubs and similar social structures, either in the physical world or online.

14.3.2. Marketing

Section 10.6 has already mentioned the idea of offering products and services to an individual user based on their interactions with the system. Current online booksellers, for example, often make recommendations to a user based on their previous interactions with the bookseller. Such recommendations become much more useful when they are based on interactions with the actual books.

14.4. Marketing Based on Other Aspects of the Data-Stream

We have discussed some of the ways in which the system may influence those publishing documents, those advertising through them, and other sales initiated from paper (Section 10). Some commercial activities may have no direct interaction with the paper documents at all and yet may be influenced by them. For example, the knowledge that people in one community spend more time reading the sports section of the newspaper than they do the financial section might be of interest to somebody setting up a health club.

14.5. Types of Data that May be Captured

In addition to the statistics discussed, such as who is reading which bits of which documents, and when and where, it can be of interest to examine the actual contents of the text captured, regardless of whether or not the document has been located.

In many situations, the user will also not just be capturing some text, but will be causing some action to occur as a result. It might be emailing a reference to the document to an acquaintance, for example. Even in the absence of information about the identity of the user or the recipient of the email, the knowledge that somebody considered the document worth emailing is very useful.

In addition to the various methods discussed for deducing the value of a particular document or piece of text, in some circumstances the user will explicitly indicate the value by assigning it a rating.

Lastly, when a particular set of users are known to form a group, for example when they are known to be employees of a particular company, the aggregated statistics of that group can be used to deduce the importance of a particular document to that group.

15. Device Features and Functions

A capture device for use with the system needs little more than a way of capturing text from a rendered version of the document. As described earlier (Section 1.2), this capture may be achieved through a variety of methods including taking a photograph of part of the document or typing some words into a mobile phone keypad. This capture may be achieved using a small hand-held optical scanner capable of recording a line or two of text at a time, or an audio capture device such as a voice-recorder into which the user is reading text from the document. The device used may be a combination of these—an optical scanner which could also record voice annotations, for example—and the capturing functionality may be built into some other device such as a mobile phone, PDA, digital camera or portable music player.

15.1. Input and Output

Many of the possibly beneficial additional input and output facilities for such a device have been described in Section 12.1. They include buttons, scroll-wheels and touch-pads for input, and displays, indicator lights, audio and tactile transducers for output. Sometimes the device will incorporate many of these, sometimes very few. Sometimes the capture device will be able to communicate with another device that already has them (Section 15.6), for example using a wireless link, and sometimes the capture functionality will be incorporated into such other device (Section 15.7).

15.2. Connectivity

In some embodiments, the device implements the majority of the system itself. In some embodiments, however, it often communicates with a PC or other computing device and with the wider world using communications facilities.

Often these communications facilities are in the form of a general-purpose data network such as Ethernet, 802.11 or UWB or a standard peripheral-connecting network such as USB, IEEE-1394 (Firewire), Bluetooth™ or infra-red. When a wired connection such as Firewire or USB is used, the device may receive electrical power though the same connection. In some circumstances, the capture device may appear to a connected machine to be a conventional peripheral such as a USB storage device.

Lastly, the device may in some circumstances "dock" with another device, either to be used in conjunction with that device or for convenient storage.

15.3. Caching and Other Online/Offline Functionality

Sections 3.5 and 12.1.4 have raised the topic of disconnected operation. When a capture device has a limited subset of the total system's functionality, and is not in communication with the other parts of the system, the device can still be useful, though the functionality available will sometimes be reduced. At the simplest level, the device can record the raw image or audio data being captured and this can be processed later. For the user's benefit, however, it can be important to give feedback where possible about whether the data captured is likely to be sufficient for the task in hand, whether it can be recognized or is likely to be recognizable, and whether the source of the data can be identified or is likely to be identifiable later. The user will then know whether their capturing activity is worthwhile. Even when all of the above are unknown, the raw data can still be stored so that, at the very least, the user can refer to them later. The user may be presented with the image of a scan, for example, when the scan cannot be recognized by the OCR process.

To illustrate some of the range of options available, both a rather minimal optical scanning device and then a much more full-featured one are described below. Many devices occupy a middle ground between the two.

15.3.1. The SimpleScanner—A Low-End Offline Example

The SimpleScanner has a scanning head able to read pixels from the page as it is moved along the length of a line of text. It can detect its movement along the page and record the pixels with some information about the movement. It also has a clock, which allows each scan to be time-stamped. The clock is synchronized with a host device when the SimpleScanner has connectivity. The clock may not represent the actual time of day, but relative times may be determined from it so that the host can deduce the actual time of a scan, or at worst the elapsed time between scans.

The SimpleScanner does not have sufficient processing power to perform any OCR itself, but it does have some basic knowledge about typical word-lengths, word-spacings, and their relationship to font size. It has some basic indicator lights which tell the user whether the scan is likely to be readable, whether the head is being moved too fast, too slowly or too inaccurately across the paper, and when it determines that sufficient words of a given size are likely to have been scanned for the document to be identified.

The SimpleScanner has a USB connector and can be plugged into the USB port on a computer, where it will be recharged. To the computer it appears to be a USB storage device on which time-stamped data files have been recorded, and the rest of the system software takes over from this point.

15.3.2. The SuperScanner—A High-End Offline Example

The SuperScanner also depends on connectivity for its full operation, but it has a significant amount of on-board storage and processing which can help it make better judgments about the data captured while offline.

As it moves along the line of text, the captured pixels are stitched together and passed to an OCR engine that attempts to recognize the text. A number of fonts, including those from the user's most-read publications, have been downloaded to it to help perform this task, as has a dictionary that is synchronized with the user's spelling-checker dictionary on their PC and so contains many of the words they frequently encounter. Also stored on the scanner is a list of words and phrases with the typical frequency of their use—this may be combined with the dictionary. The scanner can use the frequency statistics both to help with the recognition process and also to inform its judgment about when a sufficient quantity of text has been captured; more frequently used phrases are less likely to be useful as the basis for a search query.

In addition, the full index for the articles in the recent issues of the newspapers and periodicals most commonly read by the user are stored on the device, as are the indices for the books the user has recently purchased from an online bookseller, or from which the user has scanned anything within the last few months. Lastly, the titles of several thousand of the most popular publications which have data available for the system are stored so that, in the absence of other information the user can scan the title and have a good idea as to whether or not captures from a particular work are likely to be retrievable in electronic form later.

During the scanning process, the system informs user that the captured data has been of sufficient quality and of a sufficient nature to make it probable that the electronic copy can be retrieved when connectivity is restored. Often the system indicates to the user that the scan is known to have been successful and that the context has been recognized in one of the on-board indices, or that the publication concerned is known to be making its data available to the system, so the later retrieval ought to be successful.

The SuperScanner docks in a cradle connected to a PC's Firewire or USB port, at which point, in addition to the upload of captured data, its various onboard indices and other databases are updated based on recent user activity and new publications. It also has the facility to connect to wireless public networks or to communicate via Bluetooth to a mobile phone and thence with the public network when such facilities are available.

15.4. Features for Optical Scanning

We now consider some of the features that may be particularly desirable in an optical scanner device.

15.4.1. Flexible Positioning and Convenient Optics

One of the reasons for the continuing popularity of paper is the ease of its use in a wide variety of situations where a computer, for example, would be impractical or inconvenient. A device intended to capture a substantial part of a user's interaction with paper should therefore be similarly convenient in use. This has not been the case for scanners in the past; even the smallest hand-held devices have been somewhat unwieldy. Those designed to be in contact with the page have to be held at a precise angle to the paper and moved very carefully along the length of the text to be scanned. This is acceptable when scanning a business report on an office desk, but may be impractical when scanning a phrase from a novel while waiting for a train. Scanners based on camera-type optics that operate at a distance from the paper may similarly be useful in some circumstances.

Some embodiments of the system use a scanner that scans in contact with the paper, and which, instead of lenses, uses an image conduit a bundle of optical fibers to transmit the image from the page to the optical sensor device. Such a device can be shaped to allow it to be held in a natural position; for example, in some embodiments, the part in contact with the page is wedge-shaped, allowing the user's hand to move more naturally over the page in a movement similar to the use of a highlighter pen. The conduit is either in direct contact with the paper or in close proximity to it, and may have a replaceable transparent tip that can protect the image conduit from possible damage. As has been mentioned in Section 12.2.4, the scanner may be used to scan from a screen as well as from paper, and the material of the tip can be chosen to reduce the likelihood of damage to such displays.

Lastly, some embodiments of the device will provide feedback to the user during the scanning process which will indicate through the use of light, sound or tactile feedback when the user is scanning too fast, too slow, too unevenly or is drifting too high or low on the scanned line.

15.5. Security, Identity, Authentication, Personalization and Billing

As described in Section 6, the capture device may form an important part of identification and authorization for secure transactions, purchases, and a variety of other operations. It may therefore incorporate, in addition to the circuitry and software required for such a role, various hardware features that can make it more secure, such as a smartcard reader, RFID, or a keypad on which to type a PIN.

It may also include various biometric sensors to help identify the user. In the case of an optical scanner, for example, the scanning head may also be able to read a fingerprint. For a voice recorder, the voice pattern of the user may be used.

15.6. Device Associations

In some embodiments, the device is able to form an association with other nearby devices to increase either its own or their functionality. In some embodiments, for example, it uses the display of a nearby PC or phone to give more detailed feedback about its operation, or uses their network connectivity. The device may, on the other hand, operate in its role as a security and identification device to authenticate operations performed by the other device. Or it may simply form an association in order to function as a peripheral to that device.

An interesting aspect of such associations is that they may be initiated and authenticated using the capture facilities of the device. For example, a user wishing to identify themselves securely to a public computer terminal may use the scanning facilities of the device to scan a code or symbol displayed on a particular area of the terminal's screen and so effect a key transfer. An analogous process may be performed using audio signals picked up by a voice-recording device.

15.7. Integration with Other Devices

In some embodiments, the functionality of the capture device is integrated into some other device that is already in use. The integrated devices may be able to share a power supply, data capture and storage capabilities, and network interfaces. Such integration may be done simply for convenience, to reduce cost, or to enable functionality that would not otherwise be available.

Some examples of devices into which the capture functionality can be integrated include:

- an existing peripheral such as a mouse, a stylus, a USB "webcam" camera, a Bluetooth™ headset or a remote control
- another processing/storage device, such as a PDA, an MP3 player, a voice recorder, a digital camera or a mobile phone
- other often-carried items, just for convenience—a watch, a piece of jewelry, a pen, a car key fob

15.7.1. Mobile Phone Integration

As an example of the benefits of integration, we consider the use of a modified mobile phone as the capture device.

In some embodiments, the phone hardware is not modified to support the system, such as where the text capture can be adequately done through voice recognition, where they can either be processed by the phone itself, or handled by a system at the other end of a telephone call, or stored in the phone's memory for future processing. Many modern phones have the ability to download software that could implement some parts of the system. Such voice capture is likely to be suboptimal in many situations, however, for example when there is substantial background noise, and accurate voice recognition is a difficult task at the best of times. The audio facilities may best be used to capture voice annotations.

In some embodiments, the camera built into many mobile phones is used to capture an image of the text. The phone display, which would normally act as a viewfinder for the camera, may overlay on the live camera image information about the quality of the image and its suitability for OCR, which segments of text are being captured, and even a transcription of the text if the OCR can be performed on the phone.

In some embodiments, the phone is modified to add dedicated capture facilities, or to provide such functionality in a clip-on adaptor or a separate Bluetooth-connected peripheral in communication with the phone. Whatever the nature of the capture mechanism, the integration with a modern cellphone has many other advantages. The phone has connectivity with the wider world, which means that queries can be submitted to remote search engines or other parts of the system, and copies of documents may be retrieved for immediate storage or viewing. A phone typically has sufficient processing power for many of the functions of the system to be performed locally, and sufficient storage to capture a reasonable amount of data. The amount of storage can also often be expanded by the user. Phones have reasonably good displays and audio facilities to provide user feedback, and often a vibrate function for tactile feedback. They also have good power supplies.

Most significantly of all, they are a device that most users are already carrying.

Part III—Example Applications of the System

This section lists example uses of the system and applications that may be built on it. This list is intended to be purely illustrative and in no sense exhaustive.

16. Personal Applications 16.1. Life Library

The Life Library (see also Section 6.1.1) is a digital archive of any important documents that the subscriber wishes to save and is a set of embodiments of services of this system. Important books, magazine articles, newspaper clippings, etc., can all be saved in digital form in the Life Library. Additionally, the subscriber's annotations, comments, and notes can be saved with the documents. The Life Library can be accessed via the Internet and World Wide Web.

The system creates and manages the Life Library document archive for subscribers. The subscriber indicates which documents the subscriber wishes to have saved in his life library by scanning information from the document or by otherwise indicating to the system that the particular document is to be added to the subscriber's Life Library. The scanned information is typically text from the document but can also be a barcode or other code identifying the document. The system accepts the code and uses it to identify the source document. After the document is identified the system can store either a copy of the document in the user's Life Library or a link to a source where the document may be obtained.

One embodiment of the Life Library system can check whether the subscriber is authorized to obtain the electronic copy. For example, if a reader scans text or an identifier from a copy of an article in the New York Times (NYT) so that the article will be added to the reader's Life Library, the Life Library system will verify with the NYT whether the reader is subscribed to the online version of the NYT; if so, the reader gets a copy of the article stored in his Life Library account; if not, information identifying the document and how to order it is stored in his Life Library account.

In some embodiments, the system maintains a subscriber profile for each subscriber that includes access privilege information. Document access information can be compiled in several ways, two of which are: 1) the subscriber supplies the document access information to the Life Library system, along with his account names and passwords, etc., or 2) the Life Library service provider queries the publisher with the subscriber's information and the publisher responds by providing access to an electronic copy if the Life Library subscriber is authorized to access the material. If the Life Library subscriber is not authorized to have an electronic copy of the document, the publisher provides a price to the Life Library service provider, which then provides the customer with the option to purchase the electronic document. If so, the Life Library service provider either pays the publisher directly and bills the Life Library customer later or the Life Library service provider immediately bills the customer's credit card for the purchase. The Life Library service provider would get a percentage of the purchase price or a small fixed fee for facilitating the transaction.

The system can archive the document in the subscriber's personal library and/or any other library to which the subscriber has archival privileges. For example, as a user scans text from a printed document, the Life Library system can identify the rendered document and its electronic counterpart. After the source document is identified, the Life Library system might record information about the source document in the user's personal library and in a group library to which the subscriber has archival privileges. Group libraries are collaborative archives such as a document repository for: a group working together on a project, a group of academic researchers, a group web log, etc.

The life library can be organized in many ways: chronologically, by topic, by level of the subscriber's interest, by type of publication (newspaper, book, magazine, technical paper, etc.), where read, when read, by ISBN or by Dewey decimal, etc. In one alternative, the system can learn classifications based on how other subscribers have classified the same document. The system can suggest classifications to the user or automatically classify the document for the user.

In various embodiments, annotations may be inserted directly into the document or may be maintained in a separate file. For example, when a subscriber scans text from a newspaper article, the article is archived in his Life Library with the scanned text highlighted. Alternatively, the article is archived in his Life Library along with an associated annotation file (thus leaving the archived document unmodified). Embodiments of the system can keep a copy of the source document in each subscriber's library, a copy in a master library that many subscribers can access, or link to a copy held by the publisher.

In some embodiments, the Life Library stores only the user's modifications to the document (e.g., highlights, etc.) and a link to an online version of the document (stored elsewhere). The system or the subscriber merges the changes with the document when the subscriber subsequently retrieves the document.

If the annotations are kept in a separate file, the source document and the annotation file are provided to the subscriber and the subscriber combines them to create a modified document. Alternatively, the system combines the two files prior to presenting them to the subscriber. In another alternative, the annotation file is an overlay to the document file and can be overlaid on the document by software in the subscriber's computer.

Subscribers to the Life Library service pay a monthly fee to have the system maintain the subscriber's archive. Alternatively, the subscriber pays a small amount (e.g., a micropayment) for each document stored in the archive. Alternatively, the subscriber pays to access the subscriber's archive on a per-access fee. Alternatively, subscribers can compile libraries and allow others to access the materials/annotations on a revenue share model with the Life Library service provider and copyright holders. Alternatively, the Life Library service provider receives a payment from the publisher when the Life Library subscriber orders a document (a revenue share model with the publisher, where the Life Library service provider gets a share of the publisher's revenue).

In some embodiments, the Life Library service provider acts as an intermediary between the subscriber and the copyright holder (or copyright holder's agent, such as the Copyright Clearance Center, a.k.a. CCC) to facilitate billing and payment for copyrighted materials. The Life Library service provider uses the subscriber's billing information and other user account information to provide this intermediation service. Essentially, the Life Library service provider leverages the pre-existing relationship with the subscriber to enable purchase of copyrighted materials on behalf of the subscriber.

In some embodiments, the Life Library system can store excerpts from documents. For example, when a subscriber scans text from a paper document, the regions around the scanned text are excerpted and placed in the Life Library, rather than the entire document being archived in the life library. This is especially advantageous when the document is long because preserving the circumstances of the original scan prevents the subscriber from re-reading the document to find the interesting portions. Of course, a hyperlink to the entire electronic counterpart of the paper document can be included with the excerpt materials.

In some embodiments, the system also stores information about the document in the Life Library, such as author, publication title, publication date, publisher, copyright holder (or copyright holder's licensing agent), ISBN, links to public annotations of the document, readrank, etc. Some of this additional information about the document is a form of paper document metadata. Third parties may create public annotation files for access by persons other than themselves, such the general public. Linking to a third party's commentary on a document is advantageous because reading annotation files of other users enhances the subscriber's understanding of the document.

In some embodiments, the system archives materials by class. This feature allows a Life Library subscriber to quickly store electronic counterparts to an entire class of paper documents without access to each paper document. For example, when the subscriber scans some text from a copy of National Geographic magazine, the system provides the subscriber with the option to archive all back issues of the National Geographic. If the subscriber elects to archive all back issues, the Life Library service provider would then verify with the National Geographic Society whether the subscriber is authorized to do so. If not, the Life Library service provider can mediate the purchase of the right to archive the National Geographic magazine collection.

16.2. Life Saver

A variation on, or enhancement of, the Life Library concept is the "Life Saver," where the system uses the text captured by a user to deduce more about their other activities. The scanning of a menu from a particular restaurant, a program from a particular theater performance, a timetable at a particular railway station, or an article from a local newspaper allows the system to make deductions about the user's location and social activities, and could construct an automatic diary for them, for example as a website. The user would be able to edit and modify the diary, add additional materials such as photographs and, of course, look again at the items scanned.

17. Academic Applications

Portable scanners supported by the described system have many compelling uses in the academic setting. They can enhance student/teacher interaction and augment the learning experience. Among other uses, students can annotate study materials to suit their unique needs; teachers can monitor classroom performance; and teachers can automatically verify source materials cited in student assignments.

17.1. Children's Books

A child's interaction with a paper document, such as a book, is monitored by a literacy acquisition system that employs a specific set of embodiments of this system. The child uses a portable scanner that communicates with other elements of the literacy acquisition system. In addition to the portable scanner, the literacy acquisition system includes a computer having a display and speakers, and a database accessible by the computer. The scanner is coupled with the computer (hardwired, short range RF, etc.). When the child sees an unknown word in the book, the child scans it with the scanner. In one embodiment, the literacy acquisition system compares the scanned text with the resources in its database to identify the word. The database includes a dictionary, thesaurus, and/or multimedia files (e.g., sound, graphics, etc.). After the word has been identified, the system uses the computer speakers to pronounce the word and its definition to the child. In another embodiment, the word and its definition are displayed by the literacy acquisition system on the computer's monitor. Multimedia files about the scanned word can also be played through the computer's monitor and speakers. For example, if a child reading "Goldilocks and the Three Bears" scanned the word "bear," the system might pronounce the word "bear" and play a short video about bears on the computer's monitor. In this way, the child learns to pronounce the written word and is visually taught what the word means via the multimedia presentation.

The literacy acquisition system provides immediate auditory and/or visual information to enhance the learning process. The child uses this supplementary information to quickly acquire a deeper understanding of the written material. The system can be used to teach beginning readers to read, to help children acquire a larger vocabulary, etc. This system provides the child with information about words with which the child is unfamiliar or about which the child wants more information.

17.2. Literacy Acquisition

In some embodiments, the system compiles personal dictionaries. If the reader sees a word that is new, interesting, or particularly useful or troublesome, the reader saves it (along with its definition) to a computer file. This computer file becomes the reader's personalized dictionary. This dictionary is generally smaller in size than a general dictionary so can be downloaded to a mobile station or associated device and thus be available even when the system isn't immediately accessible. In some embodiments, the personal dictionary entries include audio files to assist with proper word pronunciation and information identifying the paper document from which the word was scanned.

In some embodiments, the system creates customized spelling and vocabulary tests for students. For example, as a student reads an assignment, the student may scan unfamiliar words with the portable scanner. The system stores a list of all the words that the student has scanned. Later, the system administers a customized spelling/vocabulary test to the student on an associated monitor (or prints such a test on an associated printer).

17.3. Music Teaching

The arrangement of notes on a musical staff is similar to the arrangement of letters in a line of text. The same scanning device discussed for capturing text in this system can be used to capture music notation, and an analogous process of constructing a search against databases of known musical pieces would allow the piece from which the capture occurred to be identified which can then be retrieved, played, or be the basis for some further action.

17.4. Detecting Plagiarism

Teachers can use the system to detect plagiarism or to verify sources by scanning text from student papers and submitting the scanned text to the system. For example, a teacher who wishes to verify that a quote in a student paper came from the source that the student cited can scan a portion of the quote and compare the title of the document identified by the system with the title of the document cited by the student. Likewise, the system can use scans of text from assignments submitted as the student's original work to reveal if the text was instead copied.

17.5. Enhanced Textbook

In some embodiments, capturing text from an academic textbook links students or staff to more detailed explanations, further exercises, student and staff discussions about the material, related example past exam questions, further reading on the subject, recordings of the lectures on the subject, and so forth. (See also Section 7.1.)

17.6. Language Learning

In some embodiments, the system is used to teach foreign languages. Scanning a Spanish word, for example, might cause the word to be read aloud in Spanish along with its definition in English.

The system provides immediate auditory and/or visual information to enhance the new language acquisition process. The reader uses this supplementary information to acquire quickly a deeper understanding of the material. The system can be used to teach beginning students to read foreign languages, to help students acquire a larger vocabulary, etc. The system provides information about foreign words with which the reader is unfamiliar or for which the reader wants more information.

Reader interaction with a paper document, such as a newspaper or book, is monitored by a language skills system. The reader has a portable scanner that communicates with the language skills system. In some embodiments, the language skills system includes a computer having a display and speakers, and a database accessible by the computer. The scanner communicates with the computer (hardwired, short range RF, etc.). When the reader sees an unknown word in an article, the reader scans it with the scanner. The database includes a foreign language dictionary, thesaurus, and/or multimedia files (sound, graphics, etc.). In one embodiment, the system compares the scanned text with the resources in its database to identify the scanned word. After the word has been identified, the system uses the computer speakers to pronounce the word and its definition to the reader. In some embodiments, the word and its definition are both displayed on the computer's monitor. Multimedia files about grammar tips related to the scanned word can also be played through the computer's monitor and speakers. For example, if the words "to speak" are scanned, the system might pronounce the word "hablar," play a short audio clip that demonstrates the proper Spanish pronunciation, and display a complete list of the various conjugations of "hablar." In this way, the student learns to pronounce the written word, is visually taught the spelling of the word via the multimedia presentation, and learns how to conjugate the verb. The system can also present grammar tips about the proper usage of "hablar" along with common phrases.

In some embodiments, the user scans a word or short phrase from a rendered document in a language other than the user's native language (or some other language that the user knows reasonably well). In some embodiments, the system maintains a prioritized list of the user's "preferred" languages. The system identifies the electronic counterpart of the rendered document, and determines the location of the scan within the document. The system also identifies a second electronic counterpart of the document that has been translated into one of the user's preferred languages, and determines the location in the translated document corresponding to the location of the scan in the original document. When the corresponding location is not known precisely, the system identifies a small region (e.g., a paragraph) that includes the corresponding location of the scanned location. The corresponding translated location is then presented to the user. This provides the user with a precise translation of the particular usage at the scanned location, including any slang or other idiomatic usage that is often difficult to accurately translate on a word-by-word basis.

17.7. Gathering Research Materials

A user researching a particular topic may encounter all sorts of material, both in print and on screen, which they might wish to record as relevant to the topic in some personal archive. The system would enable this process to be automatic as a result of scanning a short phrase in any piece of material, and could also create a bibliography suitable for insertion into a publication on the subject.

18. Commercial Applications

Obviously, commercial activities could be made out of almost any process discussed in this document, but here we concentrate on a few obvious revenue streams.

18.1. Fee-Based Searching and Indexing

Conventional Internet search engines typically provide free search of electronic documents, and also make no charge to the content providers for including their content in the index. In some embodiments, the system provides for charges to users and/or payments to search engines and/or content providers in connection with the operation and use of the system.

In some embodiments, subscribers to the system's services pay a fee for searches originating from scans of paper documents. For example, a stockbroker may be reading a Wall Street Journal article about a new product offered by Company X. By scanning the Company X name from the paper document and agreeing to pay the necessary fees, the stockbroker uses the system to search special or proprietary databases to obtain premium information about the company, such as analyst's reports. The system can also make arrangements to have priority indexing of the documents most likely to be read in paper form, for example by making sure all of the newspapers published on a particular day are indexed and available by the time they hit the streets.

Content providers may pay a fee to be associated with certain terms in search queries submitted from paper documents. For example, in one embodiment, the system chooses a most preferred content provider based on additional context about the provider (the context being, in this case, that the content provider has paid a fee to be moved up the results list). In essence, the search provider is adjusting paper document search results based on pre-existing financial arrangements with a content provider. See also the description of keywords and key phrases in Section 5.2.

Where access to particular content is to be restricted to certain groups of people (such as clients or employees), such content may be protected by a firewall and thus not generally indexable by third parties. The content provider may nonetheless wish to provide an index to the protected content. In such a case, the content provider can pay a service provider to provide the content provider's index to system subscribers. For example, a law firm may index all of a client's documents. The documents are stored behind the law firm's firewall. However, the law firm wants its employees and the client to have access to the documents through the portable scanner so it provides the index (or a pointer to the index) to the service provider, which in turn searches the law firm's index when employees or clients of the law firm submit paper-scanned search terms via their portable scanners. The law firm can provide a list of employees and/or clients to the service provider's system to enable this function or the system can verify access rights by querying the law firm prior to searching the law firm's index. Note that in the preceding example, the index provided by the law firm is only of that client's documents, not an index of all documents at the law firm. Thus, the service provider can only grant the law firm's clients access to the documents that the law firm indexed for the client.

There are at least two separate revenue streams that can result from searches originating from paper documents: one revenue stream from the search function, and another from the content delivery function. The search function revenue can be generated from paid subscriptions from the scanner users, but can also be generated on a per-search charge. The content delivery revenue can be shared with the content provider or copyright holder (the service provider can take a percentage of the sale or a fixed fee, such as a micropayment, for each delivery), but also can be generated by a "referral" model in which the system gets a fee or percentage for every item that the subscriber orders from the online catalog and that the system has delivered or contributed to, regardless of whether the service provider intermediates the transaction. In some embodiments, the system service provider receives revenue for all purchases that the subscriber made from the content provider, either for some predetermined period of time or at any subsequent time when a purchase of an identified product is made.

18.2. Catalogs

Consumers may use the portable scanner to make purchases from paper catalogs. The subscriber scans information from the catalog that identifies the catalog. This information is text from the catalog, a bar code, or another identifier of the catalog. The subscriber scans information identifying the products that s/he wishes to purchase. The catalog mailing label may contain a customer identification number that identifies the customer to the catalog vendor. If so, the subscriber can also scan this customer identification number. The system acts as an intermediary between the subscriber and the vendor to facilitate the catalog purchase by providing the customer's selection and customer identification number to the vendor.

18.3. Coupons

A consumer scans paper coupons and saves an electronic copy of the coupon in the scanner, or in a remote device such as a computer, for later retrieval and use. An advantage of electronic storage is that the consumer is freed from the burden of carrying paper coupons. A further advantage is that the electronic coupons may be retrieved from any location. In some embodiments, the system can track coupon expiration dates, alert the consumer about coupons that will expire soon, and/or delete expired coupons from storage. An advantage for the issuer of the coupons is the possibility of receiving more feedback about who is using the coupons and when and where they are captured and used.

19. General Applications

19.1. Forms

The system may be used to auto-populate an electronic document that corresponds to a paper form. A user scans in some text or a barcode that uniquely identifies the paper form. The scanner communicates the identity of the form and information identifying the user to a nearby computer. The nearby computer has an Internet connection. The nearby computer can access a first database of forms and a second database having information about the user of the scanner (such as a service providers subscriber information database). The nearby computer accesses an electronic version of the paper form from the first database and auto-populates the fields of the form from the user's information obtained from the second database. The nearby computer then emails the completed form to the intended recipient. Alternatively, the computer could print the completed form on a nearby printer.

Rather than access an external database, in some embodiments, the system has a portable scanner that contains the user's information, such as in an identity module, SIM, or security card. The scanner provides information identifying the form to the nearby PC. The nearby PC accesses the electronic form and queries the scanner for any necessary information to fill out the form.

19.2. Business Cards

The system can be used to automatically populate electronic address books or other contact lists from paper documents. For example, upon receiving a new acquaintance's business card, a user can capture an image of the card with his/her cellular phone. The system will locate an electronic copy of the card, which can be used to update the cellular phone's onboard address book with the new acquaintance's contact information. The electronic copy may contain more information about the new acquaintance than can be squeezed onto a business card. Further, the onboard address book may also store a link to the electronic copy such that any changes to the electronic copy will be automatically updated in the cell phone's address book. In this example, the business card optionally includes a symbol or text that indicates the existence of an electronic copy. If no electronic copy exists, the cellular phone can use OCR and knowledge of standard business card formats to fill out an entry in the address book for the new acquaintance. Symbols may also aid in the process of extracting information directly from the image. For example, a phone icon next to the phone number on the business card can be recognized to determine the location of the phone number.

19.3. Proofreading/Editing

The system can enhance the proofreading and editing process. One way the system can enhance the editing process is by linking the editor's interactions with a paper document to its electronic counterpart. As an editor reads a paper document and scans various parts of the document, the system will make the appropriate annotations or edits to an electronic counterpart of the paper document. For example, if the editor scans a portion of text and makes the "new paragraph" control gesture with the scanner, a computer in communication with the scanner would insert a "new paragraph" break at the location of the scanned text in the electronic copy of the document.

19.4. Voice Annotation

A user can make voice annotations to a document by scanning a portion of text from the document and then making a voice recording that is associated with the scanned text. In some embodiments, the scanner has a microphone to record the user's verbal annotations. After the verbal annotations are recorded, the system identifies the document from which the text was scanned, locates the scanned text within the document, and attaches the voice annotation at that point. In some embodiments, the system converts the speech to text and attaches the annotation as a textual comment.

In some embodiments, the system keeps annotations separate from the document, with only a reference to the annotation kept with the document. The annotations then become an annotation markup layer to the document for a specific subscriber or group of users.

In some embodiments, for each capture and associated annotation, the system identifies the document, opens it using a software package, scrolls to the location of the scan and plays the voice annotation. The user can then interact with a document while referring to voice annotations, suggested changes or other comments recorded either by themselves or by somebody else.

19.5. Help In Text

The described system can be used to enhance paper documents with electronic help menus. In some embodiments, a markup layer associated with a paper document contains help menu information for the document. For example, when a user scans text from a certain portion of the document, the system checks the markup associated with the document and presents a help menu to the user. The help menu is presented on a display on the scanner or on an associated nearby display.

19.6. Use with Displays

In some situations, it is advantageous to be able to scan information from a television, computer monitor, or other similar display. In some embodiments, the portable scanner is used to scan information from computer monitors and televisions. In some embodiments, the portable optical scanner has an illumination sensor that is optimized to work with traditional cathode ray tube (CRT) display techniques such as rasterizing, screen blanking, etc.

A voice capture device which operates by capturing audio of the user reading text from a document will typically work regardless of whether that document is on paper, on a display, or on some other medium.

19.6.1. Public Kiosks and Dynamic Session IDs

One use of the direct scanning of displays is the association of devices as described in Section 15.6. For example, in some embodiments, a public kiosk displays a dynamic session ID on its monitor. The kiosk is connected to a communication network such as the Internet or a corporate intranet. The session ID changes periodically but at least every time that the kiosk is used so that a new session ID is displayed to every user. To use the kiosk, the subscriber scans in the session ID displayed on the kiosk; by scanning the session ID, the user tells the system that he wishes to temporarily associate the kiosk with his scanner for the delivery of content resulting from scans of printed documents or from the kiosk screen itself. The scanner may communicate the Session ID and other information authenticating the scanner (such as a serial number, account number, or other identifying information) directly to the system. For example, the scanner can communicate directly (where "directly" means without passing the message through the kiosk) with the system by sending the session initiation message through the user's cell phone (which is paired with the user's scanner via Bluetooth™). Alternatively, the scanner can establish a wireless link with the kiosk and use the kiosk's communication link by transferring the session initiation information to the kiosk (perhaps via short range RF such as Bluetooth™, etc.); in response, the kiosk sends the session initiation information to the system via its Internet connection.

The system can prevent others from using a device that is already associated with a scanner during the period (or session) in which the device is associated with the scanner. This feature is useful to prevent others from using a public kiosk before another person's session has ended. As an example of this concept related to use of a computer at an Internet café, the user scans a barcode on a monitor of a PC which s/he desires to use; in response, the system sends a session ID to the monitor that it displays; the user initiates the session by scanning the session ID from the monitor (or entering it via a keypad or touch screen or microphone on the portable scanner); and the system associates in its databases the session ID with the serial number (or other identifier that uniquely identifies the user's scanner) of his/her scanner so another scanner cannot scan the session ID and use the monitor during his/her session. The scanner is in communication (through wireless link such as Bluetooth™, a hardwired link such as a docking station, etc.) with a PC associated with the monitor or is in direct (i.e., w/o going through the PC) communication with the system via another means such as a cellular phone, etc.

Part IV—System and Portable Device Details

Figure 4:
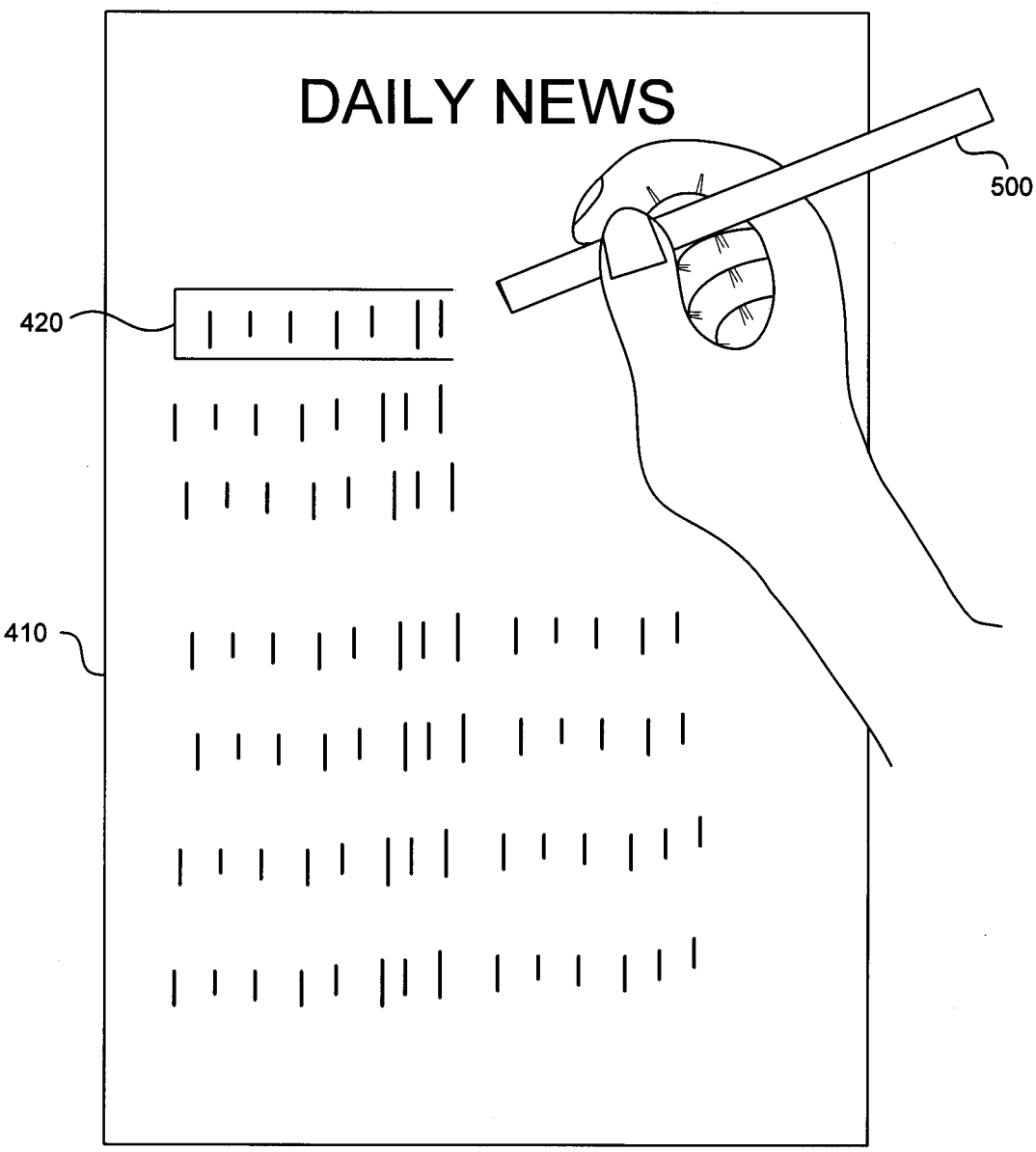
FIG. 4 is a perspective diagram showing a typical use of a portable scanning device.

FIG. 4 is a perspective diagram showing a typical use of a portable scanning device. In the example shown, a user scans text from a newspaper 410 via a portable device 500 having scanning capability. The user has scanned a portion of a line of text 420 with the portable scanner 500. The image of the portion of the line of text 420 may be stored by the scanner 500, transmitted to another device for remote storage, compressed, or processed in various ways. In some embodiments, the portable scanner 500 indicates when enough information has been scanned to uniquely identify the newspaper article.

In the example shown in FIG. 4, the portable device 500 is a scanner in a pen form-factor. However, any portable device having image-capturing capability, such as a digital camera, may be a suitable equivalent to the portable device 400 shown in FIG. 4.

Figure 5:
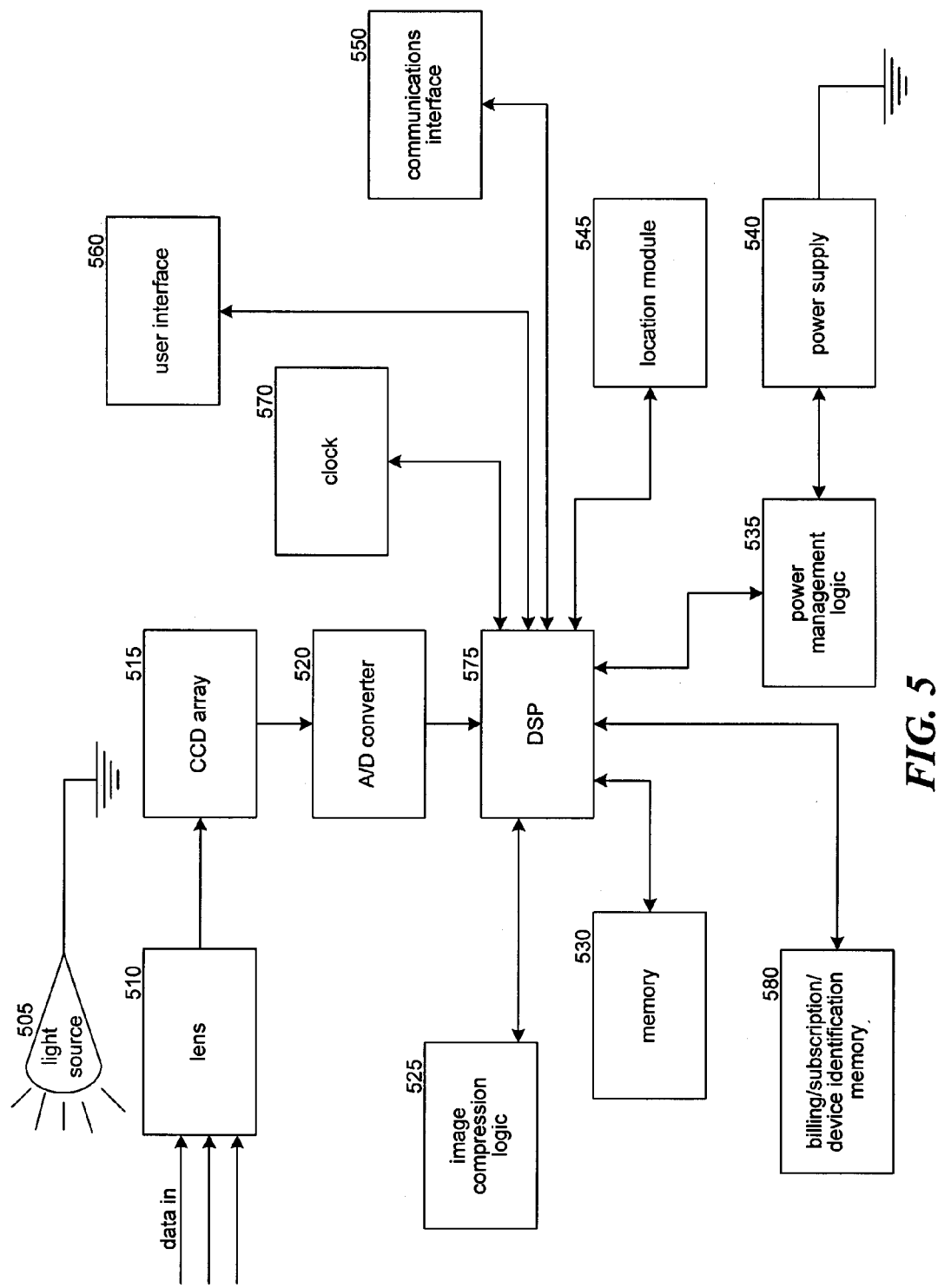
FIG. 5 is a functional block diagram of an embodiment of a typical portable scanning device.

FIG. 5 is a functional block diagram of an embodiment of a typical portable scanning device 500. The portable scanning device 500 has a light source 505 that illuminates the object, such as a graphic or text, to be scanned. The light reflected from the scanned object passes through lens 510 and its properties (color, intensity, etc.) are registered by a suitable device such as Charge-Coupled Device (CCD) Array 515. The analog data stored in CCD Array 515 is converted to digital form by Analog-to-Digital (A/D) Converter 520.

In the embodiment shown in FIG. 5, DSP 575 is powered by power supply 540 and operably connected with system clock 570, A/D converter 520, image compression logic 525, memory 530, billing/subscription/device identifier memory 580, power management logic 535, location module 545, communication interface 550 and user interface 560. After the image data has been digitized by A/D Converter 520, Digital Signal Processor (DSP) 575 may perform various operations on the image data according to programs stored in memory 530.

Digital Signal Processor 575 may store the digital image data in memory 530. To save space in memory 530, DSP 575 may implement an image compression scheme by accessing image compression logic 525 to compress the digital image data prior to storage. Many sorts of image compression schemes could be used, such as the well-known Joint Photographic Experts Group (JPEG) or Joint Bi-level experts Group (JBIG) compression schemes. In some cases, DSP 575 may alternatively use optical character recognition (OCR) to convert the scanned image data into text prior to storage in memory 530.

Power management logic 535 monitors the status of power supply 540 and the rate of power consumption by the various components of portable scanning device 500. If power supply 540 is an internal power supply, such as a battery, power management logic 535 may cause certain components to hibernate or otherwise go into low-power mode to extend battery life. Additionally, power management logic 535 may cause user interface 560 to communicate a "low battery" warning such as illuminating a red Light-Emitting Diode (LED), sounding an audible alarm, or displaying a "low battery" icon on a Liquid Crystal Display (LCD).

Memory 530 may contain program instructions for DSP 575. It may also be used to store text and/or image data in compressed or uncompressed format. Additionally, timestamps and location-stamps associated with the image data may be stored in memory 530.

Clock 570 provides clock signals to synchronize the operation of the various components of portable scanner 500. Clock 570 may also provide a time reference for time-stamping image data. For example, when a user scans a portion of text, DSP 575 may perform OCR on the scan data and store the resulting text in memory 530 along with a timestamp obtained from clock 570. Alternatively, the timestamp may be obtained from the location module 545, particularly if a Global Positioning System (GPS) receiver is included in the location module 545.

Location module 545 provides location determination functions to portable device 500. Location module 545 may include a Global Positioning System (GPS) receiver that provides location and time information by monitoring signals broadcast by the GPS network, which consists of satellite and ground-based transmitters. This location information may be used to provide a location-stamp that indicates where a particular scan occurred. For example, when a user scans a portion of text, DSP 575 may perform OCR on the scan data and store the resulting text in memory 530 along with a location-stamp obtained from location module 545. The location-stamp could be at varying levels of specificity such as country, state, region, city, serving network access point, location within 100 meters, exact location, etc.

Communications Interface 550 includes transceivers that allow portable device 500 to communicate with other devices. Communications Interface 550 may be a wireless interface, such as short-range RF (Bluetooth, IEEE 802.11, etc.), cellular, or optical (infrared, etc.). Where Communications Interface 550 includes wireless capability, the portable scanning device also includes the necessary antennas or lenses for implementing the wireless capability.

Communications Interface 550 may also include a wired interface such as Universal Serial Bus (USB) and similar schemes. In the case where Communications Interface 550 is a wired interface such as USB, Communication Interface 550 could provide power to recharge internal power supply 540 or operate portable scanning device 500.

User Interface 560 can include audio capability such as speakers and microphones, visual capability such as LCD displays or LEDs, and/or haptic (tactile) capability such as buzzers and transducers.

Figure 6:
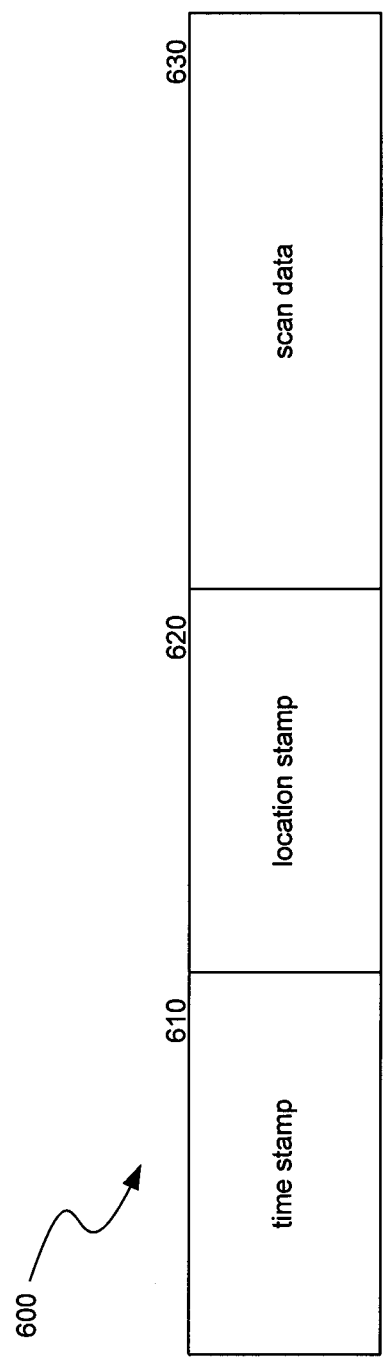
FIG. 6 is a data structure diagram that shows a format for a data record typically used by the system.

FIG. 6 is a data structure diagram that shows a format for a data record 600 typically used by the system. Data record 600 includes scanned data 630. The scanned data 630 could be text, an image, symbols or any suitable data type. Data record 600 also includes a timestamp 610 associated with scanned data 630. In some embodiments, the timestamp 610 indicates the time that scanned data 630 was acquired by device 500. Data record 600 includes a location-stamp 620 associated with scanned data 630. In some embodiments, the location-stamp 620 indicates the location at which scanned data 630 was acquired. In some embodiments, timestamp 610 and location-stamp 620 to index scanned data 630 by time and location, respectively, thereby enabling searches for stored data by time and/or location of scan.

Figure 7:
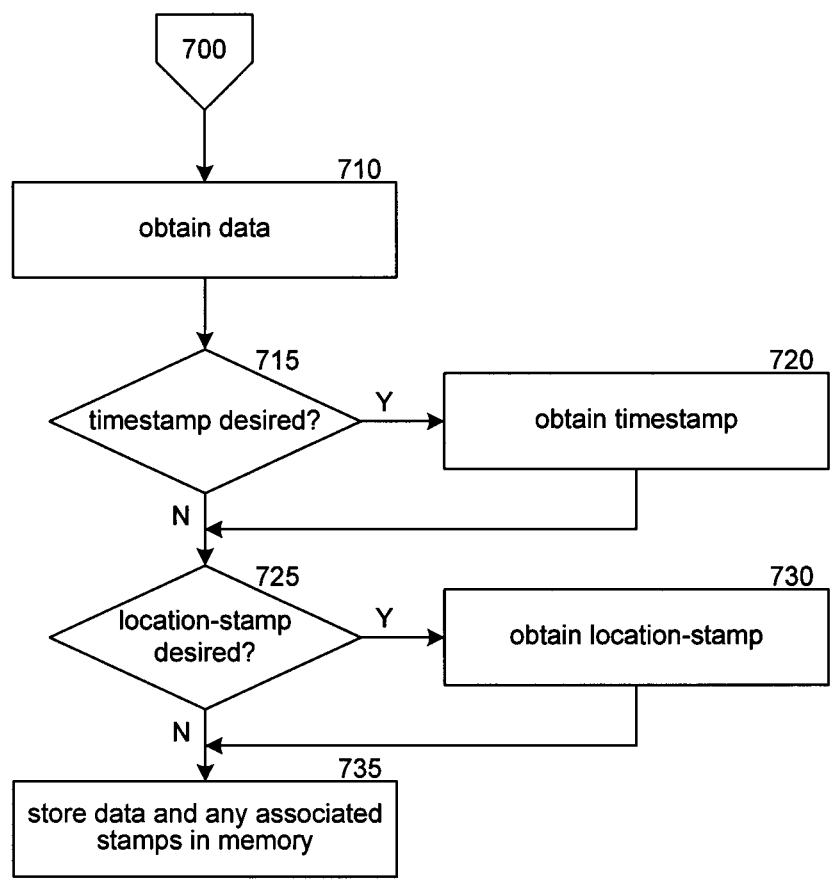
FIG. 7 shows a flow diagram showing steps typically performed by the system to detect and store information about the location and/or time that a document was scanned using portable device.

FIG. 7 shows a flow diagram showing steps typically performed by the system to detect and store information about the location and/or time that a document was scanned using portable device 500. At step 710, portable device 500 acquires data 630 such as a scanned image or text. Portable device 500 may have predetermined instructions about whether to include timestamps 610 or location-stamps 620 in data record 600. At step 715, portable device 500 determines whether a timestamp 610 is desired in data record 600. If the timestamp is desired in data record 600, then at step 720 portable device 500 obtains the timestamp information 610 from the clock 570 (or possibly from location module 545 if GPS-enabled) and proceeds to step 725. If a timestamp is not desired at step 715, then portable device 500 proceeds to step 725. At step 725, portable device 500 determines whether a location-stamp 620 is desired in data record 600. If a location-stamp is desired in data record 600, then portable device 500 obtains the location-stamp information 620 from location module 255 and proceeds to step 735. If a location-stamp is not desired at step 725, then portable device 500 proceeds to step 735. At step 735, portable device 500 stores data 630 in memory 530, along with any associated timestamp 610 or location-stamp 620.

Indicating to a User that Sufficient Information has been Scanned to Identify a Document In some embodiments, the portable scanner 500 may indicate to a user that enough information has been scanned to identify a document. For example, portable scanner 500 may have predetermined thresholds that indicate a particular scan uniquely identifies a document. When the threshold is met or exceeded, the portable scanner 500 indicates to the user via user interface 560 that enough information has been scanned to identify the document. These predetermined thresholds may be determined based on heuristics (i.e., rules of thumb), statistical analysis, or other suitable methods.

One heuristic used by the system to determine the threshold, in some embodiments, is based on observations of the unique character of written expression. Most documents can be uniquely identified within a very large corpus—for example, one containing one million documents—with a scan of between four and ten words (in the English language, roughly 20-50 characters or symbols). This heuristic holds across all languages on which it has been tested. In the event that a scan in the range of 4-10 words results in duplicate documents, the user can be prompted to scan additional words to further narrow the results.

Portable device 500 may indicate to the user that sufficient information has been scanned via the visual, audio, or tactile capability of user interface 560. Upon determining that the scanned information has met or exceeded the predetermined threshold, DSP 575 instructs user interface 560 to communicate to the user that enough information has been scanned to identify the document from which the information was scanned.

Timestamps and location-stamps may also be used to identify documents. For example, an Associated Press article may appear in many newspapers but the correct newspaper could be determined by the location-stamp. If the location-stamp indicates that the scan was performed in Seattle, it is most likely that a Seattle newspaper is the source of the scanned AP article. Similarly, in some embodiments, the system uses timestamps to narrow the scope of candidate documents to those that were published prior to the timestamp.

Indicating to a User that Sufficient Information has been Scanned to Identify Location Within a Document or Group of Documents In some embodiments, the portable scanner 500 indicates to a user that enough information has been scanned to identify location within a document or group of documents. For example, portable scanner 500 may have thresholds that indicate a particular scan uniquely identifies a location within a document or group of documents. When the threshold is met or exceeded, the portable scanner 500 would indicate to the user via user interface 560 that enough information has been scanned to identify location within a document or group of documents. These thresholds may be determined based on heuristics (i.e., rules of thumb), statistical analysis, information about a specific document or group of documents (for example, an index), or other suitable methods.

One approach to determining position used by the facility includes consulting an index representing the document or group of documents, and, if the capture is not unique within the index, using additional context information (for example, location of last capture, time elapsed since last capture, etc.) to qualify and refine the system's inference about the location of the current capture.

In some embodiments, the system's determination of location is probabilistic. Where a specific capture matches several locations in a document or group of documents, the system may attribute a higher probability to a location close to the user's most recent capture. A threshold may be associated with the indication that the capture location is known. This threshold may include the probability associated with potential matching locations. For example, in some embodiments, if one location has at least an 80% probability of being the users location, the system selects that location.

Portable device 500 may indicate to the user that location is known via the visual, audio, or tactile capability of user interface 560. Upon determining that the scanned information has met or exceeded the predetermined threshold, DSP 575 instructs user interface 560 to communicate to the user that enough information has been scanned to identify the location from which the information was scanned.

Controlling Scanner Actions Via Scanned Image and/or Gestures

In some embodiments, portable scanner 500 is controlled by user input via the user interface 560. For example, where user interface 560 includes a display on which menus may be shown to the user, the user can select menu choices to control the actions of portable scanner 500.

In some embodiments, portable device 500 is controlled by gestures performed by the user. For example, scanning text in a forward direction may indicate that the user wishes to store the text in memory. Scanning the same text in the reverse direction may indicate that the user wishes to erase the text from memory. Rubbing back and forth over text in a document may indicate that the user wants to highlight that text in an electronic copy of the document. The system enables many gestures to be used to control the actions of the portable device 500 such as circular motions, shaking motions, etc. Possible actions include starting the scan process, signaling that the user is done scanning from a particular article or document (and therefore subsequent scanned data will be from a new article or document), etc.

In some embodiments, portable scanner 500 includes an acceleration sensor (not shown in FIG. 5 for clarity), such as an accelerometer, to sense changes in speed or direction, thereby determining control gestures.

Portable scanner 500 may also be programmed to respond to control commands input to the DSP 575 via the image capture mechanism. (In the embodiment shown in FIG. 5, the image capture mechanism includes light source 505, lens 510, CCD array 515, and A/D converter 520.) These commands may be special symbols recognized by the scanner, biometric information (such as fingerprints), or patterns of scanning regular text (such as scanning the text in reverse to control data storage as discussed above). For example, a document such as a catalog may include a menu of command symbols that have special significance to the portable device 500. To execute a control program, the user scans one of the special symbols. In response the DSP 575 accesses and executes a control program associated with the special control signal. In the catalog example, one of the special symbols may initiate a purchasing program that can be used to order products from the catalog via the scanner. The user scans information about the products to be ordered and the portable scanner would communicate those products and other information necessary to complete the sale (such as billing and shipping information) to the catalog vendor via a connection between the Internet and the communication interface 550.

Scanner with Billing/Subscription/Device Identifiers

Portable device 500 may include memory 580 for storing information related to billing, subscription, and/or device identifiers. This memory 580 may be removable, such as in a Subscriber Identity Module (SIM) or smart card, or non-removable, such as a Programmable Read Only Memory (PROM). Where electronic copies of documents are being located based upon the scanned data, subscription information can be used to verify whether the user should be allowed access to the electronic copy. For example, a newspaper may charge an additional fee for access to its online version. The user's subscription information could include account numbers that indicate whether the user subscribes to the online version.

Similarly, billing information can be used to make purchases with the portable scanner 500. In some embodiments, the memory 580 contains credit card or other financial information of the user. For example, when the user scans text from a document and indicates (such as via the user interface 560 or the gestural controls disclosed above) that he wishes to purchase access to an electronic copy of the document, the billing information can be used to provide payment to the copyright holder or content provider.

Portable device 500 may store device identifiers such as serial numbers in memory 580. These device identifiers serve to uniquely identify the portable device 500 and are typically stored in PROM so that they cannot be erased. Additional security for transactions can be obtained by associating a portable device with only one user by correlating the device serial number to a user's account or subscription in a network database. In some embodiments, additional security is accomplished by storing the device identifier in the smart card (or storing a smart card identifier in the portable scanner 500) to lock the scanner to the smart card. In these embodiments, DSP 575 verifies that the correct smart card was inserted before the portable scanner 500 function.

Equivalent Location Technologies

Although the location module 545 has been primarily discussed with reference to an on-board GPS receiver, many other location technologies can be used. These technologies include Enhanced Observed Time Difference (EOTD), Assisted GPS (A-GPS), Differential GPS (DGPS), Time Difference of Arrival (TDOA), Angle of Arrival, triangulation and monitoring of local transceiver pilot signals. EOTD, TDOA and Angle of Arrival are most suitable when the portable device transmits a signal to networked base stations such that logic in the network may correlate data about the signals received at each base station to estimate the position of the portable device. Triangulation may be either internal or external. The portable device performs internal triangulation when it receives signals from at least three external transmitters (such as IEEE 802.11 base stations) and calculates an approximate location based upon characteristics of the received signals. External triangulation occurs when networked receivers external to the portable device are used to estimate the location of the portable device based upon characteristics of a signal received from the portable device. In some embodiments, the system uses received signal strength at more than one external receiver to estimate the distance of the portable device from the external receivers. Fixed transmitters often broadcast pilot signals that identify a particular transmitter so that mobile receivers may "lock on" to signals from a desired transmitter. Where the location of the fixed transmitter and the approximate coverage area are known, the location of the portable device can be estimated based on which transmitter it "hears." For example, if a portable device is receiving signals from an IEEE 802.11 wireless access point, it can be assumed that the portable device is within 300 feet (currently the approximate outdoor range of IEEE 802.11g transmitters) of the wireless access point.

Handheld Document Data Capture Device

Portable data capture devices used with the system in various embodiments are described at various points throughout this document. From this point onward, additional discussion is provided to elaborate on the capabilities and functions of various types of portable data capture devices.

In some embodiments, a portable device that has data capture capability can indicate to a user that the user has captured enough text or other information to uniquely identify a document. The portable device may compare the amount of information scanned to a predetermined threshold level to determine whether enough information has been scanned (this threshold method is particularly useful when the scanner is not in communication with a computer). When the portable device is in communication with a remote computer, the remote computer may send a message to the device indicating that it has identified the document from which the text was scanned. The portable device may have an image capture device for acquiring images, a processor for processing the images, memory for storing data and/or logic (software programs), an input/output communications interface for communicating with other devices, a power supply, an illumination source for illuminating the information being scanned, and a location module.

In some embodiments, the text or symbols captured by a portable data capture device may be used and interpreted as control commands by the device's control logic or control software to cause the scanner to execute software programs or otherwise perform certain predetermined actions (such as erase data from memory, turn on/off, initiate and/or complete a financial transaction, etc.).

In some embodiments, after capturing data from a paper document, a portable data capture device indicates to a user that one or more electronic counterpart of the paper document have been recognized or located. When the portable device is in communication with a remote computer, the remote computer may send a message to the portable device indicating that it has located an electronic counterpart of the document from which the text was scanned. In response to receiving the message, the portable scanner indicates to the user that the electronic counterpart has been located and the user may stop scanning. Among many possibilities, the indicator could be visual (e.g., a Light Emitting Device (LED), display, etc.), auditory (e.g., speaker, beeper, etc.) or haptic (stimulating the sense of touch).

In some embodiments, a portable data capture device has location and/or time determination capability and may store location and/or time information about where and/or when a data capture occurred along with the captured data. The time information may be a timestamp associated with a particular data capture event. The location-information may be a location-stamp associated with a particular data capture event.

In some embodiments, operation of a portable data capture device such as a portable scanner is controlled by characteristics of the scan, such as speed, repetition, direction, etc. Additionally, control programs or logic in the scanner may be responsive to special symbols, such as trademark symbols. These special symbols may be associated with particular actions to be performed, or programs to be executed, by the portable device.

In some embodiments, a portable data capture device such as a scanner has billing/subscription/device identifier information stored in memory. Subscription information can be used to verify the users right to access an electronic copy of the identified document, such as a pre-paid account for example. Billing information may be used to pay for access to an electronic copy of the identified document. Device identifiers may be used as a security feature to assist in verifying a user's identity.

In some embodiments, the portable data capture device is combined with an ink pen and/or physical highlighter. This combination allows the user to make annotations or highlights on a paper document and an electronic document at the same time. Additionally, some embodiments incorporate a printing mechanism such as an inkjet printer, etc., to add digital signatures to paper documents.

Input/Output

The portable data capture device includes various means for inputting and outputting information and instructions. The user, the communication service provider, remote network devices, and captured information are some of the potential sources of information and instructions (such as operating instructions).

User Interface

In some embodiments, the user-interface (UI) is the primary means of the user's interaction with the portable data capture device. Information and control commands are entered into the portable data capture device through the user-interface. The user interacts with the portable data capture device through the user-interface. The user submits control commands and information to the portable data capture device via the UI. In a similar manner the user receives information from the portable data capture device via the UI. For example, the user may enter text through a keypad on the device and receive a visual confirmation of the keypad entries on the device's display.

Input

The UI means for inputting data can be described in four broad categories: auditory, tactile, gestural, and optical. In various embodiments, the portable data capture device has various combinations of UI means from some or all of these categories.

Auditory

The auditory UI consists of means of inputting sound signals, such as speech, into the portable data capture device. Conversion of the sound signals into electrical energy requires an audio-electric transducer such as a microphone.

The portable device can perform many actions on the sound signals, including storing as digitized waveforms, transmitting, or converting to text and storing as digitized text.

Microphone

In some embodiments, the portable device includes a microphone for capturing speech. This feature is useful for entering voice annotations to documents, recording messages and speaking with other users (if, for example, the data capture device has mobile phone capability).

Haptic (Tactile)

In some embodiments, the portable data capture device accepts mechanical or haptic (tactile) inputs. In some embodiments, the portable data capture device includes a switch that the user can press start the data capture process. In embodiments with a tip switch, the user presses the device against the paper to start the scanning process. In other embodiments, the portable data capture device employs a sensor to detect proximity to a scanning target.

Jog (Thumb) Wheel

A jog wheel, similar to the wheel on some computer mice, is useful for interacting with computer applications or menus. For example, in some embodiments, the system presents a scanner user with a menu of choices on a nearby display. Rather than lift the portable scanner from the document and scan one of the menu items, the user can move the thumb wheel to scroll down the menu choices.

Keypad

In some embodiments, the portable data capture device has a keypad and/or buttons for entering data into the device. In some embodiments, the capture device has a cancel button to undo or erase choices and a confirm button to confirm choices (e.g., confirming a purchase). In some embodiments, the capture device has a button to indicate a context switch or desire to set context. For example, after scanning text from a first document, the user can indicate by pressing the context button that he is done scanning from the first document and next will scan text from a second document—by pressing the context button, the user informs the system that his scanning context is changing.

Tip Switch/Proximity Sensor

In some embodiments, the portable data capture device has a tip switch or proximity sensor. In a pen-shaped scanner, a tip switch is a switch that is activated when the tip of the scanner is pressed against a document. The tip switch may include pressure sensing capability so that the scanner can modify its behavior based on how hard the user presses the scanner against the paper. For example, the scanner (in combination with a computer and word processing software) may perform a highlighting function if it is pressed firmly against the paper. As another example, the scanner may switch on/off by pressing the scanner tip against the paper and activating the tip switch.

Granule/Surface Texture Sensors

In some embodiments, the portable data capture device has two parallel granule/surface texture sensors to detect surface variations on a document. A typical use of this sort of input sensor is to capture Braille text. Parallel surface texture sensors can determine the angle of the sensors from relative rates/distance traveled by the parallel sensors. A non-contact optical sensor is a common type of surface texture sensor that is well suited for use with embodiments of the portable data capture device.

Gestural (Motion Based)

The user can input data and commands into the portable data capture device by gesturing with it. The device can detect gestures by observing the data passing under the scanning head, by monitoring changes in motion sensors, or by mechanical motion-sensing means.

Observation of Optical Data

By observing the surface or data passing under the optical element, the portable data capture device can calculate relative motion in much the same way that an optical computer mouse does. By analyzing the relative motion of the device, the device can determine which gestures the user made with the device. In some embodiments, the optical system can also detect relative motion by observing patterns on the surface of the rendered document. In some embodiments, the portable data capture device can detect absolute position by checking absolute position codes on the surface of the rendered document.

Gyro/Accelerometer Motion Sensors

In some embodiments, the portable capture device includes an acceleration sensor, such as an accelerometer, to sense changes in speed or direction, thereby determining control gestures. In some embodiments, the portable capture device uses a gyroscope to detect motion and gestures. A single chip ring-laser gyroscope is particularly well suited for this task.

Mechanical (Ball Point, Roller, Etc.)

In some embodiments, the portable data capture device includes a rolling element or ball similar to the ballpoint of an ink pen that is optically encoded. As the ball is moved along the paper surface, an optical sensor detects the motion of the optically encoded element.

In some embodiments, the portable capture device measures the flow of electrically charged ink over a ballpoint to record relative motion. The ink flowing to the ball is given an electric charge that is detected by these probes. Current-sensing probes embedded in the ballpoint housing detect the ink flow over the ball. If there are a plurality of probes, the direction of flow of the ink can be inferred—hence the motion of the ball—and thus the actual motion across a surface. This electrically charged ink technology can serve as a general purpose input recording device—wherein the user writes in conventional ink—while the motions are noted and recorded. A guard ring at or near the boundary where the ball emerges from its housing may be used to discharge the charged ink so that only the charged ink flowing out of the receiver is seen by the sensors.

Optical

The user can enter data and commands into the portable data capture device by way of the optical sensing system.

Scanner/Imaging System

By scanning in keywords or symbols, the user can enter commands and data into the device. The portable device may be programmed to recognize certain graphical symbols as commands. For example, when the user scans a "$" symbol, the portable device recognizes it as a command to initiate a financial transaction, such as a purchase.

Output

The UI of the portable data capture device is also capable of presenting information to the user. This information usually concerns the operation status of the device. The UI output means for presenting information to the user can be sorted into three broad categories: auditory, tactile, and optical. Embodiments of the portable data capture device will have various combinations of UI output means from some or all of these categories.

In some embodiments, a portable capture device can transmit scan results to a host computer and communicate operational states or modes to a user by way of a display. The display can be onboard the portable capture device or can be associated with the host computer. In some embodiments, the portable device uses a wired or wireless communications medium. In some embodiments, a user can use a monitor associated with the host computer to view information. Examples of suitable wired connections include: RS-232; PS/2; serial; USB; ethernet; token ring; printer connections (e.g., IEEE 1284); firewire; RJ45 (telephone line); homeplug and fiber optics. Examples of suitable wireless connections include: wireless ethernet (e.g., IEEE 802.11a,b,g); Bluetooth™; infra-red (IrDA, such as in a television remote control); and Ultra wideband. The portable device can use auditory (e.g., a piezoelectric speaker), haptic (including a cell phone's vibrate), or visual alerts to communicate with the user.

In various embodiments, the UI can indicate that an error has occurred and the user ought to rescan; that a communication link to another device is open and active; that the portable device is turned on; that a gesture has been detected; or which mode the scanner is currently in. For example, in some embodiments, a scanner simply vibrates if a scan needs to be repeated.

Auditory

In many embodiments, the portable data capture device has the ability to provide audible alerts to the user. These audible alerts require an electro-acoustic transducer such as a speaker to convert electrical signals into sound.

Speaker

In some embodiments, the portable capture device has a speaker or piezoelectric element to generate sound. These speakers can be used to read text to the user or alert the user to a change in the device's status. For example, in some embodiments, the device emits a beep during scanning to alert the user that the paper document has been identified and an electronic counterpart of the paper document has been located. As another example, as text is scanned from a paper document, the capture device applies a text-to-speech process to the scanned text and plays the resulting audio.

Tactile

In some embodiments, the portable data capture device communicates with the user by vibration. The tactile UI is especially useful in environments where audible alerts cannot be heard due to ambient noise levels or places where audible alerts are socially unacceptable (e.g., in a movie theatre).

Vibrate

In some embodiments, the portable data capture device has a vibrating element to alert the user of a change in the device's status. In some mobile phone embodiments, this vibrating element is included in the phone's battery pack. In some embodiments, the portable device vibrates if the scanning head moves off line, similar to the "rumble strips" that alert drivers that they are drifting outside their lane.

Optical

In some embodiments, the portable data capture device communicates with the user via the UI by visual means. In some embodiments, the device projects menus or other information onto the paper being scanned. For example, when a capture device is working with a word processing program on a computer, the device may project a yellow light onto the paper to indicate that the system will highlight the scanned text in yellow in the open document in the word processing program.

Display

The portable data capture device can include a display. In some cases, a nearby display can be associated with the portable data capture device such that information for the portable device is routed to, and shown on, the display. Using nearby displays such as computer monitors is particularly helpful when the portable device does not have a display or the information is not suitable for presenting on the portable device's small display.

LEDs

Light Emitting Diodes (LED) can also be used to communicate visually with the user. For example, in some embodiments, the device activates a green LED to indicate that the capture device has been turned on and is ready to capture data.

Communication with Other Devices

The portable data capture device's communications interface includes transceivers that allow the portable data capture device to communicate with other devices. The portable data capture device can communicate with other compatible electronic devices such as computers, mobile phones, and wireless transceivers.

Wired

In some embodiments, the portable capture device uses a wired connection to communicate with other electronic devices. Any suitable protocol can be used to communicate when tethered to a computer. In some embodiments, the portable capture device uses the Universal Serial Bus (USB) protocol to communicate with a host computer via a tethered connection.

USB

Universal Serial Bus (USB) is a protocol used by the portable data capture device in some embodiments. In some embodiments, in addition to providing a communication channel between a computer and the portable capture device, USB provides power to recharge the portable device's batteries. In some embodiments, the USB interface allows the user to attach a USB memory device to the portable capture device.

Fiber Optic

Fiber optic communication channels can also be used by some embodiments of the portable data capture device. Suitable fiber types for different embodiments are single mode and multimode. One advantage of a multimode fiber is that it permits the use of inexpensive LED light sources. Connector coupling and alignment is also less critical with multimode fibers.

Wireless

In some embodiments, the portable device's communications interface is a wireless interface. Suitable wireless technologies are short-range RF (Bluetooth, IEEE 802.11, etc.), cellular, or optical (infrared, etc.). In cases where the communications interface includes wireless capability, it typically also includes the necessary antennas or lenses for implementing the wireless capability.

WLAN, Cellular, BT, Etc

In some embodiments, the portable data capture device implements Wireless Local Area Network (WLAN) capability by means of an IEEE 802.11 standardized transceiver. The portable device typically uses WLAN "hotspots" to communicate with remote computers. In some embodiments, the portable data capture device uses the Bluetooth (BT) short range radio-frequency (RF) method to communicate and pair with nearby devices such as mobile phones or personal computers. Mobile phones that implement portable data capture functionality can also use the cellular communication network to transmit captured data to remote computers.

Data Capture Subsystem

The portable data capture device has a data capture subsystem. This data capture subsystem generally has the capability of capturing voice, optical, and/or magnetic strip data. The captured data is stored in memory for subsequent processing and transmission. In some embodiments, the captured information can be compressed and/or automatically deleted to save memory space and communications channel bandwidth. One example of automatic deletion is deleting scanned images once they have been converted to text by the OCR process. Storing images that do not contain all of the captured information can conserve memory. Examples include compression formats such as GIF or JPG. Another approach is not storing unnecessary color information. For example, a typical CCD image sensor may be able to capture 24 levels of color information (i.e., distinguish more than 16 million different colors) for each pixel. For purposes of standard OCR, the portable capture device only needs to be able to distinguish between white, probably white, probably black and black (2 bits). This reduction, from 24 to 2 bits, results in storage space savings of roughly 92%.

Voice

While the portable data capture device has optical data capture systems, in some embodiments, a voice capture subsystem is useful in many circumstances. A voice capture subsystem typically allows the user to read text from a rendered document. An onboard microphone captures the spoken words. Subsequently, a speech-to-text application converts the speech to text form. The text is then used, for example, to locate an electronic counterpart of the rendered document. In some embodiments, the data capture is a mobile phone or the scannotator that is discussed below.

Optical Data Capture Subsystem

In some embodiments, the portable data capture device includes an optical data capture subsystem. The optical data capture system typically includes an image sensor and an optical path. The optical path passes through an aperture in the housing of the portable device. In some embodiments, the optical elements comprise parts of the housing of the device. The optical path can include a lens or aperture for focusing light and/or a transparent cover to protect the optical path. In some embodiments, an image conduit is part of the optical path that guides light from the rendered document to the image sensor.

In some embodiments, a portable scanner has its image sensor behind an aperture. In some embodiments, the aperture has a transparent cover such that the image sensor and the device's internal optical path are protected from dirt and damage. In some embodiments, the cover is plastic or glass. Where the portable scanner has a lens, the lens can typically focus such that the distance from the aperture to a piece of paper is variably dependent upon the distance from the aperture to the image sensor. This relation can be formed with $1/f=1/u+1/v$, (f is the focal length of the lens, u is from the aperture to a document and v is from a sensor to the aperture). In some embodiments, the portable scanner uses more than one focusing lens.

In some embodiments, the optical system can capture data as the user moves the portable capture device towards the rendered document. Capturing the data as the portable device approaches the rendered document may provide the portable device a wide field of view, and therefore provide additional information about the visual context of the capture. In a portable scanner with this type of optical system, the scanner captures data from the document even before the scanner comes into contact with the surface of the document. In some cases, capturing data as the scanner approaches the document enables the user to interact with the paper by touching or tapping at a location rather than rubbing along a line of text. The user experience is that he is pointing to ("touching") text rather than scanning along a line of text.

Optical Capture Subsystem Configurations

The optical capture subsystem can be implemented in various configurations, each having certain advantages for particular applications.

One-Dimensional Sensor Array

The light-sensing element is a one-dimensional linear sensor array in some embodiments. A one-dimensional array consists of one row of sensors that capture optical information. One-dimensional arrays are well suited for some biometric applications, especially for fingerprint scanning. In some embodiments, the sensors are either Charge-Coupled Devices (CCD) or Complementary Metal Oxide Semiconductor (CMOS) devices. Any suitable light-sensing device could be substituted, however.

Two-Dimensional Sensor Array

A two-dimensional sensor array is similar to a one-dimensional array, but the rows of sensor elements have two-dimensional coplanar offsets from each other. Two-dimensional arrays have the advantage that they yield information about distance, angle of scan, and skew. In some embodiments, the two-dimensional array is constructed from at least two parallel rows or columns of sensor elements. However, many topology variations of two-dimensional sensor arrays are possible.

A two-dimensional array of optical sensor elements can detect motion and de-skew at same time by correlation of character artifacts (tips, ascender/descender vertical elements), timing and location. Ascender/descenders are text characters that extend farther above/below the midline of a row of text than the average text character. An example of an ascender is the letter "t." An example of a descender is the letter "p."

Processing logic can determine the image skew of optically captured data. For example, head angle is determined by correlating the strong vertical elements of printed text with the optically captured data. Depending upon the font, strong vertical elements are present in the characters "bdhiklmnpqrtu" from an alphabet consisting of "abcdefghijklmnopqrstuvwxyz." Further, "y" is only ascender/descender without vertical strokes. There is also vertical information associated with the left and right edge of the remaining alphabet characters that can be used in the de-skewing process.

Lens

In some embodiments, the optical data capture subsystem has a lens to focus light onto the light-sensing elements. Lens systems can be a very useful addition to two-dimensional array light sensors.

Fiber Optic Image Conduit

In some embodiments, an image conduit forms part of the optical capture system. In some embodiments, the fiber optic image conduit is in contact with the surface from which it is capturing information. In some embodiments, the fiber optic image conduit is positioned above the scanned surface, which allows more ambient light into the scan area. In this configuration, the limited angle of acceptance of individual fibers insures that the image is still of good quality, even though the tip of the image conduit is slightly off the surface of the document. An image conduit with a transparent plastic separator or cap on the data capture end (the end nearest the scanned surface) is one embodiment in which the fiber optic image conduit itself does not contact the scanned surface, allowing ambient light to illuminate the surface, and a better view of the scanned material for the user. Separation between the tip of the image conduit and the surface being imaged is typically in the range of 0.001 inches to 0.1 inches. The image conduit may be sculpted to enable data capture even when the image conduit is not held vertical to the rendered document.

In some embodiments, the image conduit is sculpted to have a wedge-shaped tip. In some embodiments, the fiber optic image conduit is transparent or semi-transparent when viewed transverse to the optical path so the user can see the rendered document through the bundle. Thus, the image conduit can serve as viewfinder in addition to serving as a means to transport the scanned image to the optical sensor.

In general, groups of optical fibers may be used to transport an image. These might be single rows of fibers, as in a one-dimensional array; multiple rows of fibers; or groups or bundles of fibers with no strict arrangement. A flexible brush of many fibers can also be used. In cases where there is no fixed arrangement of fibers, the relationship between the end of an individual fiber at which it captures some of the image and the other end where it couples to a sensor element may be determined empirically, either at the time of manufacture or during use.

Outer Fibers Illuminate

Generally, fiber optic image conduits can capture data via ambient light but in some embodiments, an optional element, such as a subset of the image conduit fibers, can carry light from a light source to the document's surface. These fibers essentially act as miniature flashlights to illuminate the surface of the rendered document. The remaining fibers capture the illuminated data and transport it back to the image sensor. Typically, the outer fibers of an image conduit are used to transport light to the document, especially in embodiments where the fiber optic image conduit has been sculpted to be easily drug across the surface of a document.

CCD/CMOS Optical Sensors

In some embodiments, a portable data capture device includes an image sensor. Solid-state optical image sensors can capture information from a computer display and are a primary component of modern digital cameras. One example of a suitable image sensor is a CMOS (complementary metal oxide semiconductor) image sensor. Another example is a Charge Coupled Device (CCD) image sensor. All of these technologies typically allow a computer chip to measure light as electrical signals across a grid of sensors. Another example is a linear array of light sensitive photo-transistors.

Non-Visible Spectrum

In some embodiments, the optical scanning subsystem operates in the non-visible spectrum. With the ability to detect light in the non-visible spectrum, the portable scanning device can capture hidden control symbols printed with ink having UV or IR properties. For documents that include appropriate "writable" regions, in some embodiments, the portable data capture device both reads and changes the state of this region (e.g., chemically, thermally, or optically), thus leaving behind information. In some embodiments, the portable data capture device uses special ink, visible to the scanner (e.g., IR), which indicates that this document or portion of the document has been scanned.

Human/Machine Readable

In some embodiments, the portable data capture device captures both human and machine readable data. An example of human readable data is text. Examples of machine readable data are barcodes, icons, and hidden data (such as embedded within a graphic, or written with ink having properties in the non-visible spectrum).

Data Capture from Displays

In some embodiments, the portable capture device can also read from display devices directly, and can thus be used to point, highlight, excerpt, underline, copy, paste, erase, etc., directly on a display screen. This capability leads to a powerful document editing system wherein the user prints a document, works directly on the printed version with a portable scanner (and possibly also interacts with the dynamic display), then prints a (revised) newer version, etc. This method combines some of the best features of both the paper and digital world.

Data capture from screens can be accomplished by optically capturing the image shown on the display or by determining the location(s) on the display over which the portable device attempts to capture data. The location method retrieves the image from memory, usually video memory, associated with the display. In some embodiments, the portable device reports its absolute location on the display to a computer associated with the display. The computer then retrieves the information displayed at that screen location from its video memory. The information in the video memory can be processed by an OCR application, similar to processing images captured directly by the portable device.

In some embodiments, the device has separate sensing elements to capture text from paper and dynamic displays. These separate elements can be located close together so that the user experiences the scanning operation of paper and display as very similar.

In some embodiments, the device includes a single element used to scan both paper and active display. For example, in some embodiments, a CCD array is installed in the scanning tip with optics which image the surface—whether on paper or on a dynamic display. Since the distance to the actual surface elements may be longer for a CRT or flat panel (as there is a layer of plastic or glass between the surface and the plane being imaged), in some embodiments, variable depth of field optics are employed in the device. Alternatively, in some embodiments, variable focus optics are used.

One difference between active displays and static printed materials is that the active displays may have a source of internal illumination—e.g., a backlight. This illumination source can be used, in all or in part, to provide the required illumination for the sensor element.

An optical sensor in the scanner, which may optionally be the image-capturing sensor array itself, can detect the presence of an external illumination source—i.e., the backlight or CRT phosphor as light source. Thus the scanner can make any desired or necessary adjustments for these different light environments. For example, the frame capture rate (essentially a "shutter speed") may be adjusted to accommodate these lighting environments. The scanner's internal illumination source may also be turned down or off when scanning from an active display. Optionally, an indicator on the scanner can inform the user that the scanner has recognized that it is scanning from an active display. General state information—such as that the scan is from static material v.s. scan is from active material—can also be determined by the scanner, stored, associated with the scanned data, passed to a host or server, and optionally used in interpreting and/or acting on the data being scanned.

In some embodiments, data scanned from an active display is handled in one or more different ways from data scanned from a static material. For example, consider a menu item displayed on an active display and scanned (chosen) by a user. Since the scanner may determine that this data was scanned from an active display, the system can restrict the disambiguation and/or interpretation of this scan data to only include items which were being displayed on the display at the time the scan was made. Note that, while not an absolute requirement, it may be useful to incorporate time information in this process—e.g., the time at which data was displayed and the time at which scans were made.

In some embodiments, data scanned from an active display is interpreted the way static data can be interpreted—i.e., by analyzing the image scanned so as to match this image to known items in the document being scanned (i.e., the displayed or printed document)—or by interpreting the data directly, for example by performing OCR to recognize its characters—or, if the data is a code such as a 1-dimensional or 2-dimensional barcode, by interpreting the code directly, or matching the code to codes known to be in the document.

In some embodiments, the information taken from a dynamic display may include positional information—for example, the x and y coordinates of the scanner on the screen. This data is available on CRTs, for example, by optically sensing the refresh cycles of the display raster, and then comparing the time when these refresh cycles are received to timing signals taken from the CRT drive circuitry (as many light pens do). In some embodiments, the device determines the position on the screen being scanned by detecting a subtle visual pattern in the displayed image that is either simultaneously varied across the area of the display or shifted over the area of the display over time, enabling the scanner to be used with display devices other than CRTs, such as LCD and other flat panel displays. Another way to obtain positional data is to employ a screen with touch sensitivity—i.e., a system where the computer and/or display can sense and report the location where the scanner contacts the display surface. In either of these position-based scenarios—or when employing other means for sensing position, the dDNA system does not need to actually scan and interpret the displayed data. Rather, with position on the display known, and location of individual items displayed (e.g., a displayed menu item) known to the computer or to the display, the association between data indicated by the user (e.g., by "touching" the item or "scanning" the item with a swiping motion, for example) can be determined directly—without interpreting a scanned image—or even capturing an image.

Biometrics Detection

In some embodiments, the portable capture device have the ability to capture biometric (voice, fingerprint, retina, DNA) information for security and authorization. As mentioned earlier, the one-dimensional linear optical array can function as a fingerprint scanner by swiping the user's finger across the array.

Magnetic Strip (Credit Card)

In some embodiments, the portable data capture device captures data from the magnetic strips that are commonly used on credit cards, which can be particularly useful for p-commerce (purchasing) applications.

Functions/Operating Behavior

A processor or other control logic coordinates the overall operation of the portable data capture device. Usually, the processor operates from a program that is stored in memory. Of particular relevance to the functions and operating behavior of the device, memory stores program instructions about acquisition, storage, and processing of data obtained by an optical sensor. The processor can retrieve instructions from memory for acquiring, storing, and processing data from rendered documents.

Processing capabilities in various embodiments of the portable data capture device can be used for: capturing data; processing data, particularly image data; data compression and other image manipulation; caching algorithms and other functions associated with memory; communications; and security applications such as encryption/decryption algorithms.

In some embodiments, the portable data capture device has various modes and states for interacting with the network and associated computers. For example, in some embodiments, when working with a computer and word-processing software, the portable scanner has a highlighting mode that causes text scanned from a paper document to be highlighted in the electronic document; an underline mode that causes text scanned from a paper document to be underlined in the electronic document; a copy mode that causes text scanned from the paper document to be inserted in the electronic document at the cursor's location; etc.

The user can control the portable data capture device through the user interface. For example, the user interface can include a display on which menus can be displayed to the user. The user selects among the menu options to control the actions of the portable scanner.

Some primary tasks of the portable data capture device include: capture of data from rendered documents; control of other electronic devices; status indication; data security and user privacy; local caching of network data; keyword processing; search; and OCR.

Capture/Scan

In some embodiments, a processor may retrieve an image captured by an optical sensor and perform traditional Optical Character Recognition (OCR) techniques to determine which characters, if any, appear in this image.

Time/Location Stamp

In some embodiments, the portable data capture device creates time and/or location stamps that are used to note the time and location that certain actions were performed. For example, when a user scans text from a document, the portable device creates a time stamp and/or location stamp that is associated with the scanned text. The portable device transmits this time/location stamp is along with the scanned text to a host computer or the service provider's network to establish a context for the scan. The portable device can use an internal clock for time data or network time if a time signal from the network is available. GPS and many other methods are available to determine the location of the portable device. In some embodiments, the portable device uses an internal clock and GPS technology for time/location data.

Although the location capability has been primarily discussed in the context of an on-board GPS receiver, many other location technologies can be used. Some of these technologies are Enhanced Observed Time Difference (EOTD), Assisted GPS (A-GPS), Differential GPS (DGPS), Time Difference of Arrival (TDOA), Angle of Arrival, triangulation and monitoring of local transceiver pilot signals. EOTD, TDOA and Angle of Arrival are most suitable when the portable device transmits a signal to networked base stations such that logic in the network may correlate data about the signals received at each base station to estimate the position of the portable device. Triangulation may be either internal or external. In some embodiments, the portable device performs internal triangulation when it receives signals from at least three external transmitters (such as IEEE 802.11 base stations) and calculates an approximate location based upon characteristics of the received signals. External triangulation occurs when networked receivers external to the portable device are used to estimate the location of the portable device based upon characteristics of a signal received from the portable device. One example of external triangulation would use received signal strength at more than one external receiver to estimate the distance of the portable device from the external receivers. Fixed transmitters often broadcast pilot signals that identify a particular transmitter so that mobile receivers may "lock on" to signals from a desired transmitter. The location of the fixed transmitter and the approximate coverage area are known, so the location of the portable device can be estimated based on which transmitter it "hears." For example, if a portable device is receiving signals from an IEEE 802.11 wireless access point, it can be assumed that the portable device is within 300 feet (currently the approximate outdoor range of IEEE 802.11g transmitters) of the wireless access point.

Control Via Captured Data

Captured data can be put to various uses, in addition to the previously discussed document disambiguation and electronic counterpart location. In some embodiments, the portable data capture device is controlled and programmed via scanned data. The user can scan in commands from plain text or from a printed menu of commands similar to a map key. For example, the user can scan a special icon that informs the portable scanner that the next captured data should be treated as a control command. The user next scans a command, such as "Call Fred," that causes the portable device to execute an action that is pre-associated with the command, in this example placing a phone call to Fred. Similarly, in some embodiments, the portable device can be programmed to recognize that the word "purchase" when scanned by itself (not as part of a string) indicates that the user wishes to initiate a p-commerce purchasing transaction.

In some embodiments, the portable device recognizes control symbols drawn by the user. Thus, the user can create a command menu on any piece of paper simply by drawing the desired command icons or words. Control icons recognized by the system in some embodiments are a "$" (to initiate a p-commerce purchase); a "!" (to enter highlight mode); and a phone icon (to indicate that the following number is a telephone number that can be dialed or stored in the address book).

The portable device's behavior when it scans a keyword, discussed elsewhere in this document, is a subset of the behaviors available by use of captured control data.

Control Via Gestures

An intuitive way for the user to interact with the portable data capture device is by gesturing with it. The user experience is greatly enhanced by associating predetermined actions and behaviors with certain gestures. Some of these gestures, as well as methods of detecting them, are discussed below.

The inventors have discovered that a text string of sufficient length may be used to disambiguate a document from a pool, or "corpus," of documents. A handheld data capture device captures images of features (text, icons, etc.) in a rendered document. The images can be processed (e.g., by applying feature extraction techniques) onboard the handheld document imaging device or may be processed by a computer in communication with the handheld imaging device. Generally, the captured images correspond to a contiguous string of alphanumeric characters, e.g., a text fragment. The system uses the text fragment to identify the paper document and locate an electronic counterpart of the paper document. Typically, this requires a text fragment of at least a first predetermined length. Once the rendered document is disambiguated, it is possible to interact with an electronic counterpart of the paper document. Interactions range from having a copy of the electronic document delivered to the user to the delivery of additional subject matter related to the source document, to the delivery of document map (markup) information, to using the source document to navigate around the electronic counterpart document, to editing the electronic counterpart, to carrying out complex financial transactions. Preferably, these interactions are accomplished using the handheld document imaging device as a command input device. It is desirable to have a handheld document imaging device whose user interface that provides a number of command inputs and is intuitive to use while maintaining a compact size.

In some embodiments, the handheld device is controlled by the user's gestures. For example, scanning text in a forward direction may indicate that the user wishes to store the text in memory. Scanning the same text in the reverse direction may indicate that the user wishes to erase the text from memory. Rubbing back and forth over text in a document may indicate that the user wants to highlight that text in an electronic copy of the document. The system enables many gestures to be used to control the actions of the portable device such as circular motions, shaking motions, etc. Many behaviors can be associated with predetermined gestures, such as: starting the scan process; signaling that the user is done scanning from a particular article or document (and therefore subsequent scanned data will be from a new article or document); highlighting; deleting previous entries; etc.

The inventors have further discovered that once a document is disambiguated (thus setting context for subsequent scans within the document), it is possible to identify locations within the document using shorter text fragments. These identified locations may then be used as anchor points for interacting with the document, such as, for example annotating the document, editing the document or extracting text and/or images from the document.

In some embodiments, the handheld document data capture device is configured to capture a series of frames of image data as the handheld document imaging device is moved across the face of the source document. In some embodiments, the handheld document data capture device is configured to capture a series of at least partially overlapping images when used within predefined velocity limits. The amount of overlap typically must be sufficient to allow relative X-Y motion between frames to be calculated. The handheld device is configured to extract features from the frames of captured image data. The handheld document imaging device may use an optical character recognition scheme to convert the captured images into text and then use a stitching algorithm to construct text strings from the captured image data or may use a character offset method on stitched together frames of image data to develop representations of text strings or may use differences in the pixelation of the sequential frames of image data to calculate relative position. Where optical character recognition is used to generate text strings, the text strings may be either horizontal or vertical with respect to the page. The handheld document data capture device is operatively coupled to a database that associates a predetermined motion (gesture) of the handheld document imaging device relative to the source document with a command input. The handheld document data capture device may be preconfigured with a gesture/command input pairing library or may be trainable by the user. Additionally, gestures may be "overloaded" such that performing the same gesture may cause the execution of different command inputs depending upon the context of the gesture, e.g., time frame or location within the document.

In some embodiments, the user captures images of a section of the source document by moving a handheld document imaging device from left to right along a text line of the source document. The handheld document imaging device first determines if the source document has been disambiguated. If the source document has not been disambiguated it extracts document features from the captured frames of image data and communicates the extracted features to a computer which in turn uses the extracted features to disambiguate the source document. If the source document has already been disambiguated, the handheld document imaging device extracts document features and uses the extracted features to establish a position within the document and select the corresponding region/text in the electronic document.

As an example of how a gesture may be overloaded with respect to location within a document, moving the handheld document imaging device from left to right a second time over substantially the same region of the source document causes the text within the selected region to be underlined. In a further example of how the same gesture may be overloaded with respect to location within a document, moving the handheld document imaging device from left to right a third time over substantially the same region of the source document causes the text within the selected region to be bolded.

In some embodiments, moving the handheld document imaging device from right to left over substantially all of a previously selected region of the source document causes the preceding command input to be undone. For example, if, in accordance with the preceding description of an overloaded left to right linear gesture, the user had bolded a selected region moving the handheld document imaging device from right to left a single time over the selected region would cause the text within the selected region to be changed from bold to underlined. Moving the handheld document imaging device from right to left a single time over the selected region would cause the text within the selected region to revert to its initial formatting and repeating the right to left motion a third time would deselect the selected region entirely.

To further illustrate the beneficial nature of overloading, in some embodiments, moving the handheld document imaging device from right to left over a portion of the previously selected region of the source document causes the portion of the previously selected region/text to be deleted.

In some instances, the user may desire to interact with relatively large blocks of text, such as, for example, copying or deleting single or multiple paragraphs. In some embodiments, the user may move the handheld document imaging device from left to right to establish a beginning location and from left to right to establish an ending location. The handheld document imaging device uses the text strings (or symbolic representation thereof) to establish the beginning and end of the selected region. Subsequent command inputs then function on the selected region. For example, in some embodiments, if the user moves the handheld document imaging device in an "X"-shaped pattern between the beginning and ending locations, the region of the source document between the beginning and ending locations is deleted. Similarly, in some embodiments, if the user moves the handheld document imaging device in a back and forth motion while moving down the page, such as, for example, in a zigzag like manner, within the selected region, the selected region is deleted. If the user moves the handheld document imaging device downward within the selected region, the selected region may be highlighted. In some embodiments, if the user moves the handheld document imaging device in a circular manner the selected region is copied.

In some embodiments, the user uses a circular motion to select regions of the source document. The system typically substantially maintains formatting of the source document must be in the electronic document, or maps the layout of the paper document to the electronic counterpart using translation information in the markup document. The handheld document imaging device uses features extracted from the series of frames of image data to determine that the handheld document imaging device was moved in a circular pattern and uses the extracted features to determine the location of the selected region within the electronic document using a character mapping scheme. In some embodiments, different command inputs are associated with a clockwise circular motion and a counterclockwise circular motion respectively.

In some embodiments, the portable scanner recognizes and acts on gesture-based controls. For example, in some embodiments, the portable scanner scans in text by passing an optical sensor over the text, which is then stored in memory in the scanner. By passing the optical sensor over the text in the reverse direction, the text is erased from memory. By scanning in a circle, a user can, in some embodiments, highlight the circled text in an electronic document in a word processing program on the scanner's host computer.

Detecting Motion

To detect and act on gesture-based commands, the handheld document data capture device must be able to detect and interpret motion. Various methods of detecting motion and mapping motions to gesture commands are discussed below. In some embodiments, the portable device calculates motion vectors between sequential image captures to identify gestures.

In some embodiments, the portable scanner starts a gesture interpretation application whenever motion is detected. One way to detect motion is to compare sequentially captured images, much like an optical mouse. In some embodiments, a first image is analyzed for patterns. A processor uses software instructions to bring this image into memory and then find parts of this image that differ from a background (e.g., identifying black text on a white background). The processor records to memory where these patterns were located and what they were. The processor then loads a second image and attempts to detect these original patterns. The processor then compares how the locations of these patterns may have changed from the first image. The difference is encoded as vectors. By repeating this process, a series of vectors may be formed. Similar to "connect the dots," these line segments, or vectors, can trace out a motion sequence.

The processor can, in some embodiments, find vectors between pixels (or some representative pixels) in a first and second image. To calculate the vectors between images, the processor compares the images first along the horizontal axis, then along the vertical axis to determine the device's movement path between during the period between the capture of the first and second images. The processor then moves all of the pixels in the first image one pixel to the right (with some pixels no longer being part of this image). The processor then recalculates these vectors. If these vectors, are shorter, the processor continues moving pixels to the right until there is no horizontal distance between pixels. If these vectors are longer, this processor begins moving pixels to the left. After the horizontal component of the movement vector has been determined, the processor repeats the comparison along the vertical axis to determine the vertical component of the movement vector. When the processor has calculated the vertical and horizontal components of the movement vector, the relative linear motion between the first image and the second image is known.

Determining an Intended Gesture

In some embodiments, the calculation of motion vectors is followed by an effort to determine which gesture was intended. The complexity of this step may depend on which gesture classifications exist. For example, if a scanner only recognizes one gesture, e.g., backwards, classification efforts may not need to consider any vertical components of motion. In some embodiments, such as embodiments in which the scanner only recognizes the backwards gesture, multiple vectors may be replaced by a single representative vector as described herein. For instance, if a user is attempting to scan perfectly horizontally, but instead oscillates vertically a little, the scanner may be able to determine that this user intended a horizontal line, and replace the myriad vectors with one horizontal one.

Backwards and Forwards

An intuitive and elemental way to gesture with the handheld data capture device is to scan forwards and backwards along a line of text. In some embodiments, the handheld data capture device recognizes forward and backward movement along a line of text by comparing the scanned text images to stored character templates. Using the English alphabet as an example, if the scanned character matches the template, the scanner is moving left to right (forward). If the scanned character is a mirror image of the template, the scanner is moving right to left (reverse). In some embodiments, backwards and forwards motion is determined by the previously discussed vector method.

Circle

Another intuitive and elemental way to gesture with the handheld data capture device is to circle a region of text. In some embodiments, a circular gesture is identified by the previously discussed vector method. In some embodiments, the portable device uses absolute position information to detect circular motion. One way to obtain absolute position information is, for example, from documents that have encoded grids printed on them. Each image taken by the device contains absolute position information that can used to determine the device's motion relative to the document surface.

When using the vector approach, the processor to add motion vectors together to determine if a vector ever crosses another vector, particularly the starting point of the first vector. These circle-gesture detection techniques can be combined where vectors are used to determine if there might be a crossing, and then absolute position analysis is used to determine if such a crossing did in fact occur.

Figure 8:
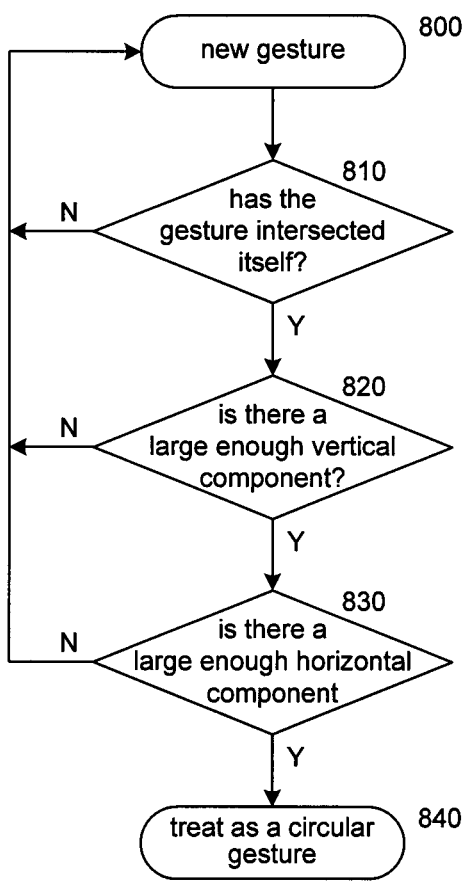
FIG. 8 is a flow diagram showing steps typically performed by the system to detect that a user has made a circle gesture.
Figure 9:
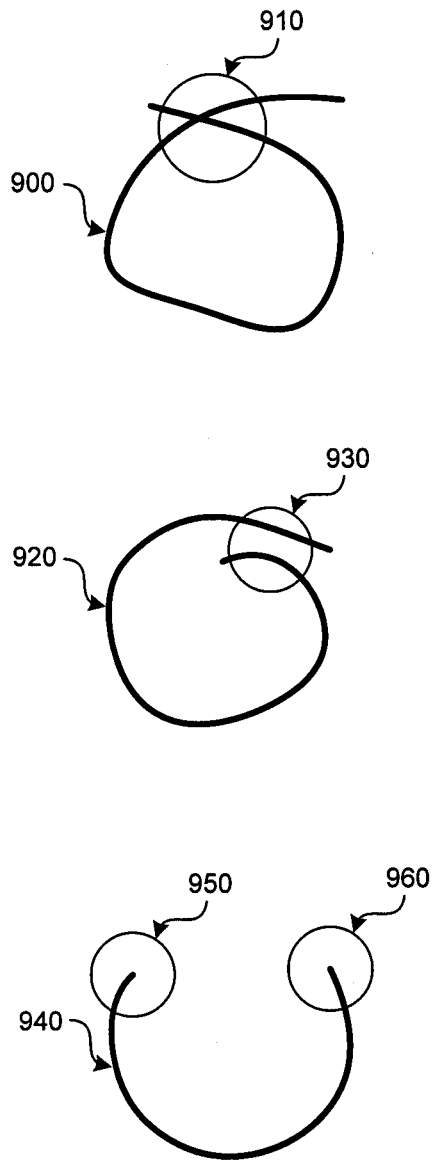
FIG. 9 illustrates some examples of a user's attempts at performing a circle gesture.

FIG. 8 is a flow diagram showing steps typically performed by the system to detect that a user has made a circle gesture. In step 800, these steps begin when the system detects a new elemental gesture. In step 810, the system detects if this gesture has intersected itself. FIG. 9 illustrates some examples of a user's attempts at performing a circle gesture. The first gesture 900 intersects at 910. In this example, the beginning and the end of this motion actually cross over each other, and therefore may be detected as an intersection. The second gesture 920, shows a gesture that may be determined to be a circle. The beginning and end come nearest to each other at 930. In some embodiments this distance may be within an allowable margin to be considered an intersection. The third gesture 940 illustrates a gesture that may not be considered a circle. In some embodiments, the distance between the two nearest points 950, 960 may be too far to be considered an intersection (though some embodiments may be programmed to accept even this). If this gesture has intersected itself, this process of detecting a circle continues in FIG. 8 at step 820 where the system considers the vertical component. If this gesture has not intersected itself, this iteration returns to await a new gesture. In some embodiments, a vertical component may be considered to ensure that this gesture is not a rubbing gesture, which a user may not want to have interpreted as a circle. In some embodiments, vertical component may be the difference between the highest and lowest points reached during the gesture. In some embodiments, this stage may be determined by comparing this difference to a threshold. If the vertical component is not large enough to meet or exceed the threshold, this process determines that the gesture was not a circle. If this component has been met, the system continues in step 830, where a horizontal component may be considered. The horizontal evaluation is performed similar to the vertical evaluation. If a gesture has met all three of these criteria (intersection, vertical and horizontal) the system classifies it as a circle in step 840. If one of these criteria is not met, the process returns to step 800 to await a new gesture.

Rubbing

Rubbing back and forth across a string of text is another intuitive and fundamental gesture that may be used to control a handheld image data capture device. In some embodiments, a rubbing or back and forth gesture may be interpreted as a highlighting command. For example, a user may make a series of scans with a forward gesture and designate one scan target with a rubbing gesture. In response, the scanner can flag the text identified by the rubbing motion so that it is highlighted (e.g., this "rubbed" text is on a brightly colored field) on subsequent retrievals. In another embodiment, text that was denoted with a forwards gesture may be underlined.

Figure 10:
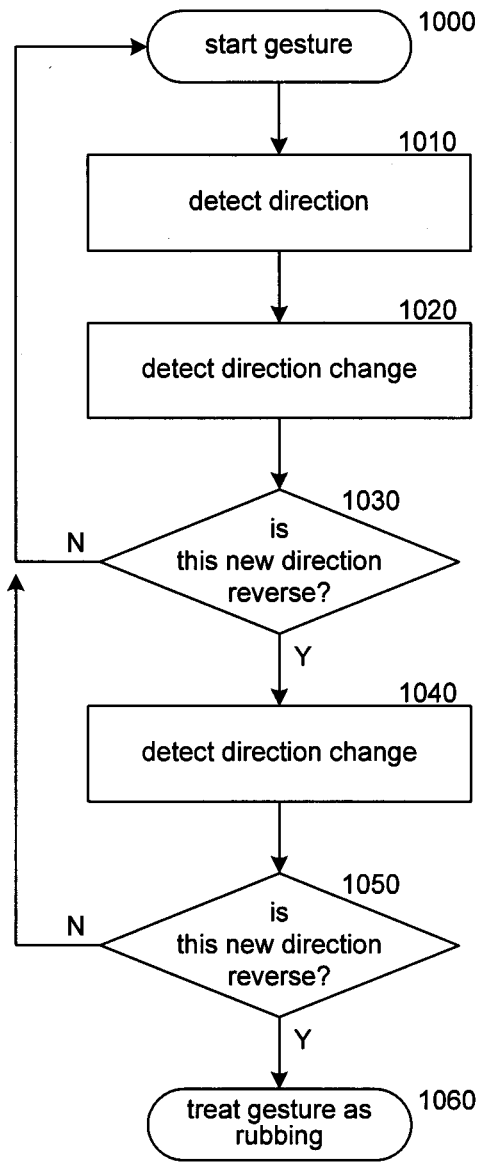
FIG. 10 is a flow diagram showing steps typically performed by the system to detect a rubbing gesture.

FIG. 10 is a flow diagram showing steps typically performed by the system to detect a rubbing gesture. As discussed here, the rubbing gesture is a vertical up and down motion; in some cases, however, the user rubs horizontally back and forth across a string of text. In the process shown in FIG. 10, a new elemental gesture is started at step 1000. In step 1070, the system detects a direction, as is described elsewhere. In step 1020, the system detects a direction change. In step 1030, the system evaluates the direction change to see if it is the reverse of the previous direction of movement. In some embodiments, reverse is defined as a new vector that points between 170 and 190 degrees from the endpoint of the previous vector (where 180 is exactly the opposite direction).

If this new direction is not reverse (including, in some embodiments, ending a scan), then the system continues in step 1000 to await a new gesture. If this new direction is reverse, then the system continues in step 1040 to detect another direction change. From step 1040, the system continues in step 1050 where it is determined whether this new direction is the reverse of the second. If the third direction of motion is the reverse of the second direction, the system continues in step 1060 to perform predetermined behavior associated with the rubbing gesture.

Backwards to Erase

Figure 11:
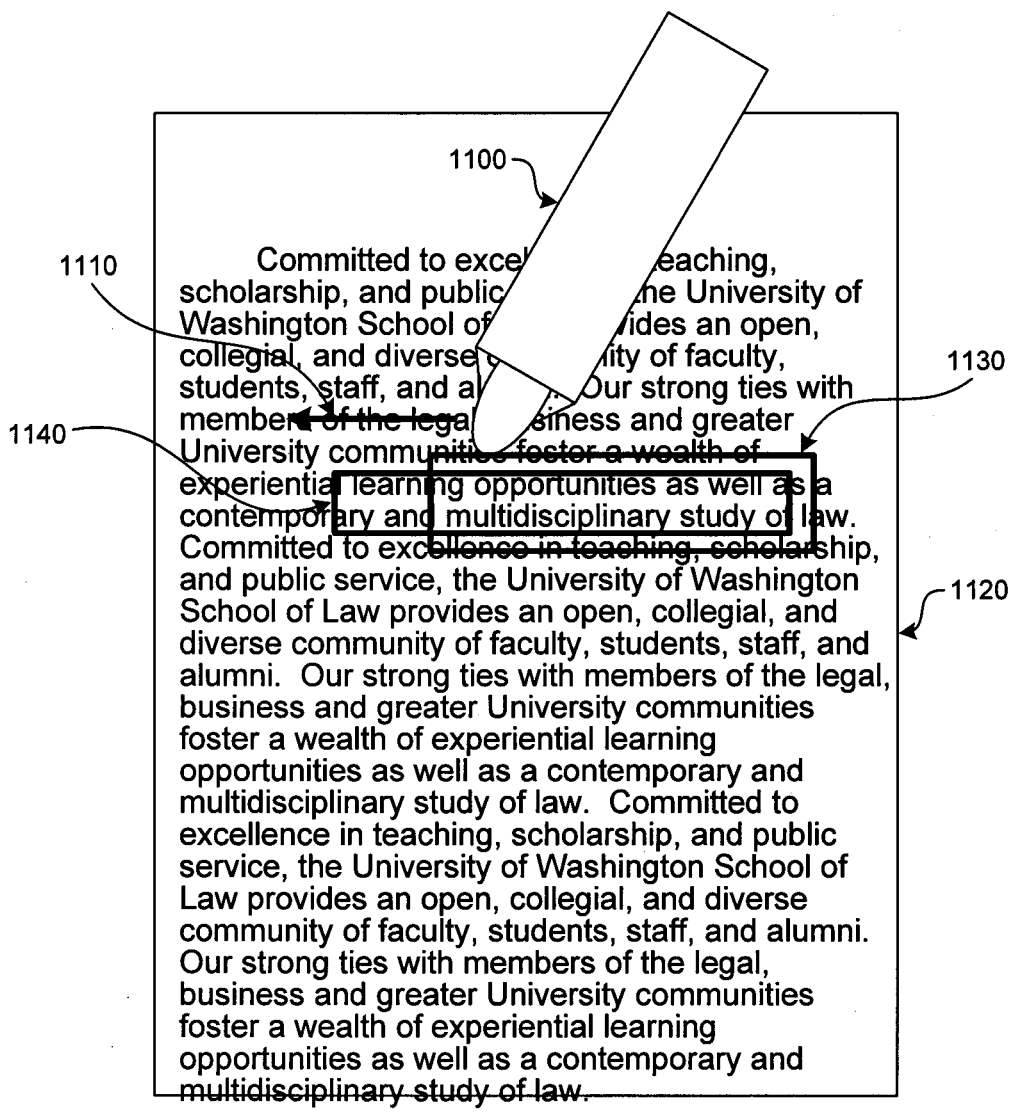
FIG. 11 shows a scanner moving in the backwards (right to left) direction across document.

In some embodiments, a forward scan causes a scanner to store the scanned information in memory. If this scan, or a section of it, is subsequently scanned with a backwards gesture, this portion scanned in the backwards direction is removed from memory. As an example, FIG. 11 shows a scanner 1100 moving in the backwards (right to left) direction 1110 across document 1120. The text captured and stored in memory by an earlier forward scan is shown in box 1130. Box 1140 shows the text that was scanned in the backwards direction, with the rightmost character being the "first" character captured by the backwards scan. As the text is in box 1140 is captured by the backwards scan, each character is compared to the previously scanned string. The scanner 1100 compares the first (rightmost) character of the backwards scan with the last (rightmost) character of the forward scan and continues in a similar manner until the characters from the backwards scan stop matching the scanned string. The scanner stops comparing the two strings when it encounters a character in the backwards scan that does not match the character at the corresponding position in the forward scan. After the comparison stops, the scanner deletes the matching characters from memory.

By observing the direction in which the scanning sensor stitches together the image of each character, the scanner detects palindromes and avoids interpreting them as an erasure gesture. The system detects palindromes by observing the direction in which the scan occurs. A palindrome scanned in the forward direction (left-to-right) will have characters images that are constructed by stitching together sequential left-to-right images. Right-to-left (backward) scans will capture a character image starting at the right side of the character and moving left. For the English language, this right-to-left movement results in an image that is a mirror image of the initial left-right scan. Palindrome characters will not be mirror images and thus can be distinguished from a reverse scan.

Gestures and Computer Monitors

In some embodiments, gesture commands can be used with documents rendered on a computer display. For example, a user may gesture a caret ("^") scan on a computer monitor to identify a location at which to insert text. In this example, the scanner is in communication with the computer, which recognizes the caret gesture as a command to insert text at the indicated location. In response, the computer inserts the text from the last forward scan.

In some embodiments; a scanner may be used to interact with a computer in a fashion similar to a mouse, joystick, or other pointing device. For example, a scanner may function as a joystick by being held vertically pointing down. When a user moves this joystick in a given direction either by tilting or moving, these movements are reflected as changes in the scanner images. For example, if the scanner is tilted forwards, an image sensor may record a series of images going the opposite direction, each with more skew. By mapping how parts of these images move or skew, the scanner can determine how it is being moved. These motions may then be communicated to a computer. As a further example, a user can scroll through a document on a computer monitor by using the handheld scanner as a computer pointing accessory.

Association with and Control of Other Devices

In some embodiments, the handheld data capture device can control other electronic devices, can use other electronic devices to enhance its own user-interface (e.g., by using a computer display), and can enhance the user-interface of other electronic devices by, for example, enabling scanned data entry.

After establishing a context (if necessary) by scanning a title or other identifier from a rendered document, the portable device is used to indicate the desired operations by scanning. For example, a user can program his video recorder (VCR) by scanning in a code that identifies a document as a television guide, followed by a scan of a VCR+ code. The VCR+ code is communicated to the VCR by IR communications, causing the VCR to perform the predetermined action associated with the code.

The scanner's proximity to devices, especially those to which it has Bluetooth, USB, or IEEE 802.11 connections, can be used to define programming behavior as well. The scanning of a package of frozen food in the proximity of a microwave might set the appropriate cooking time. In the context of a car, scanning an address can cause the scanner to program the car's onboard navigation system to that address.

Another device's user control interface can be enhanced by the capabilities of the handheld data capture device. In essence, the handheld data capture device controls other devices by scanning information from paper. In a typical system, the portable device converts scanned information into instructions for another device to which it has a Bluetooth™ pairing.

Association with Nearby Devices

In some embodiments, the portable data capture device is paired to a host machine. The host machine is preferably a computer, personal digital assistant (PDA) device, or a mobile communication device such as a mobile phone or Blackberry™ text messaging device. An exchange of authentication and security information is part of the pairing process between the portable device and the host device. The portable device will perform authentication and security procedures prior to interacting with host devices to which it is not currently paired. The security procedures can optionally include user identification procedures, such as biometric identification.

Figure 12:
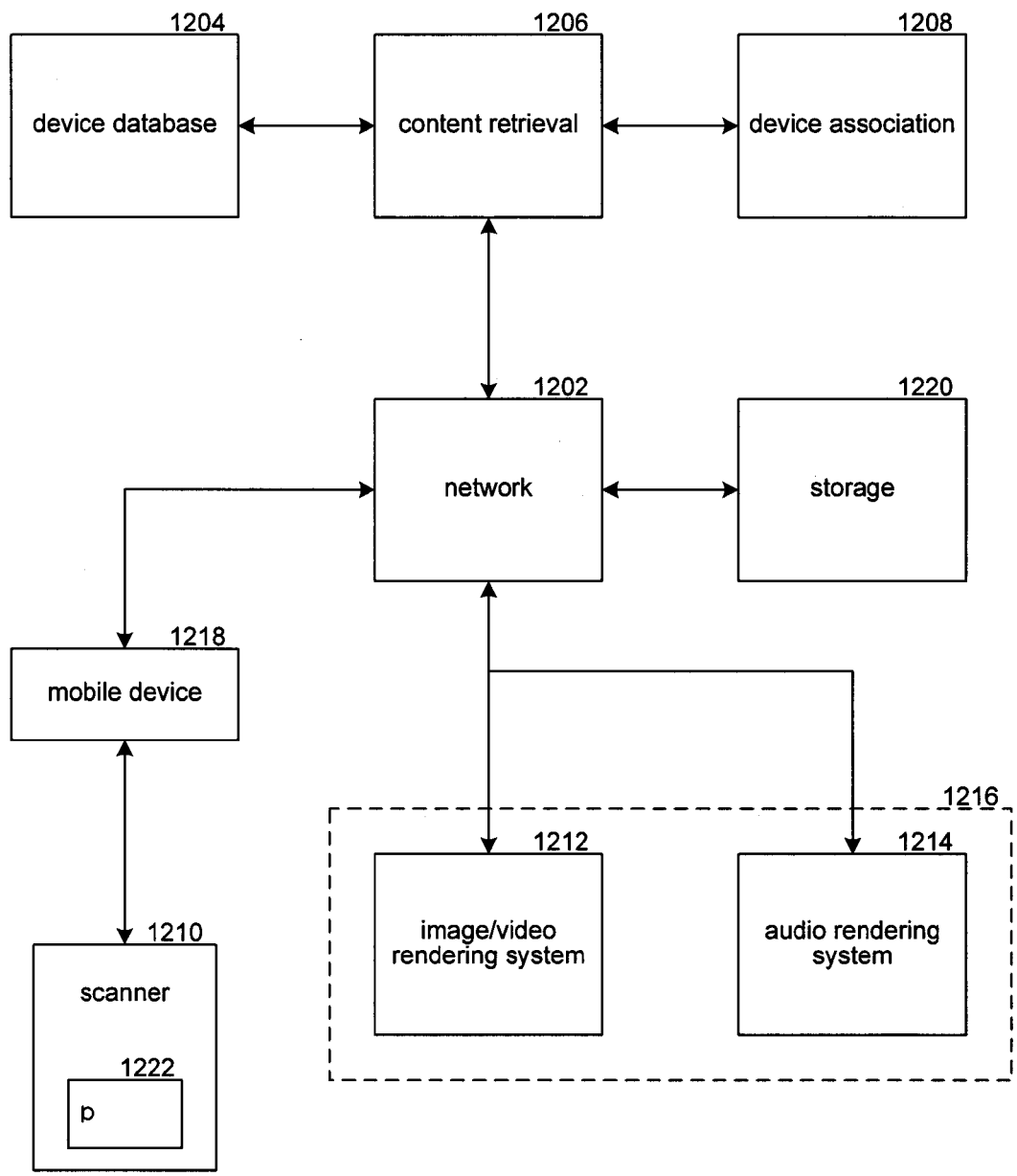
FIG. 12 shows a block diagram of one system configuration for associating nearby devices with a portable scanner.

FIG. 12 shows a block diagram of one system configuration for associating nearby devices with a portable scanner. A mobile device 1218 may incorporate or interact with a portable scanner function 1210. The portable scanner 1210, which is a scanner designed for convenient transport by a person, may be a pen-style device, a mouse, a remote control, or a portable phone, to name just a few of the possibilities. The portable scanner 1210 may comprise short-range communication capability (e.g., short range RF such as Bluetooth™, short range wire-line such as USB, etc.) which it may use to communicate with the mobile device 1218. The scanner includes a user ID code 1222 that uniquely identifies the scanner among other such scanners known to the system.

Examples of mobile devices 1218 include laptop, notebook, or sub-notebook computers; a hand-held computer such as a personal digital assistant (PDA); or a cellular or other wireless telephone. In some embodiments, the scanner function 1210 and mobile device 1218 are the same device.

Information captured by the portable scanner 1210 in one or more scans, possibly along with other information, is communicated to the network 1202, from which it is communicated to the content location and retrieval service 1206. In some embodiments, this information may initiate a content request/location/retrieval action. The information from at least one of the scans may come from a printed source, for example, a newspaper, magazine, flyer, book, manual, brochure, label, or advertisement. The information from one or more of the scans may also come from electronically or digitally displayed information, for example, text, barcodes, icons, glyphs, or other information from an electronic display.

The mobile device 1218 provides longer-range communication capability to the network 1202. Examples of such communication comprise the standard public switched telephone network (using a dial-up modem, for example), digital subscriber line, asynchronous digital subscriber line, cable modem, Ethernet, wide-area LAN technology, wireless LAN technology such as IEEE 802.11, and wireless cell phone technology.

The network 1202 comprises communication switching, routing, and data storage capabilities. The network 1202, inter alia, routes and propagates information between components of the system. The network 1202 may comprise the Internet, an intranet or intranets, wire-line and/or wireless network portions.

The device database 1204 comprises information about devices that may be associated with the portable scanner 1210, and, in some embodiments and/or under some conditions, the mobile device 1218. In some embodiments, the device database 1204 provides an association of device identifiers with device addresses. The device database 1204 may also provide an association of device identifiers with supported content types. In some embodiments, the device database 1204 comprises one or more of a relational database, an index, a mapping table, and an enhanced domain name service.

The device association 1208 comprises associations between portable scanners and input/output (I/O), storage, or processing devices. In some embodiments the device database 1204 and the device association 1208 are distinct functions which may be separately accessed by other functions, for example, by content retrieval 1206. In some embodiments the device association 1208 and the device database 1204 may be incorporated into a common functional component.

The content retrieval 1206 communicates with the device database 1204 and the device association 1208 to obtain, inter alia, device information and device association information. In some embodiments the device database 1204 and/or the device association 1208 may communicate with the content retrieval 1206 using a network such as network 1202.

The device database 1204, the device association 1208, and the content retrieval 1206 may comprise a "service provider." A service provider is a network-accessible provider of information and/or services in fulfillment of client requests. Service providers may provide subscription-based, advertising supported, pay-per-use, and/or pay-per-transaction access to content and/or communication services.

The content retrieval 1206 comprises content location and retrieval functionality. Content is at least one of text, digital sound or music, or one or more digital images or video. The content retrieval 1206 locates content corresponding to, related to, and/or identified by information scanned by the portable scanner 1210.

The content retrieval 1206 communicates with the network 1202 and provides the located content to an I/O, storage, or processing device associated with the portable scanner 1210.

The associated device may be, inter alia, an image/video rendering system 1212 or audio rendering system 1214. Some devices (e.g., a combined device 1216) may include both audio and imaging/video systems 1212 1214. Examples of such combination devices 1216 include a laptop computer, a desktop computer, televisions, multi-user computer systems, or a kiosk.

Other devices that may be associated with the portable scanner 1210 include a data storage device 1220 or a printer. Examples of a data storage device 1220 comprise a computer hard drive, portable flash storage device, portable music and/or video and/or e-book player (e.g., portable content player), and optical storage media. Computing resources, such as a laptop, desktop, or network-based computer or computers, may also be associated with the portable scanner 1210 in order to enhance the processing capabilities associated with the scanner 1210.

Identifying a device to which content will be delivered may involve receiving a device identifier for the associated device. The device identifier may be provided by the scanner 1210 or mobile device 1218 associated with the scanner. Examples of a device identifier are a barcode, unique device serial number, a network address such as an Internet Protocol (IP) address, an alphanumeric code, or a unique device name.

In some embodiments, the network address of the associated device is necessary but an identifier for the associated device is not. The system may function without full knowledge of the capabilities of the associated device in some cases. In other cases, the capabilities may be inferred. For example, if the device requests a communication session identifier via a web browser, and a scanner subsequently submits the communication session identifier to the system, it is likely that the device has a display from which the session identifier was scanned.

In some embodiments, one or more devices are "registered" by the user of a scanner so that they are associated with the unique user (or device) ID that identifies the scanner. For example, a laptop computer that is owned by a user of a scanner may be registered as "Device #1" associated with the scanner's unique user and/or device ID. (Thus, the associated device identifier may be quite simple given the limited number of devices registered by a single user.) The associated device may comprise logic that automatically registers its current network address with the service provider (since that network address may frequently change when, for example, a laptop is moved to a new location and establishes a new connection with the Internet). This simplifies the user's task when initiating a new session with the service provider, because the user need only scan the associated device's identifier and automatically communicate a command to the service provider to look up the associated device, retrieve its current network address, and communicate subsequent system responses to the indicated device. Furthermore, the management of the service provider's system is simplified because there is no need to create and maintain a set of identifiers that are unique among all devices known to the service provider. Each user of the service may simply register any devices that are to be used without having to apply for (and subsequently apply) a more-complex device identifier, such as a lengthy serial number.

Furthermore, selecting a device from the small domain of devices associated with a given scanner (and/or user) makes it possible to use alternative methods to identify the desired device. For example, a device may be identified by scanning a selected icon or by performing a distinct gesture with the scanner.

A device identifier may be provided by scanning it and then communicating it to the content location and retrieval 1206 (service provider) system. In some embodiments, the system causes a device identifier to appear on a visual display of the device so that it may be scanned by the portable scanner 1210. The user may scan the device identifier from a serial number affixed to the device, scanned from a barcode affixed to the device, and so on. The identifier of the associated device may be provided with or prior to a content request/location/retrieval action by the scanner 1210.

In some embodiments, the system selects one or more devices to associate with the portable scanner 1210, at least in part, because they are nearby the location of the portable scanner 1210. In some embodiments, the system identifies the location of the portable scanner 1210 using GPS satellite location information, information triangulated using multiple RF transceivers, and/or location of Wi-Fi or other wireless access points used by or nearby to the portable scanner 1210.

In some embodiments, the system selects one or more devices to associate with the portable scanner by examining characteristics of the located content type (for example, is it text, video, or audio) and determining whether a candidate nearby device supports rendering of that content type.

In some embodiments, the device identifier for the associated device is used to identify the network address of the associated device. The device identifier may be a unique ID that distinguishes the device from all other devices known to the system, or it may be an identifier that, in combination with the unique user and/or device ID 1222 associated with the scanner 1210, serves to uniquely identify the device to the system. The network address may comprise, among other possibilities, an IP address, a MAC address, a Uniform Resource Locator, or a device name or identifier which is recognized by the network 1202 as being a particular device to which information may be sent.

In some embodiments, the system delivers the located content to the associated device by configuring the associated device for exclusive use by a person using the portable scanner 1210 for as long as the portable scanner 1210 is associated with the device. Configuring the associated device for exclusive access by the person using the scanner 1210 may be particularly important in public or semi-public environments.

In some embodiments, the system provides portable scanner 1210 and/or associated mobile device 1218 with access to information for which access is controlled by the associated I/O or storage device. Examples of such information are information to enable and/or facilitate functionality of the scanner 1210, possibly including keyword definitions, document indexes, tables and parameters to facilitate OCR and/or voice recognition.

Figure 13:
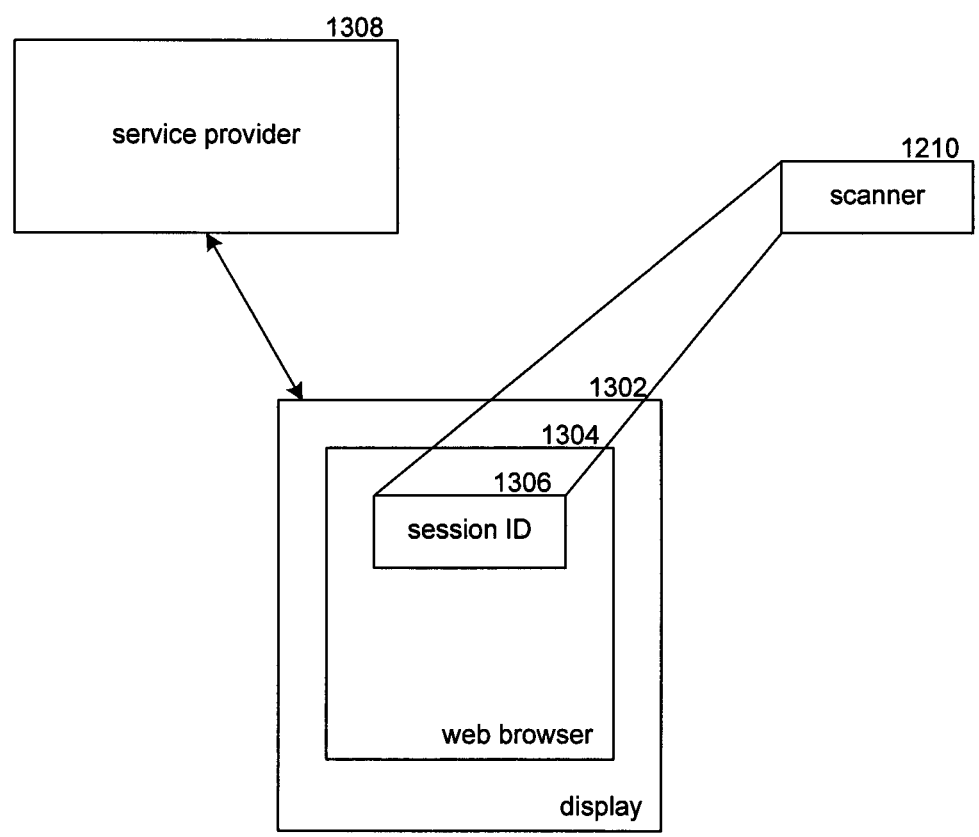
FIG. 13 is a block diagram showing a typical query session associating a scanning device and a service provider.

FIG. 13 is a block diagram showing a typical query session associating a scanning device and a service provider. In this example, the session-oriented application is a web browser.

A portable scanner 1210 interacts with and captures information from a computer system comprising a display 1302. Examples of the computer system include a desktop, laptop, or handheld computer, a PDA, or a cellular or other wireless phone. The computer system comprises web browser 1304 logic. The web browser 1304 typically communicates via a network with a server. The server may comprise, inter alia, a web server, CGI script server, a private network (intranet) server, or a server of a wire-line or wireless telephone support network.

A web browsing session may be characterized by a session identifier (session ID 1306). The session ID 1306 is a code that uniquely identifies a browser communication session. Examples of session ids 1306 are HTTP session IDs as well as other protocol session IDs. In some embodiments, when the web browser 1304 is directed to load a web page from a URL designating a web site belonging to service provider 1308, the service provider 1308 records the network address associated with the request from the web browser 1304, and returns a web page on which is displayed a unique session ID code 1306. The service provider 1308 records (for example, in device association database 1208) the association between the unique session ID code 1306 and the network address of the device providing the web browser 1304 application.

The session identifier 1306 may be displayed to a user of the browser 1304. Specific functionality may be provided to the web browser 1304 so that the session identifier 1306 may be displayed. The portable scanner 1210 may scan the displayed session ID 1306 code. The scanner 1210 communicates the scanned unique session ID code 1306 to the service provider 1308, together with the unique scanner and/or user ID 1222, using any of the one or more network communication channels by which the scanner 1210 communicates with the service provider 1308. This may comprise a request to the service provider 1308 to initiate a query session. Responses to subsequent scans (e.g., subsequent queries) are communicated to the web browser 1304 at the network address previously associated with session ID 1306. In some embodiments, the system may respond with a query session initiation request acknowledgement that may be displayed on web browser 1304 confirming to the user that the system has correctly identified the user and his intention to initiate a query session via associated the device 1302. When the user finishes a query session, for example, an "end session" icon or command may be scanned from the display of the associated device 1302 and communicated to the service provider 1308 to terminate the current session. The service provider 1308 may then communicate a command to the web browser 1304 to clear the display (removing any potentially sensitive information previously displayed in the session) and display a new unique session ID code 1306 that may be scanned to initiate a new query session. Similarly, after a pre-determined time interval during which no communication is received by the service provider 1308 from the scanner 1210, the session may automatically time-out and be similarly terminated.

Subsequent to communicating a query session initiation request, the portable scanner 1210 may scan information from a printed source. The scanned information may include text, a barcode, glyph, and/or other identifier of a printed source. The scanned information may include a product name, barcode, company name, logo, trademark, or other identifier of a product. The scanned information may include song name, artist name, anthology name, and/or other identifier of musical content. The scanned information may include an image name, caption, heading, and/or other identifier of image content, or a movie name, actor name, producer name, director name, studio name, product name, or other identifier of video content.

Information captured by the at least one scans (including the scanned session ID 1306), with possibly additional information, may be incorporated in a content request. The scanned information may be communicated to a service provider 1308 in one or more communications. The service provider 1308 may apply the session ID code 1306 to, at least in part, direct content back to the web browser 1304. This may result in the web browser 1304 receiving content communicated as a result of actions of the portable scanner 1210.

Content communicated may include an electronic version of a printed document from which information was scanned, digital music associated with information of a scan, a digital voice recording, audio news or commentary, audio product information, or other recorded or synthesized sound, at least one of digital image, digital photo, product image or video, video of news reports or commentary, or other digital images or video.

Figure 14:
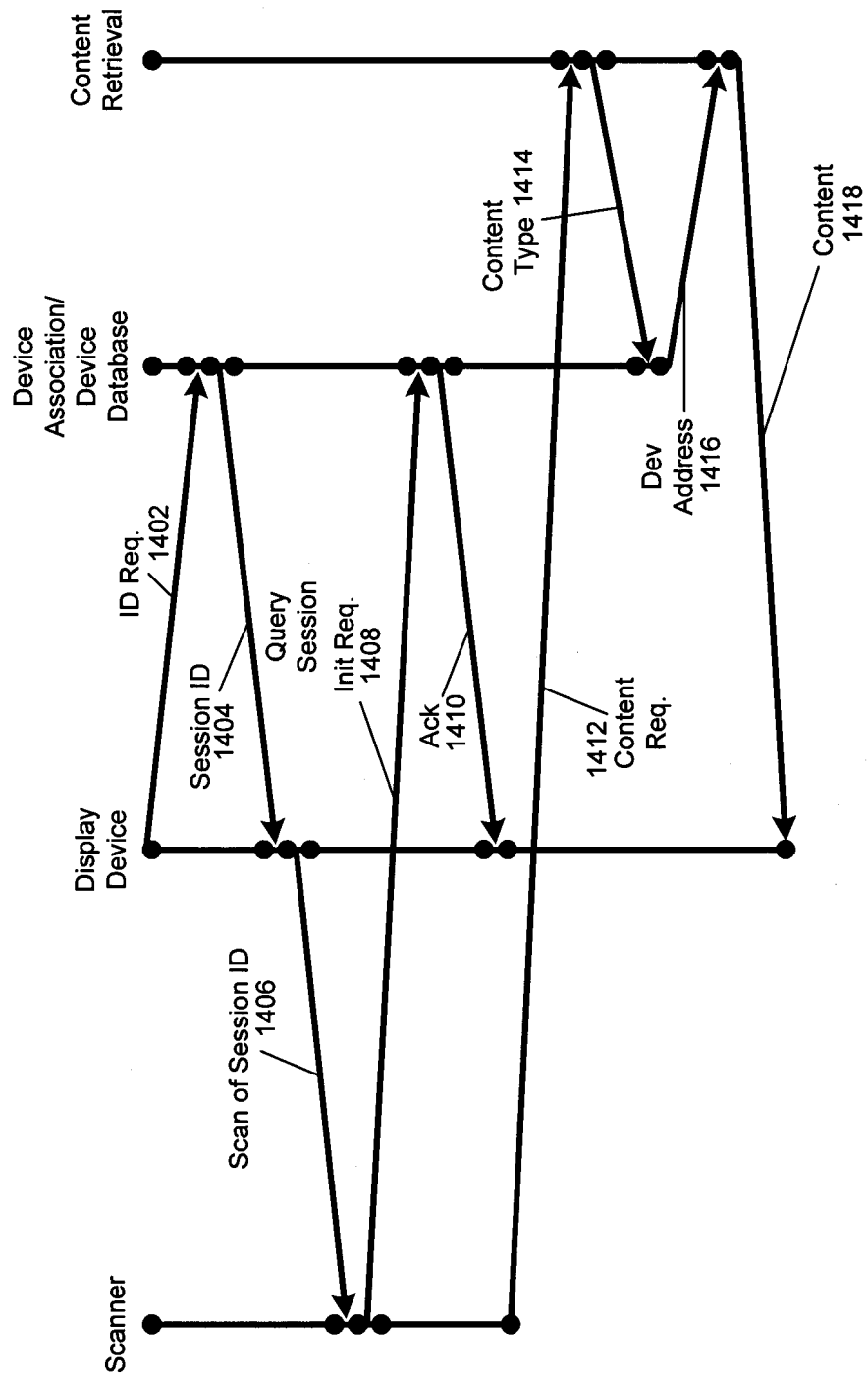
FIG. 14 is an action flow diagram showing interactions typically performed between devices by the system to provide content to a scanner-associated device.

FIG. 14 is an action flow diagram showing interactions typically performed between devices by the system to provide content to a scanner-associated device.

In interaction 1402, a display device comprising web browser logic communicates a request to the service provider (e.g., a system comprising the device association and/or device database) to generate a unique session ID code, which is recorded in the device association database along with a network address associated with the browser. In interaction 1404, a unique session ID is generated and communicated back to the browser at its associated network address. In interaction 1406, the unique session ID is scanned from its displayed location. In interaction 1408, a query session initiation request is communicated to the service provider that includes the unique user and/or scanner ID and the unique session ID code. The service provider applies the unique session ID code contained in the request issued in interaction 1408 to identify the network address recorded in the device association database, and a query session acknowledgement is communicated in interaction 1410 to the device at the identified network address. The browser displays the query session request acknowledgement to the user of the scanner. The service provider also records, in the device association database, that the unique session ID is now "owned" by the user of the scanner, e.g., that other portable scanning devices may not become associated with this session ID. The service provider associates the unique user and/or scanner ID with the currently active session ID code and the associated network address.

In interaction 1412 the scanner communicates scanned information (REQ) to the content retrieval function. Content retrieval determines content to provide in response to the scanned information.

In some embodiments, the type of the content is communicated to the device database in interaction 1414. Content type may be used, at least in part, in determining which associated device or devices is most suited to render the content when more than one device is currently actively associated with scanner. When content is identified for which no currently available device is suitable, a link to such content or the content itself may be stored in a database, emailed to a predetermined address for the user, or otherwise retained, so that such content may be accessed at a later time when an appropriate rendering device is available.

In interaction 1416 the device database communicates an associated device address or addresses, or a network address or addresses, to content retrieval. In interaction 1418 content retrieval provides the content to the associated device.

In some embodiments, the system may associate storage devices with the user's scanner for the purpose of storing electronic content (audio, video, digital documents, etc.) delivered by the system in response to a scan of a printed document. For instance, by scanning an identifier that uniquely identifies a device having storage capability (such as a computer with a hard drive, writable DVD, CD-ROM, etc.), the system may modify its databases so that future deliveries of content in response to scans of printed documents (originating from the portable scanner) will be delivered to the corresponding storage device and archived for later retrieval.

In some embodiments, the system determines the user's location and which nearby devices may be associated with the user's portable electronic device. The system may determine the user's location by way of on-board GPS in portable device, by triangulation of wireless signals, by determining the location of the communication network transceiver serving the device, by querying the user, or any other suitable method.

In some embodiments, the system maintains a device database that has location information for I/O devices that may be used in conjunction with a portable scanning device. When the system receives a request from a portable scanner for association with an I/O device, the system determines the location of the portable scanner and then identifies appropriate candidates by referring to the device database.

In some embodiments, the system enables the user to preset the associations of devices with the portable scanner. As one example, the user may want to have his home computer designated as the recipient for content requests that originate from his scanner. To accomplish this, the user accesses the service provider's website and manually enter identifiers of the devices and data repositories (e.g., the home computer) that are to receive responses to his scanned queries. Alternatively, the system uses the various scanning methods discussed throughout this document to automatically identify the recipient devices.

In some embodiments, a public kiosk displays a dynamic session ID. The kiosk is connected to a communication network such as the Internet or a corporate intranet. The connection may be via cable modem, telephone system (PSTN, ADSL, DSL, cellular etc), wireless local area network (WLAN, IEEE802.11, etc.) or any other suitable access method. The session ID changes periodically but at least every time that the kiosk is used so that a new session ID is displayed to every new user. To use the kiosk, the user scans in the session ID displayed by the kiosk; by scanning the session ID, the user informs the system that he wishes to temporarily associate the kiosk with his scanner for the delivery of content resulting from scans of printed documents. The scanner may communicate the session ID and other information authenticating the scanner (such as a serial number, account number, or other identifying information) directly to the system (perhaps via a wireless communication such as a cellular Short Message Service (SMS) message) or by using the kiosk's links to the communication network. For example, the scanner may apply the kiosk's communication link by transferring the session initiation information to the kiosk (perhaps via short range RF such as BlueTooth™, etc.). The kiosk communicate then communicates the session initiation information to the service provider's system via its Internet connection. The scanner may communicate directly (where "directly" means without passing the message through the kiosk) with the service provider's system by communicating the session initiation message through the user's cellphone (which may be paired with the user's scanner via Bluetooth) or other wireless communication device.

In some embodiments, the system prevents others from using a device associated with a scanner during the period (session) in which the device is associated with the scanner. This feature is especially useful to prevent others from using a public kiosk before a previous session has ended. As an example of this concept related to use of a computer at an internet café, the user may initiate the session by scanning the session ID from the kiosk display (or entering it via a keypad or touchscreen on the portable scanner); and the system associates in its databases the session ID with the serial number (or other identifier that uniquely identifies the user and/or the user's scanner) of his scanner so another scanner cannot scan the session ID and use the kiosk during his session. The scanner may be in communication (through wireless link such as Bluetooth™, a hardwired link such as a docking station, etc.) with a computer associated with the display or may be in direct (i.e., without going through the computer) communication with the service provider's system via another means such as cellular, etc.

In some embodiments, the portable scanner's functions vary depending upon the associated devices. For example, if a portable scanner is associated with a nearby computer that has optical character recognition (OCR) capability, the scanner may communicate scanned image data to the computer, whereas if the associated computer did not have OCR capability, the portable scanner may apply an on-board OCR function to convert the scanned images to text before communicating the text to the service provider.

In some embodiments, the scanner obtains the communication session identifier from the computer by wireless communications (e.g., a Bluetooth™ link) rather than scanning. For example, after a portable scanner makes a Bluetooth™ connection with a computer, the computer may use the Bluetooth connection to communicate the communication session identifier to the scanner, rather than displaying it on the computer display for the user to scan with the portable scanner.

In some embodiments, the system enhances the user interface for portable electronic devices by associating other devices that have better video or audio capability than the portable electronic device. For example, a subscriber waiting for a flight in an airport may browse a television guide and notice a show that he wishes to watch. Using the web browser on his computer to browse to the service provider's website, the subscriber may get a communication session identifier communicated to his laptop computer. Scanning the communication session identifier and information identifying the show from the television guide, the subscriber identifies the laptop computer as the location where he wishes to have the video content (the television show) delivered. The system may check whether the subscriber has the proper permissions to access the content (e.g., does he have a 'cable television' service contract; if broadband Internet access is necessary to deliver the video, does he have a broadband service contract with an Internet Service Provider, etc.) prior to sending it to the laptop computer.

Personal Computer

In some embodiments, the handheld document data capture device controls the operation of a personal computer (PC). The handheld device submits data and instructions to the PC that cause the PC to launch software applications and/or take other actions. For example, when making a Power Point™ presentation with a computer and LCD projector, a user can control the operation of the computer by scanning a paper copy of the Power Point™ slides. The user scans information from a slide to make the computer advance to the slide. The handheld device can also be used to control word processing software, web browsers, and other software applications from a rendered document. The user can edit electronic documents, make purchases over the Internet, and send messages by controlling the personal computer with the handheld device.

Editing

In some embodiments, the handheld data capture device serves as a data entry device for a host computer. The handheld device and the host computer, in combination with word processing software, comprise a powerful document editing system.

The document editing system mirrors and/or interprets the user's motions on a printed surface as editing commands for the document in the computer's word processing application. By use of the handheld device, the user causes the word processing software to perform various functions such as bookmark, highlight/underline/bold/italicize text, cut, copy, paste, search, save, and print.

In some embodiments, the color of the highlight indicator on the handheld device indicates the color of highlights that will appear in digital copy. In some embodiments, colored lights can be reflected onto the paper to indicate to the user the color of the highlights that will appear in the digital copy, the state of the capture device, etc.

VCR

In some embodiments, the portable data capture device can control video recording devices. For example, by capturing data from a television guide, the portable device can transmit commands to program a video recording device to record predetermined television programs. In some embodiments, the portable device transmits the commands to the video recording device by infrared (IR) communications.

Status Indicators

The user-interface of the handheld data capture device can inform the user about the current status of the device. The device can alert the user by visual, auditory or tactile indicators. Some of the more useful user-interface status indicators are discussed below but this is by no means a comprehensive list of the possibilities.

Sufficient Scan Indicator

In some embodiments, the portable capture device indicates to a user that enough information has been captured to identify a document. For example, a handheld scanner may store predetermined thresholds that indicate a particular scan uniquely identifies a document. When the threshold is met or exceeded, the portable scanner indicates to the user via the user interface that enough information has been scanned to identify the document. These predetermined thresholds may be determined based on heuristics (i.e., rules of thumb), statistical analysis, or other suitable methods.

The handheld data capture device may indicate to the user that sufficient information has been scanned via the visual, audio, or tactile capability of the user interface. Upon determining that the scanned information has met or exceeded the predetermined threshold, the device's processor will instruct the user interface to communicate to the user that enough information has been scanned to identify the document from which the information was scanned.

In some embodiments, the sufficient scan indicator indicates various levels of confidence in the "sufficiency" of the scan. For example, a red light might indicate that not enough text has been captured, a yellow light might indicate a fifty percent probability that enough text has been captured, and a green light indicates a near certainty that enough text has been captured.

Methods of Determining Sufficiency

In some embodiments, the system uses a heuristic for determining the sufficiency threshold that is based on observations of the unique character of written expression. Most documents can be uniquely identified with a scan of fewer than 10 words (roughly 20-50 characters or symbols). This heuristic holds across all languages on which it has been tested. In the event that a scan in the range of 4-10 words results in duplicate documents, the user can be prompted to scan additional words to further narrow the results.

Processing logic in the portable device can decide whether or not a scan is likely to uniquely identify the source document. In some embodiments, a sufficiency threshold is a parameterized rule of thumb based on observation of previous scans. For example, the scanner may be programmed such that eight words are unique (where a "word" is a series of characters between spaces). Alternatively, the scanner may be programmed with a sufficiency threshold that requires that the captured text have at least six words that are all longer than three characters each. Another approach is to determine that a scan is unique after a scan of a certain physical distance (e.g., a scan of four inches of text would be more than half of a line of text on a standard width page). Another approach is to set the threshold based on characters scanned, rather than words (e.g., a scan is unique after 40 characters). As another alternative, scan sufficiency can be determined by sending the scanned text to a search engine and receiving a search result. When the search engine returns a unique match, the scan is sufficient. Another way that a scan may be determined to be unique is if some embedded data is found, such as a two dimensional barcode, that is designed to convey uniquely identifying information.

Context affects the amount of captured information necessary to identify a document or specific location in a document. The more context the system knows about a particular scan, the shorter the phrase that is required for uniqueness. Within a known document, the system can calculate a sub-index that indicates what is required to be unique within that document. In other words, because the system knows all the text in the document, the system can determine which combinations of characters and/or words are ambiguous and which are not. How much text must be captured to be unambiguous in a particular document is a function of the total number of characters in the document, word length, and how many times a word is used in the document. Expressed mathematically, one embodiment of this relationship is: sufficiency=f(total num chars, num of repeat chars, word lengths).

The threshold method enables the handheld data capture device to indicate to the user in real time whether the captured text is unique or not.

When using the method of submitting a search to a search engine, uniqueness is determined by one or null hits—i.e., no other indexed document has content matching the search query.

When using a word count threshold to determine the sufficiency of a scan, the length of the scanned words will affect the number of words required to sufficiently identify the document or region. Long words generally have more disambiguation value than short words. Thus, the word "amalgamation" has more disambiguation value than the word "the." Word length can be determined, even prior to OCR, by observing whether there are any whitespaces in a character string. A large number of characters without intervening whitespaces indicates a big word, which is likely to have high disambiguation value. A large number of whitespaces separated by a few characters means short words which have less disambiguation value.

Information about font size, color, and font type are useful for disambiguation. Knowing these properties can reduce the amount of text needed to identify a document or region.

Embedded Control Data Indicator

In some embodiments, the handheld data capture device alert the user when the user encounters control data embedded in a document. For example, the portable device can alert the user when it encounters a known keyword. As another example, the handheld device can alert the user to active regions defined within the document by the markup layer. As yet a further example, the device can alert the user when it encounters control data embedded in ink that has non-visible properties (e.g., UV/IR ink) or two-dimensional bar codes.

Context Indicator

In some embodiments, the portable device indicates to the user that device does or does not recognize its current context (e.g., whether the device knows the identity of the document that the user is currently working with, region within a known document, etc.). Context "lock" is particularly useful for p-commerce applications. For example, the context indicator can inform the user that the system knows from which catalog she is scanning item. Thus, ensuring that the correct items will be purchased from the correct vendor. In some embodiments, the context indicator displays the name or other identifying information of the rendered document.

Online/Offline Indicator

In some embodiments, the portable device alerts the user to whether it is operating in online or offline mode. When the device is online, it has an active connection to a host computer or the service provider's network. When the device is offline, it is not presently in communication with other system devices.

Data Capture Indicator

In some embodiments, the device indicates to the user that it is capturing data and otherwise functioning correctly.

Error Indicators

In some embodiments, the device alerts the user to errors. For example, the device may beep to alert the user that the paper document has been identified but the user does not have permission to access the electronic counterpart of the paper document. As further examples, the device can alert the user that the last scan must be repeated; that access has been denied to a host computer or service provider network, that a document delivery did not occur (e.g., the user's life library archive did not receive/accept a document), the portable device is out of memory, battery power is running low, etc., Highlight Color Indicators In some embodiments, the portable device shows the user what color the highlight function will produce. In some embodiments, the host computer shows the color of the current highlighting mode on its display (e.g., yellow means that word processing software is highlighting in yellow).

Security/Privacy

In some embodiments, the portable data capture device has security and privacy processes that unauthorized persons cannot use the device, that data transmissions are private, and that the user's identity can be verified for commercial transactions.

In some embodiments, the portable device uses encryption processes to ensure privacy and security of user data. Data stored in the device's memory can be encrypted as well as data transmitted to other devices. Additionally, the user can set the device profile to limit the amount and kind of information shared with other devices. In some embodiments, the system allows the user to designate that all search results are returned to the portable device and are not stored in the system or service provider network.

In some embodiment, the scanner is paired to a host machine such as a computer, PDA, or mobile phone. The system can lock the portable data capture device so that it works only with a particular host machine by programming the host machine's identifier (e.g., serial number, etc.) into a predetermined location in the portable device's memory. Before communicating with another device, the portable device checks the predetermined memory location to see which machine is its assigned host. If anyone tries to use the scanner with another device the system (or the scanner itself) requires user to verify/authenticate his identity before the new communication pairing will operate.

Biometrics Uses

In some embodiments, the handheld data capture device and its associated system use biometrics for security and privacy. For example, a user can verify his identity by scanning his fingerprint with the portable device. As another example, in some embodiments, the device uses biometric information to encrypt data for privacy, such as using fingerprint scans for elliptic curve encryption. In some embodiments, the handheld device uses the same optical path for scanning text and biometrics.

Online/Offline Behavior

In some embodiments, the handheld document data capture device exhibits different behaviors depending upon whether the device is online or offline. A device is offline when it is not in communication with other devices such as host computers, communication networks, or data capture service provider networks. A data capture service provider network, also referred to as a scanner service provider network, is a service provider that supports applications of the handheld document data capture device, such as a life library archive provider.

In some embodiments, the portable device continues to function even when it is offline. The user can still scan data from rendered documents, make voice annotations, search for documents, and initiate p-commerce transactions. Some of these functions (such as transactions, annotations, and searches) will not be completed until network connectivity is restored.

One form of offline behavior occurs when a document is not currently available in electronic form. Thus, a search based on data captured from the document will return no matches. When this happens, the system can save the search query and periodically resubmit it until the document becomes available at some point in the future. The system can also notify the user that an electronic counterpart is not currently available.

In some embodiments, the portable data capture device keep the captured raw data (image or voice) in memory for later retrieval. This capability allows the system to recover the "as captured" data for further processing. For example, when a user scans text with a portable scanner, the scanned image is saved to memory and an OCR process is performed on the scanned image. If the image cannot be recognized by the OCR process, then raw image data can be sent to the host computer or service provider for further processing. In some embodiments, the scanned image data is kept in memory until it is overwritten by new data. For example, the device may save raw images and processed images (e.g., OCR'd text) until its memory fills up, at which point some embodiments of the device will only save the processed images and overwrite the raw images, which typically use much more memory space than the processed images.

The portable device can access locally cached data when in offline mode. Also, in some embodiments, of the portable data capture device detects when the connection to the host computer and/or network are available and automatically change behavior accordingly. For example, a portable device with this online/offline detection can automatically begin caching captured data when the connection is lost.

Local Caching

By local caching of information that the user is likely to need, the system can reduce latency and conserve network bandwidth. Locally cached search indexes, keyword libraries, markup information, and font libraries enhance the user experience and network operation. Local caching of font libraries enables the portable device to perform template-based OCR, even when it is in offline mode.

In some embodiments, the document data capture device will locally cache the results of recent scans to reduce network traffic because as much as 50% of network traffic will be repeat hits on same material, especially recently published materials.

A user's life library can also be cached in a host computer associated with the portable device. Tokens representing documents in the user's life library can be locally cached in the portable device. Locally caching the user's life library allows the user to access his life library even in offline mode.

In some embodiments, the system caches on the portable device representations of how much text is required for a scan to sufficiently identify a paper document or locate an electronic counterpart. This local cache can also include a list of commonplace expressions and clichés that have less disambiguation value than average text does. When captured data includes common expressions or clichés, the minimum disambiguation threshold increases and additional text is required to sufficiently identify a document. Thus, common phrases increase the amount of text that must be scanned to identify a document. By locally caching these common phrases, the portable device enhances its ability to indicate to the user that enough text has been captured to identify the document.

By locally caching a list of documents known to be indexed by system (e.g., newspapers, magazines, etc.) the scanner can indicate that it knows context even when it is in offline mode.

In some embodiments, when the portable device encounters a font that is not locally cached, it downloads the appropriate font library from their host computer or service provider.

When a document has been identified, the markup document associated with that document can be downloading into scanner. Local caching of the markup document enables local determination of scanner behavior for that document.

In some embodiments, the system pre-caches indexes or other data about documents that the user is likely to encounter. For example, in some embodiments, the system pushes the index and markup document for the local newspaper down onto a user's portable scanner every morning in anticipation of the user scanning data from the newspaper.

Font Templates

In some embodiments, the handheld document data capture device locally caches font libraries and font templates. The font templates can be downloaded to the device after the font is recognized. It is not necessary to wait until the handheld device has captured one example of every character in the alphabet. After the system recognizes the font of some captured characters, the font library can be downloaded into data capture devices having local cache capability. The system can reduce OCR latency by locally caching the font templates in the portable data capture device.

Indexes

In some embodiments, the system caches search indexes on the portable data capture device. In some embodiments, the system can pre-cache indexes that the user is likely to need. For example, the system may pre-cache a portable device every day with the latest index to the local newspaper.

Keyword Libraries

Libraries of keywords can be locally cached on suitable embodiments of the portable data capture device. Locally caching keywords enables the portable device to locally determine its behavior in response to capture of a keyword. Local determination of behavior is especially useful when the portable device is not connected to a host machine or service provider's network.

Markup Information

In some embodiments, the portable data capture device downloads markup data for a document. This capability enables the portable device to locally determine at least some of its behavior in response to data capture from the document.

Keyword Processing

In some embodiments, the portable scanner recognizes keywords in captured data and supports keyword applications. Actions taken in response to the keywords are predetermined by the system and the markup document associated with the rendered document from which the keywords are captured. Generally, global keyword definitions are held at the system level and local keyword definitions are in the markup document. Unless otherwise specified in the markup document, the local definitions override the global definitions.

Keywords can be special symbols recognized by the scanner (such as the apple icon that is used as the trademark symbol of Apple Computers™) or regular text. For example, a document such as a catalog may include a menu of command symbols that have special significance to the portable device. To execute a control program associated with a keyword, the user would scan one of the special symbols. In response the device's processor would access and execute the control program associated with the keyword. In the catalog example, one of the special symbols may initiate a purchasing program that can be used to order products from the catalog via the scanner. The user would scan information about the products to be ordered and the portable scanner would communicate those products and other information necessary to complete the sale (such as billing and shipping information) to the catalog vendor via a connection between the Internet and the communication interface.

Search Behavior

In some embodiments, the handheld document data captures device supports search applications. The input for search queries is captured from rendered documents, especially by optical scanning from a paper document.

In some embodiments, the system tags search queries originating from the portable data capture device to indicate that the search terms are from a paper document.

Document ID/Location Via Data Capture

The system can use data captured from rendered document to identify the rendered document and locate an electronic counterpart of the rendered document. The system identifies and locates the document by searching an index of a corpus of documents. The system performs the search by submitting a search query to a search engine or search application software.

Search Queries

Search queries may be constructed in the portable data capture device or in the network. In some embodiments, the search query message will include the portable device identifier.

Search Queries with Context

Context about a search can enhance the accuracy of search results. In some embodiments, the handheld document data capture device submits search queries that include context information. Context can be derived from the user's history, from the aggregate historical behavior of a population of users, from properties of the document, or from circumstances of the search.

Time

The time at which a search term was captured from a document is a useful context for disambiguation. For example, if the search engine knows the date on which a search query was captured from a document, the search engine can ignore any documents that were published after the capture date because they could not have been the source of the captured data. In some embodiments, search queries include time stamps that indicate when the search string was captured from a rendered document.

Location

The location at which a search term was captured from a document is a useful context for disambiguation. For example, if the search engine knows the geographic location at which a search query was captured from a document, the search engine can ignore any documents that were not published or distributed in that location because they are not likely to have been the source of the captured data. In some embodiments, search queries include location stamps that indicate in what geographic location the search string was captured from a rendered document.

User History (from Subscriber Account)

The user's history is useful context for identifying and locating documents. For example, if the user has a pattern of scanning text from the Seattle Times newspaper every morning and the Economist magazine in the afternoons, it is more likely that a search query submitted in the morning is from the Seattle Times than the Economist. In some embodiments, the system will rank search query results based on user history.

Aggregate User Population Metadata

The aggregated behavior of all uses of portable document data capture devices also provides useful context for disambiguation. Users are more likely than not to scan similar information from similar documents. For example, where the user population recently has been submitting many search queries captured from the latest Harry Potter novel and none from Sean Hannity's latest book. Thus, if a search query returns several matches, it is more likely that the source document is the latest Harry Potter novel than a Sean Hannity book. Therefore, in some embodiments, the system ranks search query results based on aggregated user population behavior.

Construction of Search Queries

In some embodiments, the portable device captures sequential text from a paper document and constructs a search query based on that text. The search query is then submitted to a search engine or other search software. The search engine performs a search of its data indexes to identify the paper document or find an electronic counterpart of the paper document. In some embodiments, the portable capture device conserves communication bandwidth by only submitting enough information to identify an electronic counterpart, even though more information was captured from the paper document. It is an advantage in wireless systems to send only the necessary information, because wireless bandwidth is limited. In some embodiments, the system enables the user to modify or enhance the search query by entering more text from the device's keypad.

Partial Word Disambiguation

In some embodiments, the handheld device and system support partial word disambiguation. When text is captured from a rendered document, it is difficult for the user to begin and end the capture on word boundaries. The words at the beginning and end of the captured string are generally truncated. Search indexes traditionally consist of whole words, so partial words have little or no value to a traditional search application. These truncated, or "partial" words, still may have great disambiguation value however. In some embodiments, search engines use partial words to select from among a plurality of search results. For example, the search engines use the whole words to search the search index and the partial words at the ends of the search string to choose from among the results. Thus, search queries to these engines preferably include partial word information.

Multi-Line Scan

Figure 15:
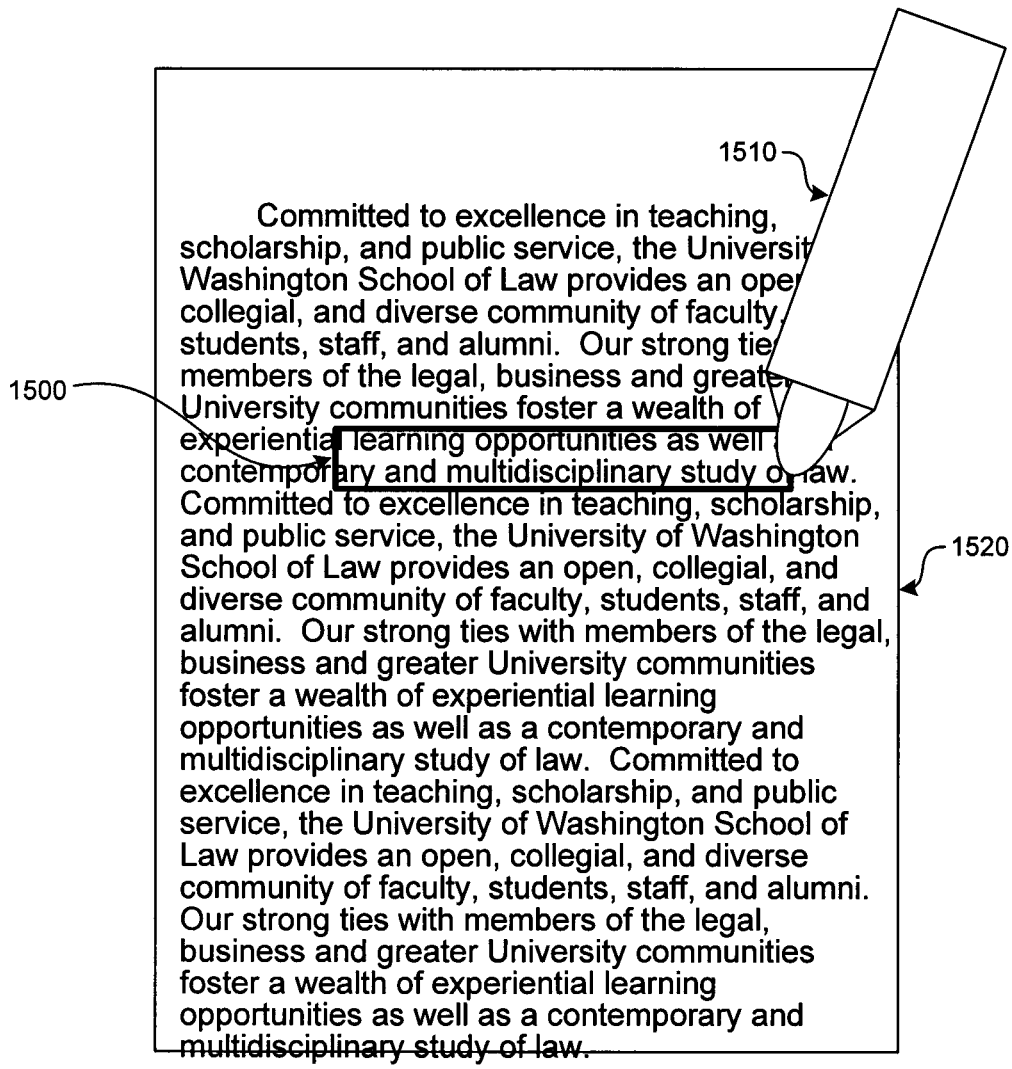
FIG. 15 shows a portable scanner that captures text from two lines of document.

In some embodiments, the portable data capture device is capable of capturing multiple lines of text during one operation. Mobile phones using the built-in camera to photograph a portion of a page, a pen-based scanner with an optical head that captures two lines of text, etc., are examples of scenarios in which an optical scanner can capture more than one line of text. FIG. 15 shows a portable scanner 1510 that captures text from two lines of document 1520. Box 1500 shows the captured text. When more than one line of text is captured, each line can be submitted in the search query in a "line1 text" AND "line2 text" format. Alternatively, if the approximate column width is known, the search query can be constructed as "line1 text" WITHIN X WORDS "line2 text," where X is generally less than the approximate column width. For the example shown in FIG. 15, the disambiguation search query could be constructed as be "study of law committed to" AND "and public service the."

Stamps (Context, Scanner id, User id)

In some embodiments, the system uses timestamps and location-stamps to identify documents. For example, an Associated Press article may appear in many newspapers but the correct newspaper could be determined by the location-stamp. If the location-stamp indicates that the scan was performed in Seattle, it is most likely that a Seattle newspaper is the source of the scanned AP article. Similarly, timestamps could be used to narrow the scope of candidate documents to those that were published prior to the timestamp. In some embodiments, the handheld device can construct search queries that include time and/or location stamps.

Wordlength/convolution Queries

In some embodiments, the system indexes and searches documents by word length. In the simplest case, three word lengths are used: long, short, and uncertain. The sequential pattern of long and short words forms a unique identifier for each document of sufficient length. Thus the document can be located by submitting a search query based on word length rather than a traditional search query that is based on text. An example of a word length search query is: 11001110?010??10110, where 1=short word, 0=long word, and ?=uncertain. Any object that is uncertain is essentially a treated as a wildcard by the search engine. Word length searches are particularly useful for imaging devices that cannot distinguish the individual letters in captured image. For example, a low resolution mobile phone camera is used to take a picture of a rendered document but it cannot resolve the image to the character level. The document can still be identified by searching for a matching sequential pattern of long and short words. Similarly, documents can be indexed and searched by convolution-based queries that indicate the repetition frequency of characters as discussed elsewhere in this document.

Text Properties

Search queries originating from scanned text can include information about the text such as font type, size, and color. These text properties can be used to disambiguate the document from which the text was captured. Traditional search queries throw this information away, however.

Document Identifier

If a user is searching within a known document, the search query can include the document's identifier. The search engine can use the document identifier to restrict the search results to the intended document. Traditional search queries do not include document identifiers.

Parallel Search

To enhance the user experience, searches can occur in parallel on the local device and the network. When one search returns a result, the other can be terminated.

Networked Behavior

In some embodiments, messages between the portable document data capture device scanner and the scanning service provider network include unique transaction codes. The transaction codes allow the system to identify each transaction. In some embodiments, the transaction codes are created from a hash of the scanner ID, scanned info, doc info, & time/location info.

In some embodiments, the handheld document data capture device has unique identifier such as an electronic serial number (ESN) or Network address so that the scanning service provider can identify the device. In some embodiments, the handheld device includes subscriber identity modules (SIM) that have encrypted billing and account information. In some embodiments, removable identity modules allow another user to borrow a data capture device and temporarily associate it with their account by inserting their identity module.

Each of the scanning service provider's subscribers has a subscriber account that is stored in a database in the service provider's network. The subscriber account data records can include billing/subscription information, the subscriber's name and address, information about electronic documents to which the subscriber is permitted access, information about subscriptions to paper documents, user history information, identifiers (ESN, etc.) of the subscriber's portable data capture devices, security/encryption keys, and location of the user's life library and/or personal webpage (blog). For example, the user could capture data from a document with his handheld device and enter a "blog this document" command through the UI. The system disambiguates the document and publishes a link to the document on the user's blog page that is pre-specified in the user's account.

In some embodiments, the network performs remote activation and programming, such as over-the-air activation (OAA) and programming (OAP), of the subscriber's handheld document data capture devices. When a data capture device powers up, it will register with the service provider's network. Once it has registered, the service provider can download activation data into the device. Activation data can include a network address or other unique identifier that the service provider can use to route messages to the device. After the device has been activated, the service provider can use remote programming to update the device with any necessary updates (e.g., locally cached markup data).

When the device registers with the service provider's system, the service provider can verify that the device belongs to a subscriber by checking the device's identifier against the subscriber account.

In some embodiments, the system moves indexes and other data to network elements near (either physically or in a connection-speed sense) the handheld device to reduce latency and to conserve network resources. Moving frequently accessed data close to the handheld device will reduce the number of network entities that must handle the information on its way to the handheld device.

Network Enhanced Disambiguation

In some embodiments, the network and the handheld document data capture device iterate the disambiguation process. For example, the user submits a search query constructed with data captured from a paper document. The service provider submits the search query to a search engine but cannot disambiguate the document. In response, the network prompts the user to capture additional information from the rendered document. The user submits the additional information and the service provider uses the new information in conjunction with the previously submitted information to disambiguate the rendered document. The service provider and user iterate through this process as many times as necessary to disambiguate the document. The service provider typically retains the previously submitted information and aggregates it with the newly submitted information to disambiguate the document.

Subscriber Accounts/Records

In some embodiments, the handheld document data capture device includes memory for storing information related to billing, subscription, and/or device identifiers. This memory may be removable, such as in a Subscriber Identity Module (SIM) or smart card, or non-removable, such as a Programmable Read Only Memory (PROM). In some embodiments, the SIM memory is associated with the user's mobile phone services account. In the case where electronic copies of documents are being located based upon the captured data, subscription information can be used to verify whether the user should be allowed access to the electronic copy. For example, a newspaper may charge an additional fee for access to its online version. The user's account with the service provider can include subscription information for paper documents, such as newspapers, that indicate whether the user subscribes to the online version of the paper document.

In some embodiments, the system uses billing information in the user's subscriber account to make purchases with the portable scanner. The memory contains encrypted credit card or other financial information of the user. For example, when the user scans text from a document and indicates (perhaps via the user interface or the gestural controls disclosed above) that he wishes to purchase access to an electronic copy of the document, the billing information can be used to provide payment to the copyright holder or content provider.

In some embodiments, the handheld device includes device identifiers such as serial numbers in memory. These device identifiers serve to uniquely identify the portable device and would typically be stored in PROM so that they cannot be erased. Additional security for transactions can be obtained by associating a portable device with only one user, such as by correlating the device serial number to a user's account or subscription in a network database. Alternatively, the system stores the device identifier in the smart card (or storing a smart card identifier in the portable scanner) to lock the scanner to the smart card. The device's processor verifies that the correct smart card was inserted before the portable scanner 200 is permitted to function. Smart cards with internal processors could also verify that they are inserted in the portable device to which they have been locked prior to allowing access to any information in the smart card.

Annotations

In some embodiments, the handheld document data capture device includes annotation applications. The annotation software enables the device to attach voice or text annotations to locations, marks, or text in a document. The annotations can be associated with a text string or an absolute location within the document. If the annotations are associated with a text string, they system can notify the subscriber if he edits or deletes the text to which the annotation is attached. Prior to proceeding with the edit or deletion, the system would seek confirmation from the user that he wishes to proceed.

Text

Text annotations can be entered by scanning text from a rendered document, through the portable device's keypad, or by conversion of voice data to text.

Voice

In some embodiments, the handheld document data capture device includes a microphone for capturing voice. The captured speech can be annotated to a document as an audio file at a location specified by the user, as discussed in further detail in the scannotator section below.

OCR

In some embodiments, the handheld document data capture device has onboard OCR capability. In some embodiments, the system performs OCR on the host computer or service provider. OCR can be accomplished by many suitable methods, including template matching, convolution, and word-length OCR.

Convert Trademark Symbols to a Code

In some embodiments, the portable data capture device converts trademark symbols to a code or plain text. The portable device has a database of trademark symbols that it can recognize. When it scans a trademark it recognizes, the portable device can substitute a code for the trademark image. The then portable device sends the code to the service provider network. The service provider takes predetermined actions associated with the trademark code. For example, a user might scan an image of the Mitsubishi™ "three diamond" trademark. The portable scanner compares the image to its on-board library of trademark symbols and identifies the three diamond symbol as the Mitsubishi trademark. The library has a unique code associated with each trademark that uniquely identifies the trademark to the system service provider. Rather than transmit the entire image file to the service provider, the portable scanner substitutes the code and transmit the code. Substituting a code for an image reduces the size of the message to the network, an important advantage for wireless communications. In some embodiments, the system sends an alphanumeric code over some communication channels (such as a cellular SMS channel) that do not permit image files. Of course, the trademark images could be converted to ASCII text, also. For example, the Mitsubishi™ three-diamond logo could be converted to the text string "Mitsubishi trademark."

Word Length

In some embodiments, the optical scanning subsystem distinguishes word length to a reasonable approximation, even if it cannot determine what the individual letters are. Fortunately, word length patterns also can be used to identify documents. By sorting the words in an image of a document into categories, the portable scanner can construct a code that can be used to identify the document. In the simplest case, the words would be sorted into three categories: long, short, and unknown. Short words have less than some predetermined number of characters and long words have more characters than the predetermined numbers. In other words, short word<X<long word, where X is a predetermined number of characters that distinguishes a short word from a long word. Searching a special index in which documents are indexed by word length will identify the rendered document. After an electronic counterpart is located, the electronic counterpart can be used to perform OCR on the scanned string by finding matching contiguous strings of long/short/unknown words in the electronic counterpart and converting the word length pattern into the individual characters of the words.

Template Matching

Template-matching OCR is compares captured images to stored character images. When a match is found, the character has been identified. Template-matching OCR is sensitive to variations in font style, size, italics, etc. Essentially, anything that might make the captured character look different than the stored template must be accounted for in a template-matching system. Template matching is very useful for recognizing images of trademarks and graphical icons.

Convolution

Figure 16:
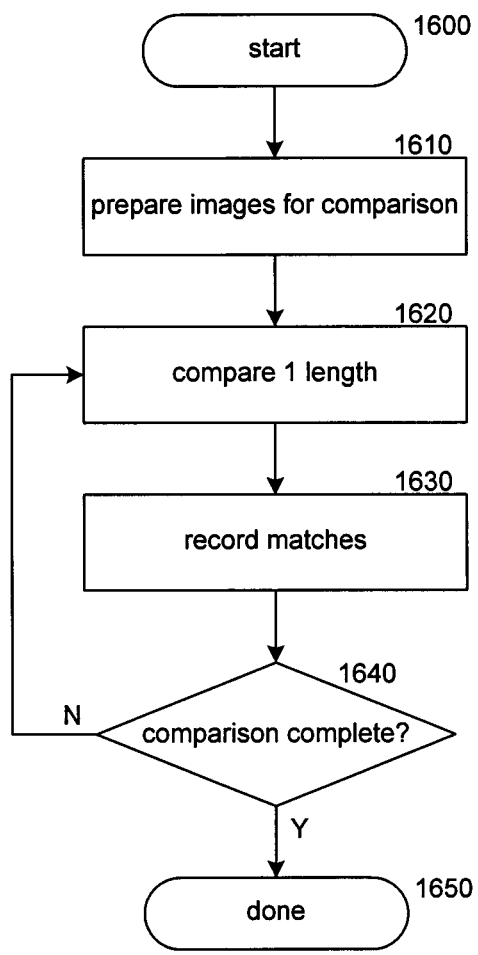
FIG. 16 shows one embodiment of convolution to determine character offsets.

FIG. 16 shows one embodiment of convolution to determine character offsets. In overview, this embodiment may be envisioned as sliding an image of text across itself. Once the convolution pattern for a string of text has been determined, OCR can be performed by statistical analysis or by identifying the source document via a search of a convolution-enhanced index. This embodiment begins 1610 after a sensor image has captured an image. A processor in this scanner may create a queue of pixels to compare with this original image. This queue may be vertical slices of a copy of this original image. Another approach may be to use address pointers to keep track of which vertical slices are to be compared, and then create temporary copies of these slices in the processor. The following step 1620 compares one length. Length refers to a horizontal width of a vertical slice. This may be one pixel, or multiple pixels. It may be heuristically determined based on whitespace. This slice may be the entire image. This slice is compared to slices from an original image. This may be done by comparing this slice sequentially to slices from an original. In some embodiments, this comparison slice is sequentially compared to a corresponding slice one step over. A step may be the same distance as a horizontal width. A step may be a pixel or multiple pixels. In the following stage of this process 1630, this processor records to memory where this image matches itself. This data may contain which vertical slices match other vertical slices of this original image. A matching section may or may not be a character (e.g., it might be two characters that only appear in order). The next step 1640 is to determine if this comparison is complete. Comparison does not necessarily refer to one slice, but to this larger process. One way to determine if the convolution process is complete is if there are no more slices to compare.

Figure 17:
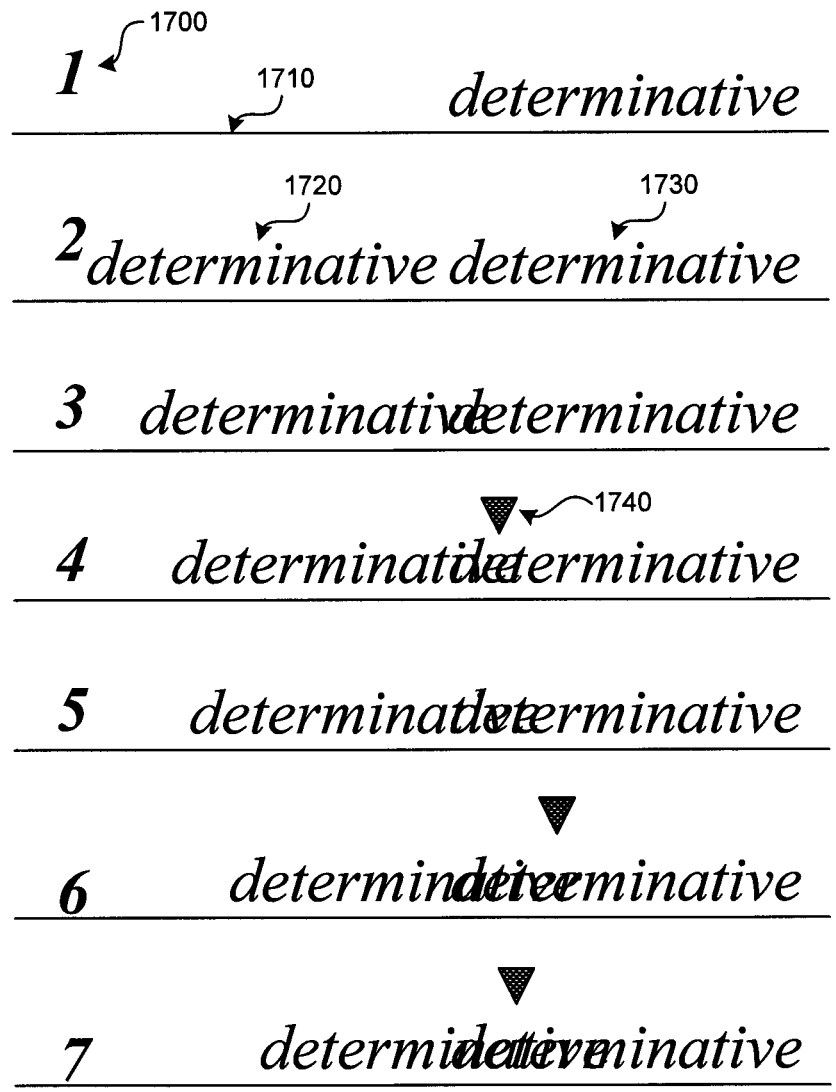
FIG. 17 is an illustration of one way to conceptualize the convolution process.

FIG. 17 is an illustration of one way to conceptualize the convolution process. This shows a step-by-step breakdown of using a single slice to find character offsets. The exemplary steps are numbered, such as the 1 1700 shown. Lines 1710 are used to separate the steps. An image of the word determinative is being compared. On the left is a slice 1720 and on the right is a copy 1730 in memory. When an overlap is found, it is designated with a triangle 1740.

Figure 18:
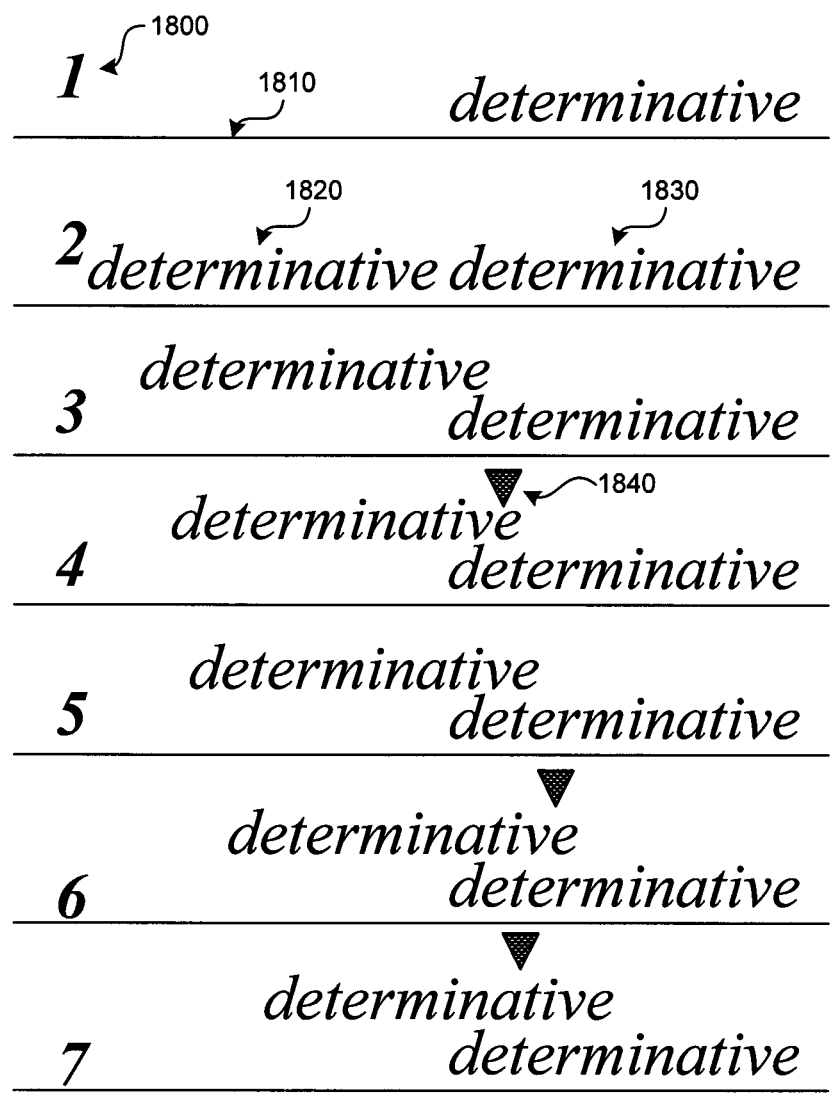
FIG. 18 is another illustration. Here, the slice copy is shown above the copy in memory so that it may be clearer why a match is found.

FIG. 18 is another illustration. Here, the slice copy 1820 is shown above the copy in memory 1830 so that it may be clearer why a match is found 1840.

Figure 19:
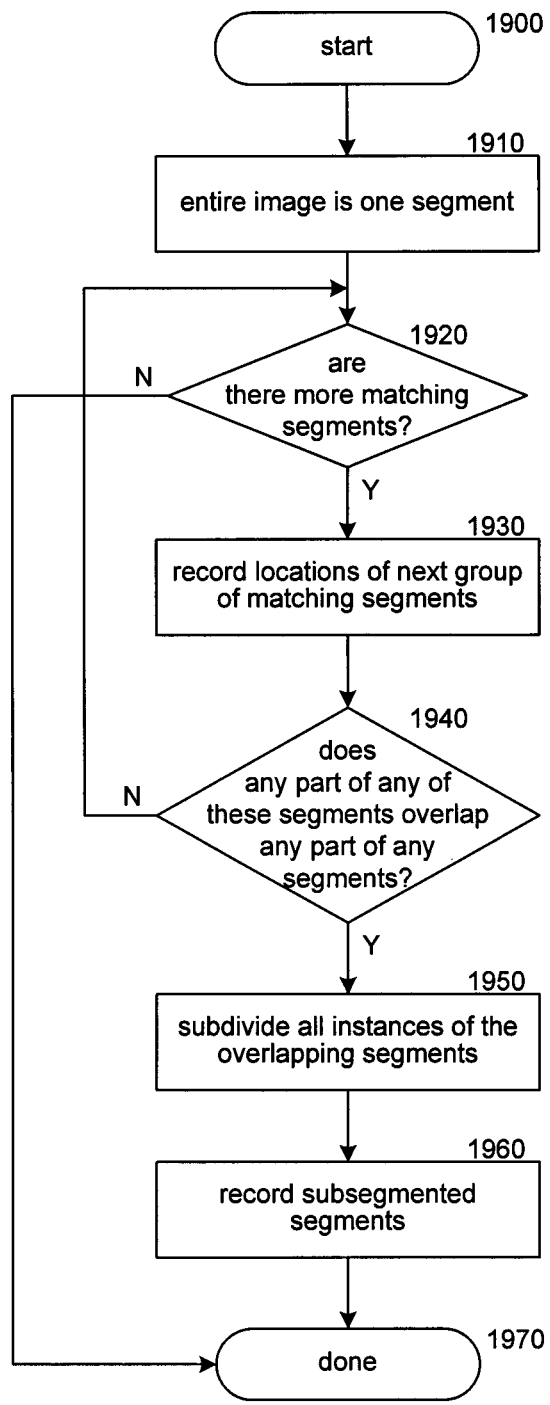
FIG. 19 is a flow diagram showing steps typically performed by the system to perform the convolution process on an image.

FIG. 19 is a flow diagram showing steps typically performed by the system to perform the convolution process on an image. In some cases, it can be difficult to determine which parts of an image are characters. One approach is to subdivide this image into sections that have a discrete number of characters. In some embodiments, this process is iteratively completed as matches are found, or may be started after all matches have been found. In step 1910, this image is one segment, i.e., an image of a discrete number of characters (this image may be cropped to the section enclosed in whitespace). In step 1920, if there are more matching subsections to process, then the system continues in step 1930, else the system terminates in step 1970. In step 1930, these sections are recorded. One-dimensional location measurements may be sent to memory. One way to associate these segments with their matching counterparts is to use an identifier. Another approach is to store them in memory such that their relative locations provide information as to how they match (e.g., each matching pair is stored sequentially, and odd numbered matches have one repeated region such that there is an even number). In step 1940, the system determines if any of these matching segments overlap with any segment. This overlap occurs where one segment entirely encompasses another, or where only a section of each overlaps. In step 1950, the system subdivides these segments. This subdivision step occurs where a first segment has multiple characters and a second segment has smaller number of these characters. For example, a first matched segment may contain "ing" and a second segment may contain "in." This process may then subdivide these into segments containing "in" (i.e., what was matched) and "g" (i.e., what was left). If all segments begin with a discrete number of characters, removing a discrete number of characters will also leave a discrete number of characters. In step 1960, the system stores each of these segments as the largest segment that is either completely overlapped or entirely free of overlap. This process may be similar to when locations are stored 1930. In some embodiments, the same system of correlating matching segments is used. After this process, an original image will have a number of matching segments identified. The system treats space between these segments (or between these segments and at least one edge of this image) as new segments that do not match any other segment. In some cases, each character has its own segment. In some embodiments, the system uses character analysis techniques, such as blob analysis or connectedness analysis, to further subdivide segments. These segments may then be used to determine the text on which they are based. In some embodiments, the system represents these segments as offsets, and uses these offsets to look up which text would produce these offsets. In some embodiments, the storage that contains this information is populated with data that can account for segments containing multiple characters.

Web Server in Device

A computer running web browser software such as Microsoft™ Internet Explorer can access the internal webpage included in some embodiments of the portable data capture device. So that the computer can access the portable device's internal webpage, the portable device is linked to the computer by a communication channel such as a USB cable.

Exemplary Embodiments

The following describes exemplary embodiments of the handheld document data capture device. These examples cannot disclose every possible embodiment but are meant to give a brief overview of what is possible.

Mobile Phone

A mobile phone embodiment of a portable document data capture device includes the capabilities of a phone and a scanner. The mobile phone can acquire image data with a dedicated scanning subsystem or with an integrated camera. Voice annotations can be acquired with the mobile phone's microphone. The user can input search query text on the phone's keypad, via the phone's scanner, or via the microphone.

In some embodiments, when the paper document is imaged with the phone's camera and shown on the phone's display, the mobile phone may have software that will show the markup layer overlaid on the paper document image. When the paper document is viewed through the phone's camera, the image is enhanced by the markup document data.

Methods of Identifying which Text on a Page will be Scanned by a Scanner that is not in Physical Contact with the Page One of the difficulties with using a mobile phone camera as a scanning device is showing the user which text will be scanned. In some embodiments, the mobile phone projects a beam onto the surface to be scanned that will highlight the approximate scan area. In some embodiments, the mobile phone displays the region to be scanned on the phone's display. The display may be enhanced in various ways to show the user what subset of the image will be scanned or OCR'd. For instance, the display could draw a box around the area in which text will be captured. Alternatively, the phone can show boundaries of scan region on display—superimposed over image of document from camera or from doc source—e.g., as red lines on display screen—or shaded background—etc.

Methods of Taking Action Based on Scanned Text and of Presenting Choices to a User In some embodiments, the system disambiguates a paper document in the mobile phone context by:
- capture an image of a portion of the paper document
- optionally ocr image, find offsets, compress, etc.
- transmit the image or text data across cellular network to server
- locate document or documents and associated markups (if any)
- transmit behavior/presentation data to wireless handset
- present data to user
- optionally receive instructions from user
- store or transmit instructions from the user.

In some embodiments, at least a portion of the data for the menu (e.g., "markup data") and the index of document have been downloaded to, and reside on, the mobile phone. The menu/markup information is presented to the user on the mobile phone's display. Optionally, the menu can be presented to the user audibly.

In some embodiments, the mobile phone data capture device uses the phone's audio facilities to disambiguate documents. A user can use a wireless handset or landline phone to dial into a server that accepts voice scans, dtmf tones, etc., and obtain some of benefits of a paper-to-digital-document system using the audio channel of existing telephony.

For example, the user reads some representative portion of a document—e.g., document identifier, title, etc. The system provides feedback about ambiguity—optionally on screen—in some embodiments, the user receives an acknowledgment that a matching digital document is or is not found. The user can take optional actions to resolve ambiguity, such as scanning additional items of interest. The user can read aloud to set context and present disambiguation data to the system. For example, the user could set context by saying "NY Times, yesterday" followed by the disambiguation data. ". . . said we need this war to achieve peace . . ." The system would then search yesterday's edition of the New York Times for text matching the disambiguation data.

Methods of Scanning by Use of Mobile Phone Camera System

Simple scanning may not require the entire resolution of the phone's camera in every embodiment. Using only a selected portion of the camera sensor area has the advantage of higher data rates and lower power consumption.

In some embodiments, a fiber optic image conduit is part of the scanning subsystem. The scanning subsystem can be optically coupled with the existing camera images sensor. In some embodiments, a portion of the camera image sensor is reserved for exclusive use of the scanning subsystem.

Methods of Setting Context for an Action, Electronic Transaction or Search

The mobile phone subscriber's account with the cellular service provider can be used for account/billing information for p-commerce purchase transactions.

Other aspects of mobile phone functionality can be used to set context. For example, phone call activity and history can be used to establish context, to prioritize inputs, and to augment a search query. Additionally, other uses of the phone network can be used to set context, such as: use of the phone network for web/WAP/email/IM activity and history thereof; the phone's geographical location and history thereof.

The phone's text messaging dictionary can be used to enhance the OCR process. The T9 predictive text software for text messaging that is on many mobile phones can also be used to enhance the OCR and disambiguation processes. For example, the T9 predictive text software can be used to correct OCR errors. The text input and SMS messaging history can be used as vocabulary for OCR.

In some embodiments, the mobile phone recognizes an icon as an instruction to dial the number printed next to the icon. In some embodiments, the mobile phone recognizes phone numbers and takes predetermined actions upon scanning a phone number. Some of the possible predetermined actions are placing a phone call, storing the phone number in the phone's address book. In some embodiments, the phone uses the phone's geographic location as context to assist in recognizing phone numbers. For example, a phone number under the North American system consists of ten digits. Phones can use their location context when they scan a number to determine whether the number is a phone number. When the phone is in North America, an 11 digit number is not automatically stored as a phone number. When the phone is in Europe, the same 11 digit number might be automatically stored as a phone number.

Mobile Phone Commercial Transactions Initiated by, or Using, Scans of Rendered Documents Mobile phones can initiate commercial transactions by capturing information from rendered documents. For example, a user captures an image of a few lines of text from a document with his mobile phone camera; the phone recognizes a keyword in the captured data; and the keyword triggers a software application in the phone that causes the phone to deliver a sales offer for a product associated with the keyword. The user can indicate (perhaps with the phone keypad) whether he wants to consummate the transaction. If yes, the purchase cost is billed to the user's mobile phone account.

Mobile phones (or any wireless communication device that requires a subscription with a service provider) can be used to authenticate and complete transactions based on rendered documents. For example, a subscriber can fill out and submit a web page purchasing form. In response, the web merchant sends a code back to the subscriber's computer, which displays it on the computer monitor. The subscriber then photographs the computer monitor with his mobile phone and transmits the image to the merchant across cellular network. When the merchant receives the mobile phone message, the merchant can verify that the mobile phone account matches the information submitted on the web page, thus authenticating the user, and completing the transaction.

In some embodiments, the subscriber can call a dial-up number that connects the subscriber to a server on which p-commerce transactions can be completed by DTMF or voice input.

Methods of Using a Scanner Function in Combination with a Mobile Phone

In some embodiments, the mobile phone is an intermediate platform (host device) for scanning. For example, such a situation can arise when a BlueTooth™ scanner is connected to the mobile phone. When it is functioning as an intermediate platform the phone can store document indexes, markup documents, and user account data specific to user/scanner being used in conjunction with phone.

In some embodiments, the cellular phone system opens a data channel with any voice call. The caller takes a picture of a document with his cellphone (or otherwise captures enough data to identify the document, e.g., scan a string of text from doc), the captured data is punctured into the voice channel, software in recipient phone recovers the string and uses it to locate an electronic copy of the document from which the string was scanned by the caller.

In some embodiments, when a mobile phone captures a phone number and name, it is preprogrammed to store both in the phone's address book. When just a phone number is captured, the phone is preprogrammed to automatically dial the number.

SMS, MMS

Search queries can be efficiently transmitted to the service provider or network by use of the cellular network's Short Message Service (SMS) text-messaging system for mobile phones. Images and audio files can be sent by the cellular network's Multimedia Messaging Service (MMS) that enables mobile phones to send and receive multimedia messages.

An interesting aspect of the mobile phone embodiment resides in the observation that only a small fragment of data is required to identify location—especially if that fragment is further *qualified by context*. This short fragment approach then leads to a surprising ability to sending document scan data over limited bandwidth channels formerly incapable of transmitting a document image.

Computer Mouse

One embodiment of a portable data capture device is an optical mouse with scanner capability. In some embodiments, the optical mouse uses the same optical path for scanning and motion-sensing. In some embodiments, the optical mouse has a viewfinder for observing the text that is being scanned.

The viewfinder allows the user to see where the scanner is targeted. Some technologies that can be used to implement the viewfinder are: a clear plastic window that shows the document beneath the mouse; a series of mirrors similar to a periscope; a display that shows the real-time output of the scanner; or a fiber optic image conduit.

Figure 20:
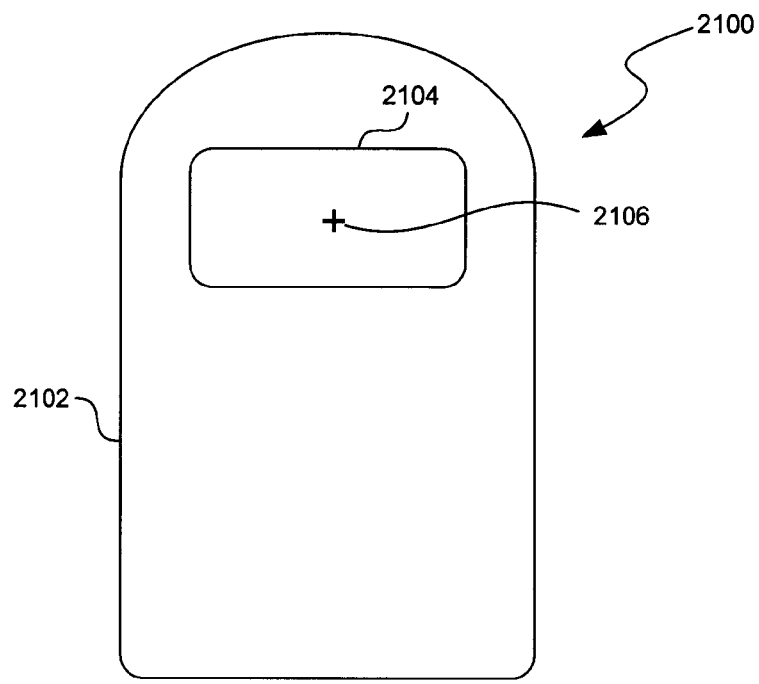
FIG. 20 shows scanner/mouse with a viewing window to reveal the surface below the mouse.

FIG. 20 shows scanner/mouse 2100 with a viewing window 2104 to reveal the surface below the mouse. The scanner/mouse 2100 has a housing 2102 in which there is a viewing window 2104. The viewing window may have a target 2106 for indicating which text the scanner/mouse 2100 is capturing. The viewing window can be used in combination with the mirror arrangement shown in FIG. 24.

Figure 21:
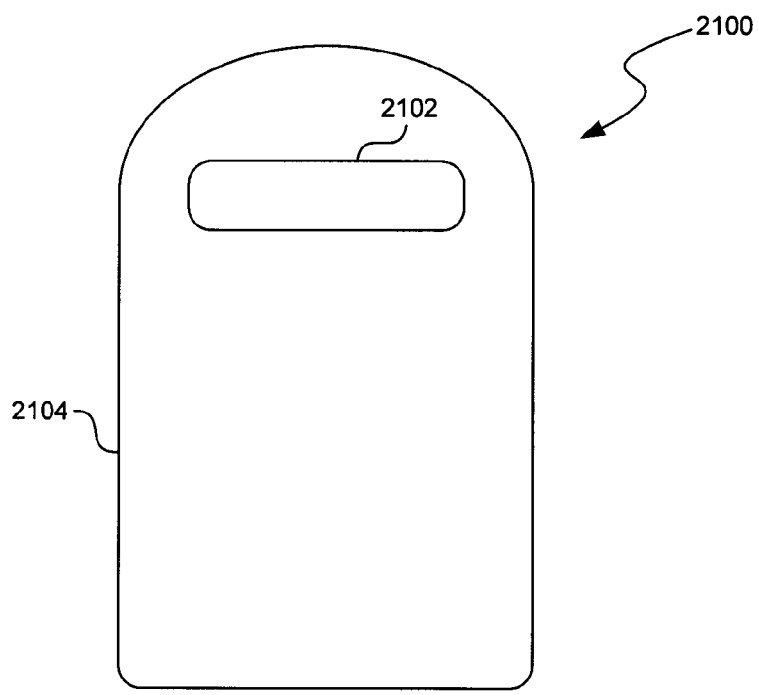
FIG. 21 shows a scanner/mouse with a display (LCD, LED, etc.) mounted on top of housing so that the user can see what is being scanned.

FIG. 21 shows a scanner/mouse 2100 with a display (LCD, LED, etc.) 2102 mounted on top of housing 2104 so that the user can see what is being scanned. Display 2102 might show the output of the optical scanning subsystem in real time. In some embodiments, a processor (either the host computer's processor or an on-board processor) can manipulate the output of the optical mechanism before it is sent to the display 2102. See FIG. 25 also.

Figure 22:
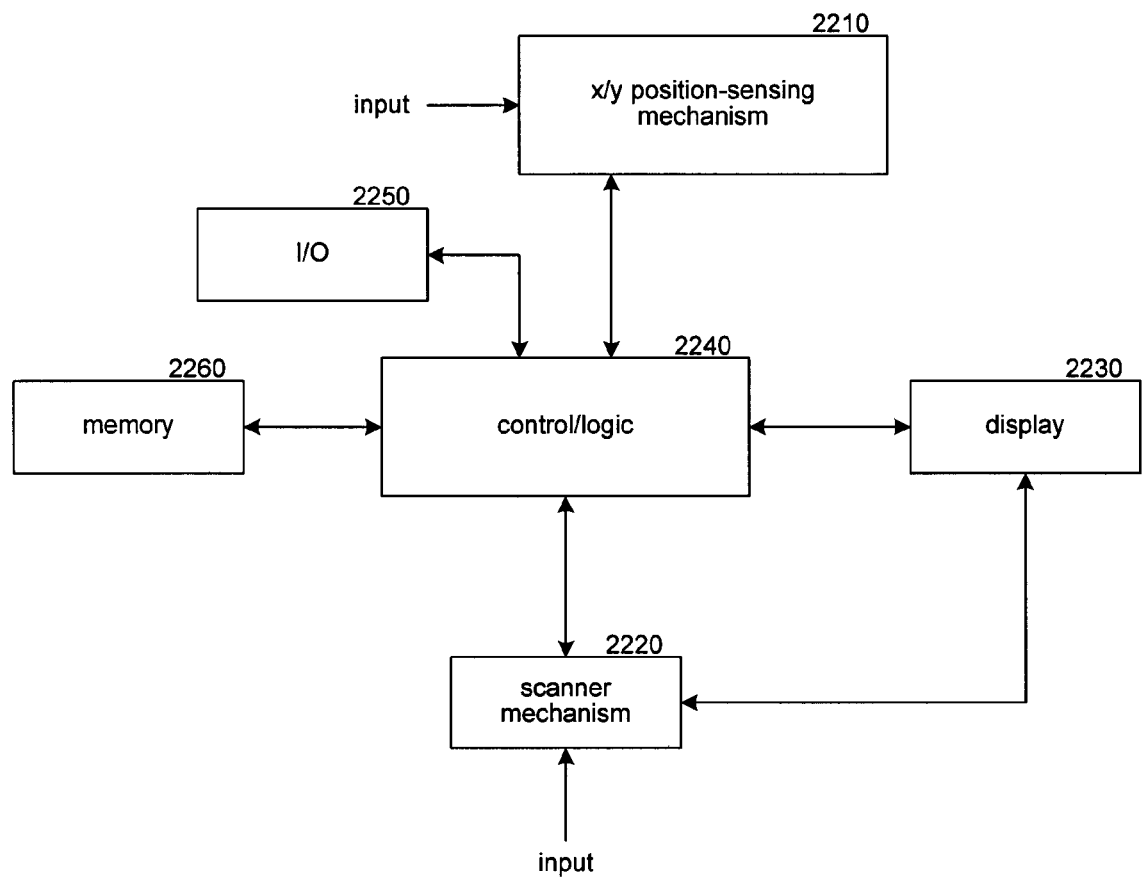
FIG. 22 shows a block diagram of a mouse with a separate position-sensing and scanning mechanism, such as a mouse with a traditional mechanical x/y mechanism and an optical scanner.

FIG. 22 shows a block diagram of a mouse with a separate position-sensing 2210 and scanning mechanism 2220, such as a mouse with a traditional mechanical x/y mechanism and an optical scanner. Control logic 2240 is operably connected with position-sensing mechanism 2210, scanning mechanism 2220, display 2230, I/O subsystem 2250, and memory 2260. The optional display 2230 can show scanned data to the user. The memory 2260 can store scanned data and instructions. The I/O subsystem 2250 communicates with a host computer by wireless or wired communications means such as a Bluetooth transceiver or USB port. In some embodiments, the I/O subsystem 2250 also includes user input devices such as switches, keypads, or buttons.

Figure 23:
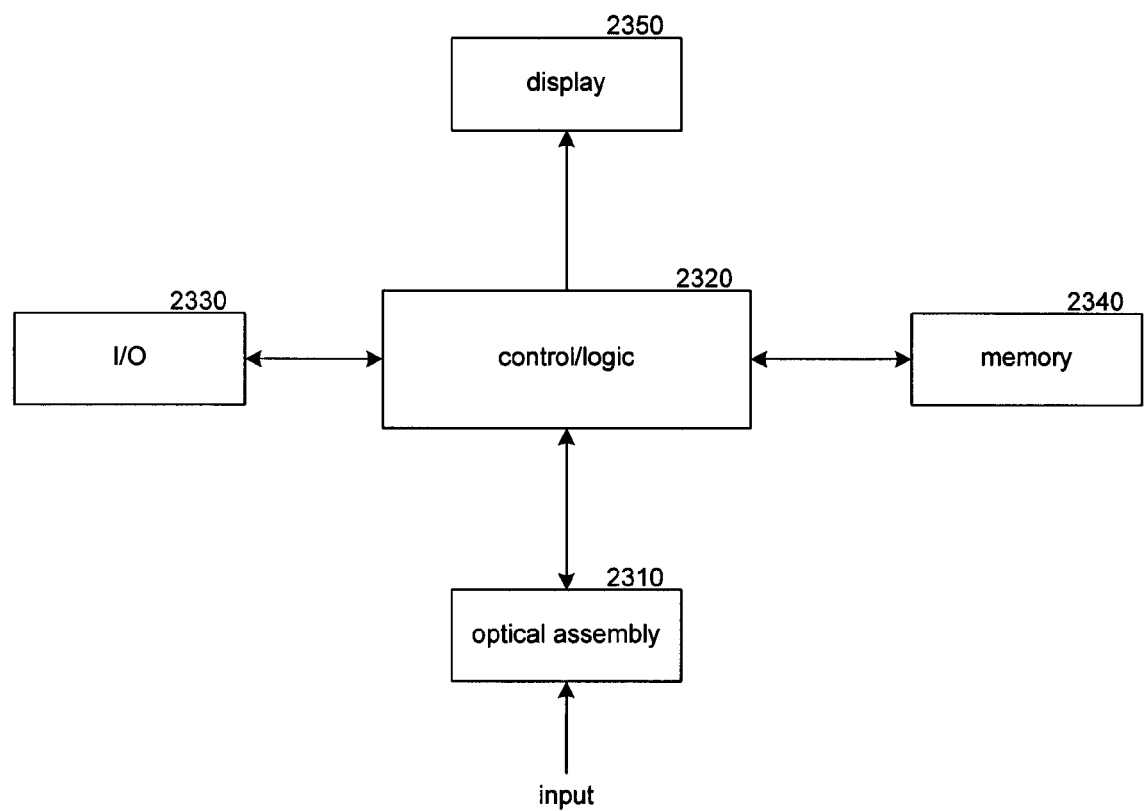
FIG. 23 shows a block diagram of a mouse with an optical sensor assembly that can be used for detecting x/y motion and for scanning data from a rendered document.

FIG. 23 shows a block diagram of a mouse with an optical sensor assembly 2310 that can be used for detecting x/y motion and for scanning data from a rendered document. Control logic 2320 is operatively connected with the optical assembly 2310, the I/O subsystem 2330, the display 2350, and the memory 2340. The control logic/processor 2320 can determine which function (scanning or motion-sensing) is required. Alternatively, the I/O subsystem 2330 could include a user-selectable switch that would switch between x/y motion and scanning functionality. The memory 2340 can store data and instructions. The display 2350 can show the scanned data and/or device status (e.g., whether the device is currently in scanner mode or mouse mode, etc.) to the user.

Figure 24:
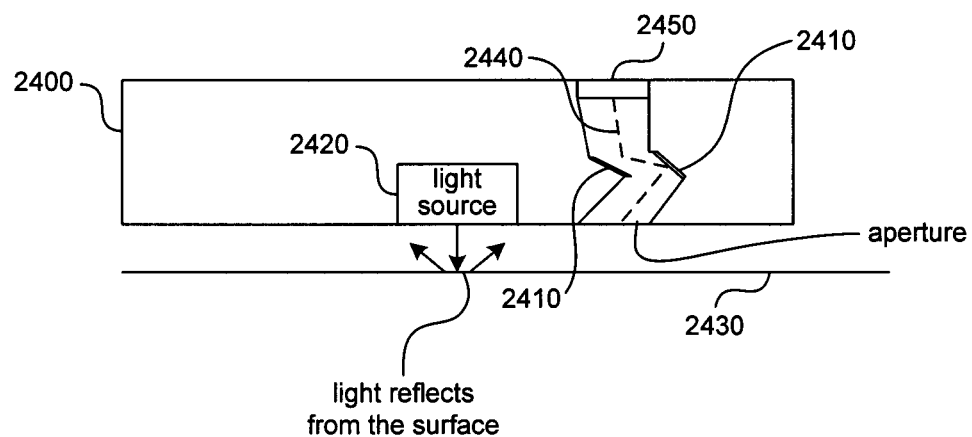
FIG. 24 shows a side view of a mouse/scanner that uses a series of mirrors to reflect an image up to the viewfinder of what is under the scanner head.

FIG. 24 shows a side view of a mouse/scanner 2400 that uses a series of mirrors 2410 to reflect an image up to the viewfinder of what is under the scanner head. A light source 2420 illuminates a portion of a rendered document 2430 that is being scanned by the user. At least some of the light from the light source 2420 reflects from the document 2430 and travels along the optical path 2440 to the viewfinder window 2450 which is visible by the user. In an alternative embodiment, a straight opening through the mouse would not require mirrors 2410. In this alternative, the viewfinder windows 2450 might be placed on either side of the scanner head/light source 2420 (see FIG. 26).

Figure 25:
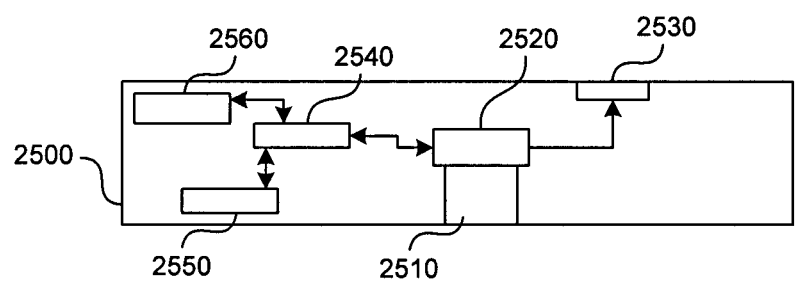
FIG. 25 shows an example of a mouse/scanner that uses a image conduit operatively connected with a light sensitive semiconductor chip (CMOS, CCD, etc.).

FIG. 25 shows an example of a mouse/scanner 2500 that uses an image conduit 2510 operatively connected with a light sensitive semiconductor chip (CMOS, CCD, etc.) 2520. The output of the CCD 2520 could be directly applied to a display 2530 and to the processor 2540 (alternatively, it could be processed before being routed to the display 2530). The processor 2540 is operatively connected with CCD 2520, display 2530, memory 2550 and the I/O subsystem 2560.

Figure 26:
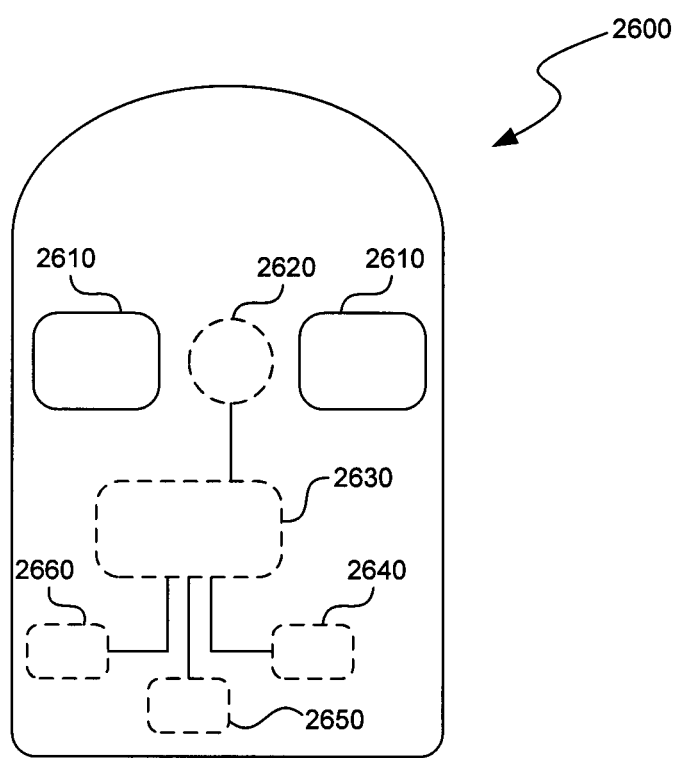
FIG. 26 shows a top view of a mouse/scanner with a viewfinder that is essentially a window on either side of the scanning mechanism so that the user can see the text that the going to pass under the scanning head.

FIG. 26 shows a top view of a mouse/scanner 2600 with a viewfinder that is essentially a window 2610 on either side of the scanning mechanism 2620 so that the user can see the text that the going to pass under the scanning head. The processor 2630 is operatively connected with the scanning mechanism 2620, memory 2640, I/O subsystem 2650, and power supply 2660. The power supply 2660 is typically included in scanners that communicate wirelessly, but is optional for a wired mouse.

Scan Head Accessory w/USB Port

A scanning accessory with an adapter port is another example of a portable data capture device. The scanning accessory can be plugged into the appropriate connector on another device, such as a mobile phone or PDA, thereby upgrading the device with scanning capability. In some embodiments, the accessory merely has an optical capture subsystem and an adapter (drawing power via the adapter). In some embodiments, the accessory includes control logic, memory, and power supply.

Scannotator

In some embodiments, the system targets audio annotations to selected positions in an electronic counterpart of a rendered document ("the system"). In order to target a spoken annotation to a selected point in a paper document, the user uses a hand-held optical scanner to scan a portion of text at the selected point. The user then speaks the annotation, which is captured by a microphone in the optical scanner and stored in association with the scanned portion of text.

The scanner may connect to, or otherwise communicate with, a computer system or similar device via a wired or wireless connection of various types. Once connected, the stored association can be used, for example, to play back the annotation while displaying the selected point in an electronic version of the document, to display a textual version of the annotation obtained via voice recognition in connection with the selected point in an electronic version of the document, to automatically revise an electronic version of the document at the selected point in accordance with the annotation, to embed the annotation as an audio file in the electronic document at the selected point, to insert a pointer (e.g., hyperlink, etc) to an associated audio file containing the audio annotation, etc. In some embodiments, the scanned text may be used to identify and/or locate the document from among a larger universe of electronic documents. Alternatively, other approaches may be used to identify the document.

In some embodiments, the scanner includes controls, such as controls that navigate between annotations. When the scanner is connected to the computer system, the navigation controls can navigate between annotations in the document displayed on the computer system. When the scanner is not connected to the computer system, the navigation controls can navigate between annotations stored in the scanner, to review, revise, or delete such annotations in the scanner's memory.

By offering some or all of the functionality described above, the system enables a user to conveniently and accurately annotate an electronic document using a rendered copy of the electronic document.

Figure 27:
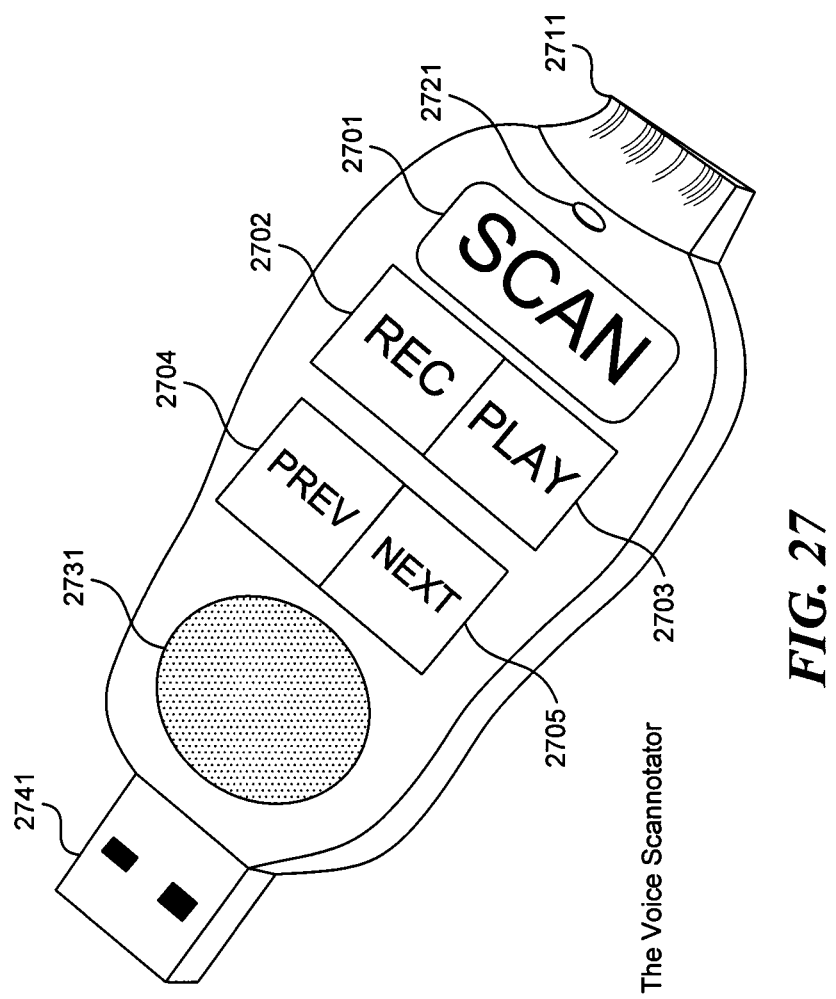
FIG. 27 is a perspective drawing showing a view of a sample handheld document data capture device.

FIG. 27 is a perspective drawing showing a view of a sample handheld document data capture device. While reading a paper document, a user may notice typing or spelling errors, factual inaccuracies, or other issues in the document which would require editing of, or other interaction with, the electronic original. The user presses the SCAN button 2701 on the annotating device and uses an optical sensor 2711 to scan a few words of the document to capture the context. In some embodiments, a visual indicator 2721 indicates whether the scanned text was recognized, and/or whether the scanned text is adequate or is likely to be adequate to identify the electronic document corresponding to the rendered document, and/or a single location in this document. The user then presses the REC button 2702 to record a voice annotation using a built-in microphone. Pressing a button 2703 allows the user to review the annotation using a built-in speaker 2731, while pressing REC button 2702 again allows it to be overwritten.

When the user has finished reviewing the printed document, the user (or an assistant) plugs a USB connector 2741 of the annotating device into the USB port on a computer (which may also recharge the internal battery of the annotating device) either directly, or via an extension cable if the USB port is inconveniently located. Simply plugging it in may cause an appropriate software package for editing documents to launch, load the appropriate document, and place the editing cursor at the point of the first annotation, possibly even selecting the words that were scanned. The user can then press the PLAY button 103 to listen to the recorded annotation, and make any necessary edits to the text in the normal way. The user can press the NEXT button 2705 to skip to the next annotation, and then press PLAY again, and so forth.

The REC button 2702 can be used to add additional annotations at the same location, for example if an assistant has a question about the original annotation or the suitability of their edited version.

The SCAN button 2701 may, when connected to the PC, be used as the 'DONE' button to indicate that the annotation has been noted and is no longer needed. In some embodiments, the same button triggers scanning when the device is in contact with paper and triggers audio recording when it is not. In some embodiments, the device may have a sensor or button (not shown for clarity) near the optical sensor 2711 to detect when the optical sensor 2711 is in contact with paper.

In some embodiments, the annotating device has a clip on the back, allowing it to be clipped to the annotated documents, in order to function as a set of audio Post-It® notes.

Figure 28:
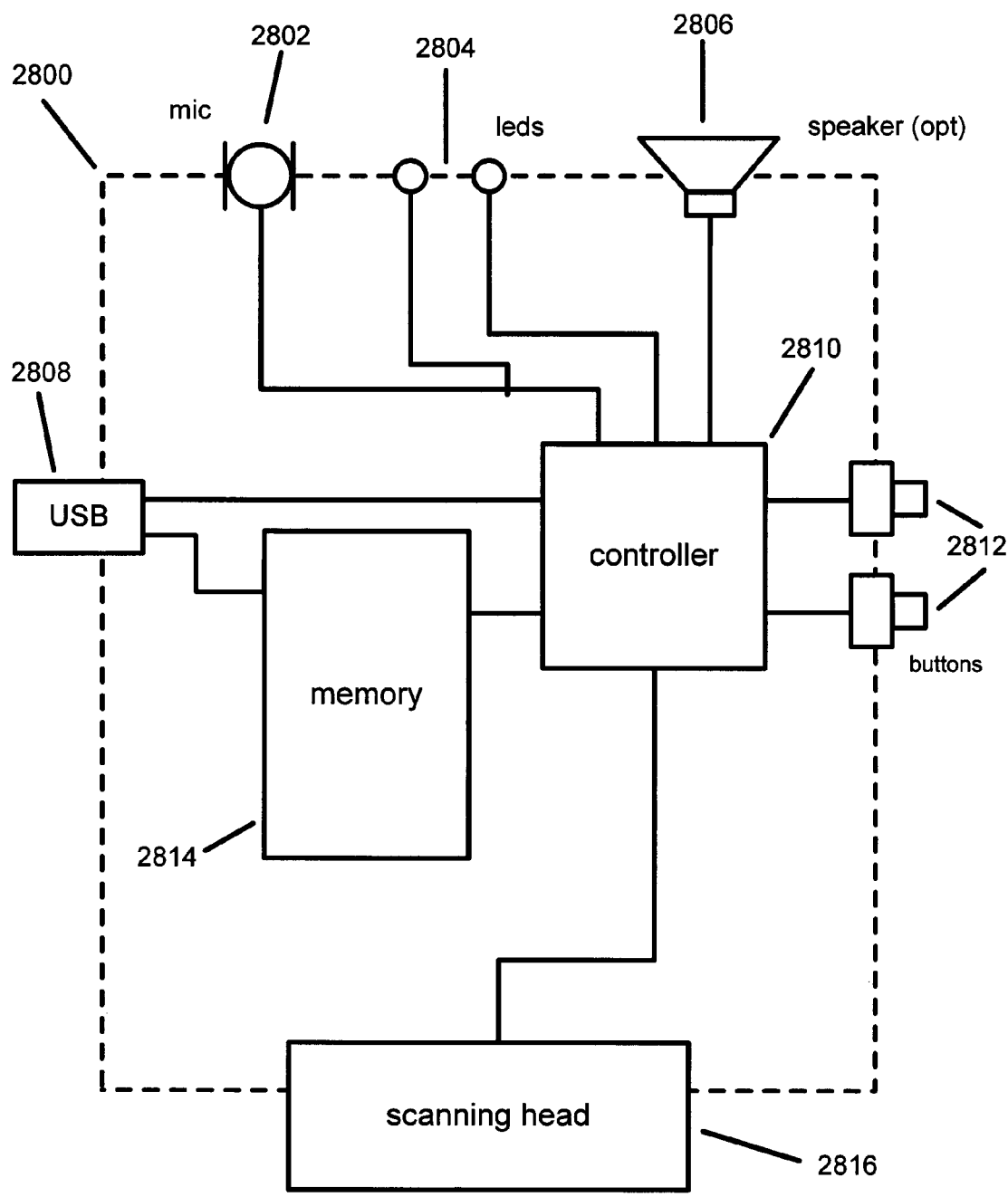
FIG. 28 shows a block diagram of one embodiment of the annotator device.

FIG. 28 shows a block diagram of one embodiment of the annotator device 2800. It incorporates an optical scanning head 2816 for capturing images of text from the paper document, and a microphone 2802 for capturing the voice annotations associated with the text. The data captured from these input devices is possibly processed by the central controller device 2810, and is stored in the memory 2814. One or more buttons 2812 are provided for the user to control the process, and some visual indicators 2804 shown here as LEDs, give feedback to the user. Of course, the visual indicator could be any suitable user interface, such as, for example, a Liquid Crystal Display (LCD).

Optionally, the device also includes a loudspeaker 2806 which allows voice annotations to be played back and other audio feedback to be given to the user.

An interface 2808 is included which allows data to be transmitted to a PC or other processing device, shown here as USB but may be firewire, Bluetooth™, 802.11, infrared, ethernet or other wired or wireless communication technology. Wire-based communication technologies, such as USB, may also provide power to the device for immediate operation or for charging internal power sources such as batteries.

Figure 29:
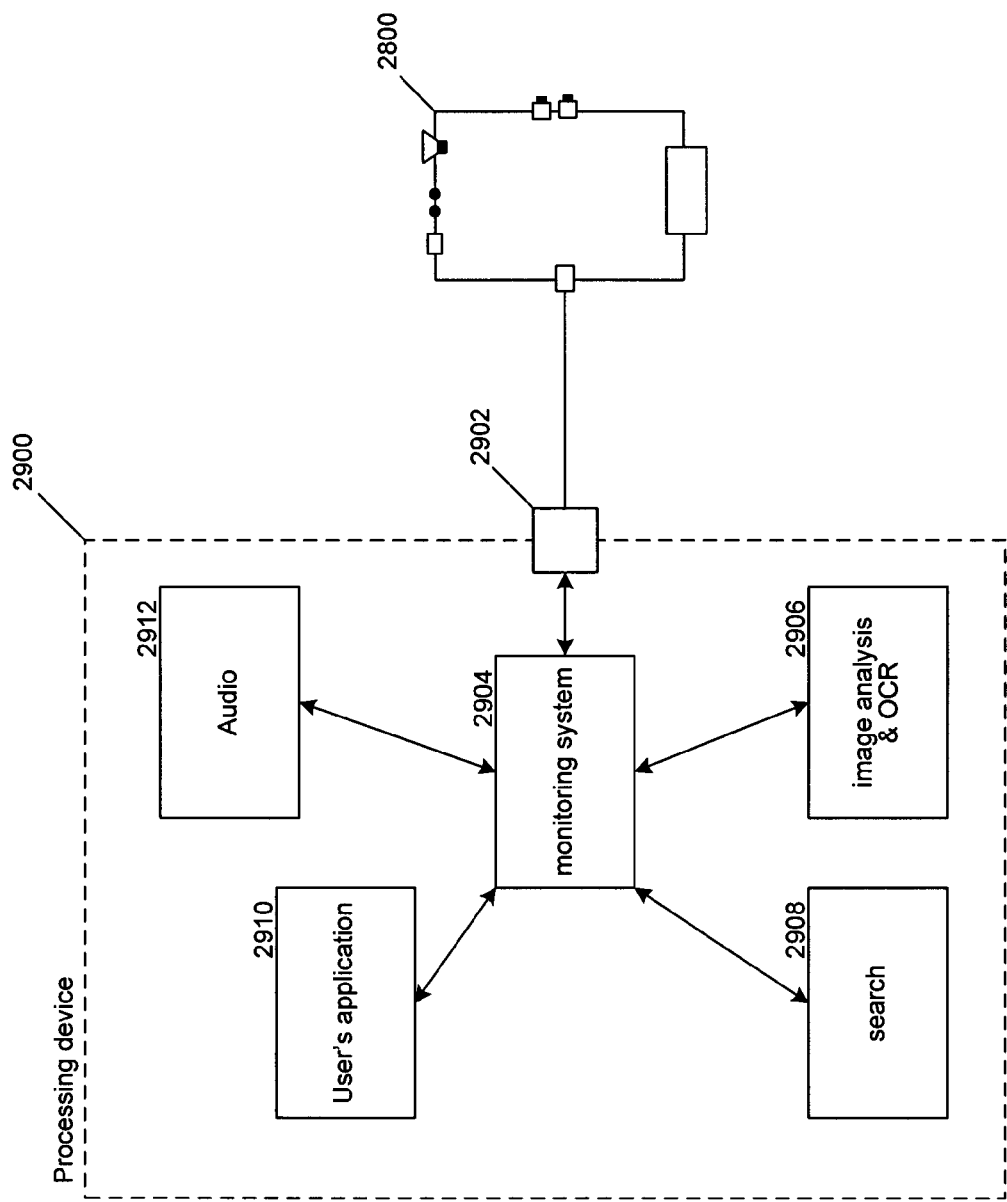
FIG. 29 shows the device connected to a processing device such as a PC through a communication port, typically a USB port.

FIG. 29 shows the device 2800 connected to a processing device such as a PC 2900 through a communication port 2902, typically a USB port. A monitoring system 2904 is responsible for detecting when the device is connected, communicating with it, and coordinating the resulting operations. Typically this will involve retrieving the captured images from the device to a subsystem 2906 for analysis and conversion to symbolic or text form, passing the resulting text to a search subsystem 2908 which locates the appropriate documents, and handing the details of those documents being passed to the application 2910 which enables the user to view, edit or otherwise interact with them. The monitoring system 2904 may also control that application, for example causing it to scroll a document to the location of an earlier scan. The captured audio annotations may be passed to the PC's audio system 2912 for playback to the user. The audio system 2912 may have Digital-to-Analog and/or Analog-to-Digital conversion capability in order to convert analog audio to digital form and vice-versa.

It is possible that many components of this process may take place on the device 2800 if it has more than a basic level of sophistication. The analysis of images and recognition of any incorporated text, shown here 2906 on the PC, may be completed, or partially completed, on the device 2800 before or during its connection to the PC 2900, so that, for example, it is text or some other derivative data which is passed to the PC 2900 instead of, or as well as, the images themselves. Similarly, the audio annotations may be played back to the user through the audio facilities 2906 embedded in the device, and the user interface to the process may be partly or entirely operated through the buttons on the device 2800.

Referring again to FIG. 28, in some embodiments, the scanning head 2816 of the device is able to capture images from a display device, such as a computer display, as well as from paper.

It is also possible that the text to be annotated may be identified by capturing and recognizing speech fragments read aloud by the user into the microphone 2802 of the device, instead of scanning and interpreting the image of the words on the paper.

In an alternative embodiment, the microphone 2802 is used for the capture of both text and annotations, allowing the scanning head 2816 to be omitted, and the image-processing and OCR stages described above to be replaced by audio-processing and speech recognition stages. In this embodiment, the user reads aloud into the microphone the text at the desired location for the annotation and the annotation. In some embodiments, the user can manipulate the user interface (buttons, displays, keypads, microphone, etc., for presenting information to the user and receiving input from the user) of the device to indicate which audio is marking the location and which is the annotation. The PC 2900 can later convert the appropriate audio into text and use this text to identify the electronic document associated with the rendered document. After the electronic document has been identified via the text string that marks the annotation location, the PC 2900 can cause the annotation to be inserted into the electronic document at the proper insertion point.

Figure 30:
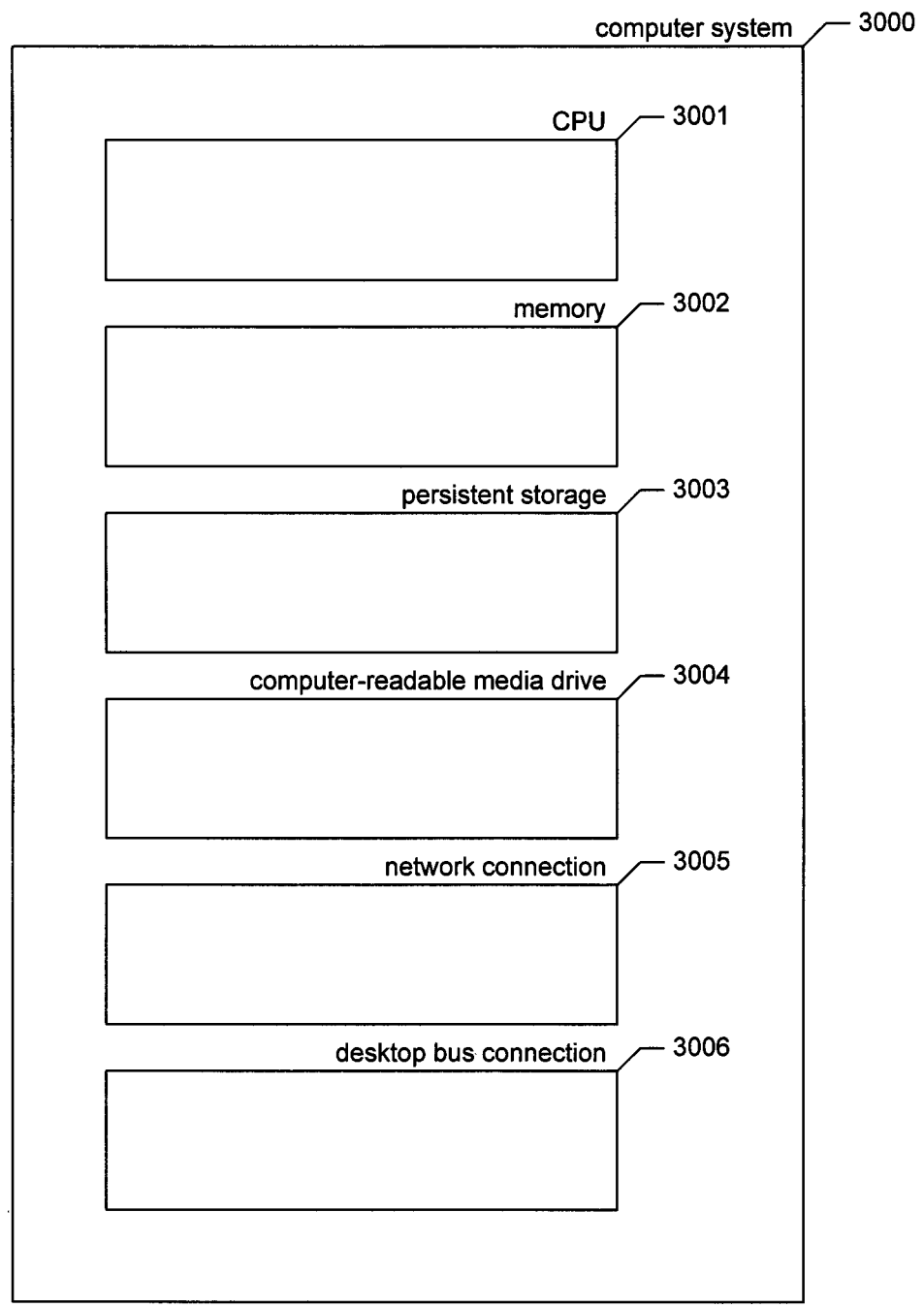
FIG. 30 is a block diagram showing some of the components typically incorporated in at least some of the computer systems and other devices on which the system executes.

FIG. 30 is a block diagram showing some of the components typically incorporated in at least some of the computer systems and other devices on which the system executes. These computer systems and devices 3000 may include one or more central processing units ("CPUs") 3001 for executing computer programs; a computer memory 3002 for storing programs and data—including data structures—while they are being used; a persistent storage device 3003, such as a hard drive, for persistently storing programs and data; a computer-readable media drive 3004, such as a CD-ROM drive, for reading programs and data stored on a computer-readable medium; a network connection 3005 for connecting the computer system to other computer systems, such as via the Internet, to exchange programs and/or data—including data structures; and a desktop bus connector 3006, such as a USB connector, or other suitable bus connector. The programs executed by the CPU may include programs associated with the system and described elsewhere herein, as well as software for recognizing scanned images, such as optical character recognition ("OCR") software and/or software for recognizing spoken audio, such as voice recognition software. While computer systems configured as described above are typically used to support the operation of the system, one of ordinary skill in the art will appreciate that the system may be implemented using devices of various types and configurations, and having various components.

Figure 31:
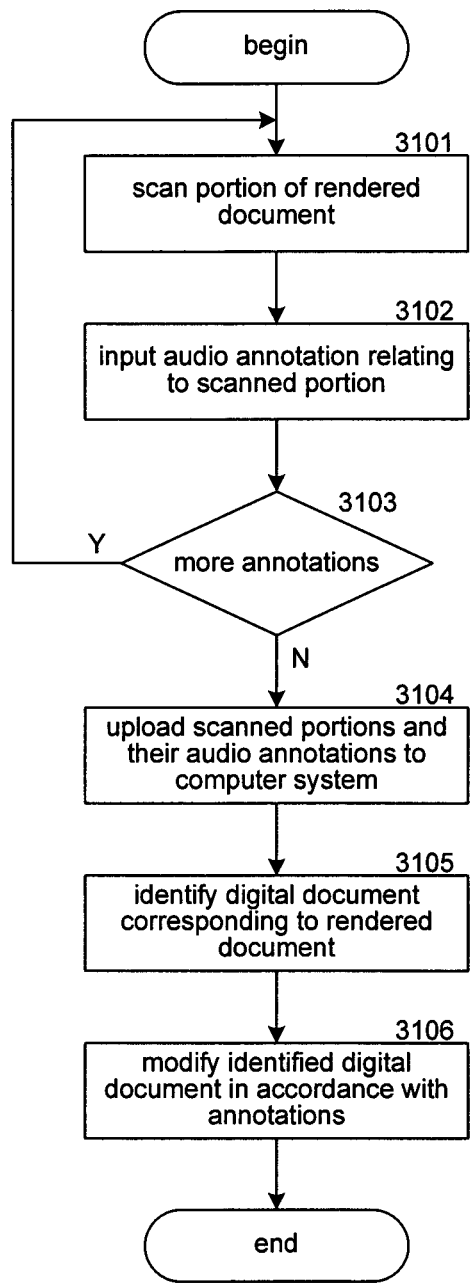
FIG. 31 is a flow diagram showing a typical process used by the system in order to annotate an electronic document.

FIG. 31 is a flow diagram showing a typical process used by the system in order to annotate an electronic document. In step 3101, the system scans a portion of a rendered document, such as a small, contiguous sequence of words. In step 3102, the system inputs an audio annotation relating to the scanned portion of the rendered document. In step 3103, if there are more annotations, then the system continues in step 3101 to construct another annotation, else the system continues in step 3104. In step 3104, the system uploads the document portions scanned in step 3101 and their audio annotations inputted in step 3102 to a computer system. In step 3105, the system identifies a digital document corresponding to the rendered document. In some embodiments, the system identifies the digital document corresponding to the rendered document by comparing the text in one or more of the document portions scanned from the rendered document to the contents of a universe of electronic documents.

In step 3106, the system modifies the digital document identified in step 3105 in accordance with the uploaded annotations. In some embodiments, step 3106 involves attaching each annotation as an audio clip to a point in the digital document proximate to the corresponding scanned portion. In some embodiments, step 3106 involves attaching a voice-recognized textual version of the annotations to the digital document at such points. In some embodiments, step 3106 involves automatically performing edits to the scanned portions of the identified digital document based upon voice-recognized contents of the annotations. Where voice recognition is used, it may be performed either before or after the annotations are uploaded. After step 3106, these steps conclude.

Of course, step 3106 may not appear in every embodiment and may differ in other embodiments from what is described above. For example, in some embodiments, uploading and storing the annotations for future use may be sufficient, and they may be stored separately from the digital original. In particular, it may not be possible to modify the original, for example because the annotator does not have sufficient privileges (e.g., the original was created by somebody else) or is on a non-writable medium such as a CD.

Those skilled in the art will appreciate that the steps shown in FIG. 31 may be altered in a variety of ways. For example, the order of the steps may be rearranged; substeps may be performed in parallel; shown steps may be omitted, or other steps may be included; etc.

FIG. 32 is a table diagram showing a sample annotation table 3200 used by the system to represent annotations inputted by the user. In some embodiments, the system store a version of the annotation table 3200 in the annotation device 2800 and/or in the computer system 2900. In some embodiments, the system uploads a version of the annotation table 3200 from the annotation device 2800 to the computer system 2900.

The table 3200 includes a row for each created annotation, such as rows 3201-3203. The rows of the annotation table 3200 intersect with columns, including: a document sequence number column 3211 containing a sequence number distinguishing annotations that relate to different rendered documents; a scanned text column 3212 containing either a recognized textual version of the text scanned for the annotation or raw or processed image data captured during scanning; and an annotation column 3213 containing either a voice-recognized textual version of the annotation or raw or processed audio data captured for the annotation. For example, row 3201 indicates that, in the first document annotated, the user scanned in this rendered document the text "idealized husbandry practices," and attached the audio annotation "add citation to Huff reference."

While FIG. 32 shows a table whose contents and organization are designed to make them more comprehensible by a human reader, those skilled in the art will appreciate that actual data structures used by the system to store this information may differ from the table shown, in that they, for example, may be organized in a different manner; may contain more or less information than shown; may be compressed and/or encrypted; etc. For example, in some embodiments, the system includes a timestamp and/or location stamp for each scan. The necessary time and location information could be obtained from an onboard Global Positioning System (GPS) capability or, in the case of a device 2800 with wireless communication capability, from the wireless communication network.

The system may be used in one or more of a variety of modes, including any of the sample modes described below. In one sample mode, the annotating device 2800 automatically downloads all of its annotations and scanned information into the identified document. The annotations become part of the document as notes, multimedia (audio) note files, etc. For example, a user scans some text from a paper document (which has a corresponding electronic document on the user's computer), thereby indicating where in the document the annotation belongs, and makes a voice annotation about some extra information that should be included at this point. Later, the user plugs the annotating device into a computer's USB port. In some embodiments, the user opens up the document in a document editing application (such as Microsoft Word) and launches a macro to download the annotation and append it to the Word document, either as text or an embedded audio file.

In another sample mode, the computer automatically identifies the document to which the annotation belongs by accessing a search index and comparing the scanned text to the search index, thereby using the scanned text to identify the correct document without further user intervention. This automatic download and incorporation into the document as "comments" may be used to enable collaborative editing of documents by work groups. When used in this way, the computer stores the individual edits and comments of each group member in the document. Alternatively, the computer stores and processes them separately and combines them as appropriate.

Exemplary Uses

The following are some exemplary uses of the handheld document data capture device. These examples cannot disclose every possible embodiment but are meant to give a brief overview of some uses.

P-commerce

In some embodiments, the handheld document data capture device has p-commerce capability and applications. For example, some embodiments can recognize icons and keywords related to p-commerce activities. These keywords and icons can launch p-commerce transaction software for purchasing goods and services by capturing data from paper documents. In some embodiments, the device is put into a purchasing state or mode upon encountering the $ (buy) mark. Because the purchase process is automated, some embodiments enable a subscriber to complete a purchase transaction with a single scan from a catalog or advertisement. In some embodiments, the device can store financial information in onboard memory such that it can directly interact with a credit card processor.

Keywords

In some embodiments, of the handheld document data capture device supports the use of keywords and markup documents in conjunction with rendered documents. Some embodiments recognize various supplemental markings in text (e.g., underlines, fonts, colors of text, tokens, icons) that indicate that a particular scan is to be handled specially. When one of these supplemental markings is encountered, the device executes an application associated with the detected marking. Keywords supported by the various embodiments include company names and commercial trademarks. Some trademarks and icons are converted in the phone to a code or text and sent to the service provider via SMS or other text-based messaging. Local caching of keyword lists in the phone is useful for local conversion of the graphics to text. Alternatively, graphical trademarks and icons can be transmitted as images via multimedia messaging.

Prepaid

In some embodiments, the portable data capture device has a prepaid subscription to services from a scanning service provider. Prepaid accounts have two main advantages. The first is that prepaid accounts enable anonymous use of the system, thus preserving the subscriber's privacy. The second is that prepaid accounts extend the population of potential subscribers to people with poor or no credit history. By paying in advance, a subscriber can use the system services regardless of his credit history.

For example, a customer might purchase a portable data capture device at a store. The device comes with a certain number of prepaid transactions. A typical transaction performed with the device would be accessing electronic documents. So, the customer could scan text from the local newspaper with the prepaid device and gain immediate anonymous access to supplementary electronic materials. The scanning service provider has an account file associated with the prepaid device to which each transaction is debited. When the customer has used all the prepaid transactions, he can optionally purchase more prepaid transactions by returning to the store or making an electronic payment (perhaps via a bank ATM machine). The service provider credits newly purchased transactions to the portable device's prepaid account file.

Conclusion

It will be appreciated by those skilled in the art that the above-described system may be straightforwardly adapted or extended in various ways. While the foregoing description makes reference to particular embodiments, the scope of the invention is defined solely by the claims that following and the elements recited therein.

We claim:

1. A method comprising:
receiving, using one or more visual sensors of a scanner device, information from a dynamic display device, wherein receiving the information from the dynamic display device comprises receiving information that identifies a position on the dynamic display device; and
transmitting, from the scanner device to a first computer system, an information-request that includes the information from the dynamic display device, wherein the information from the dynamic display device identifies or can be used to identify content to be provided to a scanner-associated device; and
determining text currently being displayed at the position on the dynamic display device without receiving, from the dynamic display device, data directly representing an image of the text.

2. The method of claim 1, further comprising:
transmitting, from the scanner device to the first computer system, a timestamp indicating a time at which at least one of the visual sensors receives the information from the dynamic display device; and
determining text that was displayed at the position on the dynamic display device at the time indicated by the timestamp.

3. The method of claim 1, further comprising:
receiving, using the one or more visual sensors of the scanner device, information from a printed document, and
transmitting, from the scanner device to the first computer system, an information-request that includes the information from the printed document, wherein the information from the printed document identifies or can be used to identify additional content to be provided to the scanner-associated device or a second scanner-associated device.

4. The method of claim 3,
wherein receiving the information from the printed document comprises the one or more visual sensors detecting hidden control symbols printed with ink having ultraviolet or infrared properties.

5. The method of claim 1, further comprising:
changing, prior to receiving the information from the dynamic display device, a depth of field setting of the visual sensors to a particular depth of field setting for the dynamic display device.

6. The method of claim 1, further comprising:
changing, prior to receiving the information from the dynamic display device, a focus setting of the visual sensors to a particular focus setting for the dynamic display device.

7. The method of claim 1, further comprising:
transmitting, from the scanner device to the first computer system, a device identifier that uniquely identifies the scanner-associated device to which the content is to be provided.

8. The method of claim 7, further comprising:
transmitting, from the scanner device to the first computer system, a command for the computer system to look up a current network address of the scanner-associated device.

9. The method of claim 1, further comprising:
detecting, using the scanner device, a lighting environment provided by an illumination source of the dynamic display device; and
adjusting, using the scanner device, at least one setting of the scanner device based on the detected lighting environment.

10. The method of claim 9, wherein adjusting the at least one setting of the scanner device comprises adjusting a frame capture rate, adjusting a shutter speed, adjusting an illumination setting of an illumination source of the scanner device, or turning the illumination source of the scanner device off.

11. A method comprising:
receiving, using one or more visual sensors of a scanner device, information from a dynamic display device; and
transmitting, from the scanner device to a first computer system, an information-request that includes the information from the dynamic display device, wherein the information from the dynamic display device identifies or can be used to identify content to be provided to a scanner-associated device, wherein receiving the information from the dynamic display device comprises receiving position information that represents a position on the dynamic display device from which one of the visual sensors is receiving visual information from the dynamic display device.

12. A method comprising:

receiving, using one or more visual sensors of a scanner device, information from a dynamic display device;

transmitting, from the scanner device to a first computer system, an information-request that includes the information from the dynamic display device, wherein the information from the dynamic display device identifies or can be used to identify content to be provided to a scanner-associated device, wherein receiving the information from the dynamic display device comprises receiving a session-identifier code that uniquely identifies a browser communication session carried out via a computer system that comprises the dynamic display device, and transmitting, from the scanner device to the first computer system, the session-identifier code that uniquely identifies the browser communication session carried out via the computer system that comprises the dynamic display device.

13. A method comprising:

receiving, using one or more visual sensors of a scanner device, information from a dynamic display device; and transmitting, from the scanner device to a first computer system, an information-request that includes the information from the dynamic display device, wherein the information from the dynamic display device identifies or can be used to identify content to be provided to a scanner-associated device, wherein receiving the information from the dynamic display device comprises receiving information that the scanner device uses to determine a position on the dynamic display device by optically sensing a refresh cycles on a raster of the dynamic display device and comparing the refresh cycles to timing signals from drive circuitry of the dynamic display device.

* * * * *